US012643367B2

(12) United States Patent
Cochran et al.

(10) Patent No.: US 12,643,367 B2
(45) Date of Patent: Jun. 2, 2026

(54) THERMAL MANAGEMENT SYSTEMS FOR ELECTRIC VEHICLE PLATFORMS

(71) Applicant: Canoo Technologies Inc., Torrance, CA (US)

(72) Inventors: William Ice Cochran, Fullerton, CA (US); William Rutherford Smith, Torrance, CA (US); Marco Elkenkamp, Marina del Rey, CA (US)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 641 days.

(21) Appl. No.: 17/761,997

(22) PCT Filed: Sep. 18, 2020

(86) PCT No.: PCT/US2020/051505
§ 371 (c)(1),
(2) Date: Mar. 18, 2022

(87) PCT Pub. No.: WO2021/055758
PCT Pub. Date: Mar. 25, 2021

(65) Prior Publication Data
US 2022/0371396 A1 Nov. 24, 2022

Related U.S. Application Data

(60) Provisional application No. 62/902,043, filed on Sep. 18, 2019, provisional application No. 62/902,052, filed on Sep. 18, 2019.

(51) Int. Cl.
*B60H 1/00* (2006.01)
*B60H 1/14* (2006.01)
(Continued)

(52) U.S. Cl.
CPC ......... *B60H 1/00278* (2013.01); *B60H 1/143* (2013.01); *B60H 1/32281* (2019.05);
(Continued)

(58) Field of Classification Search
CPC ........... B60H 2001/00214; B60H 2001/00242; B60H 1/143; B60H 1/00278;
(Continued)

(56) References Cited

U.S. PATENT DOCUMENTS 1,526,481 A 2/1925 Krieger
2,467,516 A 4/1949 Almdale
(Continued)

FOREIGN PATENT DOCUMENTS

AU 2002323246 A1 3/2003
AU 2002332561 A1 3/2003
(Continued)

OTHER PUBLICATIONS

Rejection Decision dated May 27, 2024, in connection with Chinese Application No. 202080048116.6, 12 pages.
(Continued)

*Primary Examiner* — Jianying C Atkisson
*Assistant Examiner* — For K Ling
(74) *Attorney, Agent, or Firm* — ALLEN, DYER, DOPPELT, + GILCHRIST, P.A.

(57) ABSTRACT

Vehicle platforms and thermal management systems, subsystems, and components for use therewith are described. Thermal management architectures and systems incorporate thermal management cycles for one or more of drive train, energy storage and passenger cabin systems. Thermal management architectures are provided such that the flow of heating and cooling fluids through such thermal management cycles may be combined in various configurations. Systems having thermal management cycles for drive train (e.g., motor,
(Continued)

transmission, etc.) and energy storage (e.g., battery) that may be operated through a combined heating/cooling fluid loop are also provided. Embodiments are also directed to systems having thermal management cycles for the HVAC that is fluidly isolated, but thermally coupled to one or both of the drivetrain and energy storage components. Heating/cooling loops for these thermal management cycles may be functionally linked through one or more valves such that the fluid flow through such cycles may be combined together, isolated from each other or mixed in various desired configurations.

9 Claims, 39 Drawing Sheets

(51) Int. Cl.
B60H 1/32 (2006.01)
B60L 58/26 (2019.01)

(52) U.S. Cl.
CPC .............. *B60H 1/323* (2013.01); *B60L 58/26* (2019.02); *B60H 2001/00307* (2013.01); *B60H 1/005* (2013.01); *B60H 2001/006* (2013.01); *B60L 2240/485* (2013.01); *B60L 2240/525* (2013.01); *B60L 2240/545* (2013.01)

(58) Field of Classification Search
CPC ........... B60H 1/00392; B60H 1/32281; B60H 1/00371; B60H 1/00385; B60H 1/00564; B60H 1/00207; B60H 1/00814; B60H 2001/00235; B60H 2001/002; B60H 1/00064; B60L 58/24
See application file for complete search history.

(56) References Cited

U.S. PATENT DOCUMENTS

| | | | |
|---|---|---|---|
| 2,673,512 A * | 3/1954 | Henney .............. B60H 1/00371 | |
| | | | 454/105 |
| 2,714,808 A * | 8/1955 | Owen .................. B60H 1/3204 | |
| | | | 454/141 |
| 2,873,994 A | 2/1959 | Omps | |
| 3,170,682 A | 2/1965 | Eggers | |
| 3,429,566 A | 2/1969 | Rosendale | |
| 3,951,450 A | 4/1976 | Gambotti | |
| 4,148,505 A | 4/1979 | Jensen et al. | |
| 4,307,865 A | 12/1981 | MacCready | |
| 4,458,918 A | 7/1984 | Rumpel | |
| 4,460,215 A | 7/1984 | Chamberlain et al. | |
| 4,473,109 A * | 9/1984 | Kojima .............. G05D 23/1917 | |
| | | | 165/203 |
| 4,527,828 A | 7/1985 | Groce et al. | |
| 4,541,654 A | 9/1985 | Jonasson | |
| 4,557,500 A | 12/1985 | Collard et al. | |
| 4,619,466 A | 10/1986 | Schaible et al. | |
| 4,779,917 A | 10/1988 | Campbell et al. | |
| 4,799,632 A | 1/1989 | Baymak et al. | |
| 4,887,841 A | 12/1989 | Cowburn et al. | |
| 5,015,545 A | 5/1991 | Brooks | |
| 5,039,124 A | 8/1991 | Widmer | |
| 5,054,378 A * | 10/1991 | Speece .............. B60H 1/00371 | |
| | | | 62/244 |
| 5,069,306 A | 12/1991 | Inoue et al. | |
| 5,141,209 A | 8/1992 | Sano et al. | |
| 5,399,121 A * | 3/1995 | Gray ...................... B60H 1/247 | |
| | | | 454/903 |
| 5,501,289 A | 3/1996 | Nishikawa et al. | |
| 5,803,166 A * | 9/1998 | Ito ...................... B60H 1/00057 | |
| | | | 165/203 |
| 5,807,205 A | 9/1998 | Odaka et al. | |
| 5,827,149 A | 10/1998 | Sponable | |

| | | | |
|---|---|---|---|
| 6,029,987 A | 2/2000 | Hoffman et al. | |
| 6,120,370 A * | 9/2000 | Asou .................. B60H 1/00207 | |
| | | | 454/144 |
| 6,131,652 A * | 10/2000 | Ito ...................... B60H 1/00064 | |
| | | | 165/203 |
| 6,299,210 B1 | 10/2001 | Ruehl et al. | |
| 6,301,909 B1 * | 10/2001 | Hayasaka ................ B60H 1/24 | |
| | | | 62/323.3 |
| 6,488,791 B1 | 12/2002 | Powers, II | |
| 6,512,347 B1 | 1/2003 | Hellmann et al. | |
| 6,672,662 B1 | 1/2004 | Balk | |
| 6,688,586 B1 | 2/2004 | Moore | |
| 6,705,668 B1 | 3/2004 | Makita et al. | |
| 6,710,916 B1 | 3/2004 | Bolshtyansky | |
| 6,712,164 B2 | 3/2004 | Chernoff et al. | |
| 6,726,438 B2 | 4/2004 | Chernoff et al. | |
| 6,733,040 B1 | 5/2004 | Simboli | |
| 6,766,873 B2 | 7/2004 | Chernoff et al. | |
| 6,768,932 B2 | 7/2004 | Claypole et al. | |
| 6,811,169 B2 | 11/2004 | Schroeder et al. | |
| 6,830,117 B2 | 12/2004 | Chernoff et al. | |
| 6,836,943 B2 | 1/2005 | Chernoff et al. | |
| 6,843,336 B2 | 1/2005 | Chernoff et al. | |
| 6,845,839 B2 | 1/2005 | Chernoff et al. | |
| 6,857,498 B2 | 2/2005 | Vitale et al. | |
| 6,880,856 B2 | 4/2005 | Chernoff et al. | |
| 6,889,785 B2 | 5/2005 | Chernoff et al. | |
| 6,899,194 B2 | 5/2005 | Chernoff et al. | |
| 6,905,138 B2 | 6/2005 | Borroni-Bird et al. | |
| 6,923,281 B2 | 8/2005 | Chernoff et al. | |
| 6,923,282 B2 | 8/2005 | Chernoff et al. | |
| 6,935,449 B2 | 8/2005 | Chernoff et al. | |
| 6,935,658 B2 | 8/2005 | Chernoff et al. | |
| 6,938,712 B2 | 9/2005 | Chernoff et al. | |
| 6,948,226 B2 | 9/2005 | Chernoff et al. | |
| 6,959,475 B2 | 11/2005 | Chernoff et al. | |
| 6,968,918 B2 | 11/2005 | Chernoff et al. | |
| 6,976,307 B2 | 12/2005 | Chernoff et al. | |
| 6,986,401 B2 | 1/2006 | Chernoff et al. | |
| 6,991,060 B2 | 1/2006 | Chernoff et al. | |
| 7,000,318 B2 | 2/2006 | Chernoff et al. | |
| 7,004,502 B2 | 2/2006 | Borroni-Bird et al. | |
| 7,025,409 B2 | 4/2006 | Riley et al. | |
| 7,028,791 B2 | 4/2006 | Chernoff et al. | |
| 7,029,017 B2 | 4/2006 | Zandbergen et al. | |
| 7,036,848 B2 | 5/2006 | Chernoff et al. | |
| 7,083,016 B2 | 8/2006 | Chernoff et al. | |
| 7,096,986 B2 | 8/2006 | Borroni-Bird et al. | |
| 7,104,581 B2 | 9/2006 | Chernoff et al. | |
| 7,111,900 B2 | 9/2006 | Chernoff et al. | |
| 7,213,673 B2 | 5/2007 | Shabana et al. | |
| 7,237,829 B2 | 7/2007 | Latimer, III et al. | |
| 7,275,609 B2 | 10/2007 | Chernoff et al. | |
| 7,281,600 B2 | 10/2007 | Chernoff et al. | |
| 7,292,992 B2 | 11/2007 | Chernoff et al. | |
| 7,303,033 B2 | 12/2007 | Chernoff et al. | |
| 7,303,211 B2 | 12/2007 | Borroni-Bird et al. | |
| 7,360,816 B2 | 4/2008 | Chernoff et al. | |
| 7,370,886 B2 | 5/2008 | Luttinen et al. | |
| 7,373,315 B2 | 5/2008 | Chernoff et al. | |
| 7,398,846 B2 | 7/2008 | Young et al. | |
| 7,441,615 B2 | 10/2008 | Borroni-Bird et al. | |
| 7,469,956 B2 | 12/2008 | Yasuhara et al. | |
| 7,520,355 B2 | 4/2009 | Chaney | |
| 7,597,169 B2 | 10/2009 | Borroni-Bird et al. | |
| 7,681,943 B2 | 3/2010 | Murata et al. | |
| 7,753,428 B2 | 7/2010 | Kato et al. | |
| 7,936,113 B2 | 5/2011 | Namuduri et al. | |
| 8,143,766 B2 | 3/2012 | Namuduri et al. | |
| 8,253,281 B2 | 8/2012 | Namuduri et al. | |
| 8,308,148 B2 | 11/2012 | Shand | |
| 8,448,696 B2 | 5/2013 | Johnston et al. | |
| 8,484,930 B2 | 7/2013 | Ruehl | |
| 8,485,543 B2 | 7/2013 | Richardson et al. | |
| 8,556,282 B2 | 10/2013 | Pollmeyer et al. | |
| 8,640,806 B2 | 2/2014 | Worup et al. | |
| 8,708,392 B2 | 4/2014 | Otsuka et al. | |
| 8,757,719 B2 | 6/2014 | Hayakawa | |
| 8,881,883 B2 | 11/2014 | Barton et al. | |

(56) References Cited

U.S. PATENT DOCUMENTS

| | | | |
|---|---|---|---|
| 8,936,265 B2 | 1/2015 | Ehrlich et al. | |
| 8,940,425 B2 | 1/2015 | Toepfer | |
| 8,998,296 B2 | 4/2015 | Eipper | |
| 9,162,546 B2 | 10/2015 | Girelli Consolaro et al. | |
| 9,457,746 B1 | 10/2016 | Baccouche et al. | |
| 9,566,840 B2 | 2/2017 | Seethaler et al. | |
| 9,580,176 B2 | 2/2017 | Ehlers et al. | |
| 9,627,721 B2 | 4/2017 | Kosaki et al. | |
| 9,676,418 B1 | 6/2017 | Mohammed et al. | |
| 9,682,727 B2 | 6/2017 | Tanaka et al. | |
| 9,751,565 B2 | 9/2017 | Tatsuwaki et al. | |
| 9,988,100 B2 | 6/2018 | Kim et al. | |
| 10,131,381 B2 | 11/2018 | Ashraf et al. | |
| 10,293,860 B1 | 5/2019 | Cooper et al. | |
| 10,336,369 B2 | 7/2019 | Viaux et al. | |
| 10,421,424 B2 | 9/2019 | Sabu et al. | |
| 10,486,513 B2 | 11/2019 | Battaglia et al. | |
| 10,632,857 B2 | 4/2020 | Matecki et al. | |
| 10,741,809 B2 | 8/2020 | Kim et al. | |
| 11,292,326 B2 | 4/2022 | McCarron et al. | |
| 11,833,895 B2 | 12/2023 | McCarron et al. | |
| 2002/0005268 A1 | 1/2002 | Noda et al. | |
| 2002/0149490 A1 | 10/2002 | Butler et al. | |
| 2003/0037427 A1 | 2/2003 | Chernoff et al. | |
| 2003/0037967 A1 | 2/2003 | Chernoff et al. | |
| 2003/0037968 A1 | 2/2003 | Chernoff et al. | |
| 2003/0037970 A1 | 2/2003 | Chernoff et al. | |
| 2003/0037971 A1 | 2/2003 | Chernoff et al. | |
| 2003/0037972 A1 | 2/2003 | Chernoff et al. | |
| 2003/0037973 A1 | 2/2003 | Chernoff et al. | |
| 2003/0037974 A1 | 2/2003 | Chernoff et al. | |
| 2003/0037975 A1 | 2/2003 | Chernoff et al. | |
| 2003/0037982 A1 | 2/2003 | Chernoff et al. | |
| 2003/0037987 A1 | 2/2003 | Chernoff et al. | |
| 2003/0038442 A1 | 2/2003 | Chernoff et al. | |
| 2003/0038467 A1 | 2/2003 | Chernoff et al. | |
| 2003/0038468 A1 | 2/2003 | Chernoff et al. | |
| 2003/0038469 A1 | 2/2003 | Chernoff et al. | |
| 2003/0038470 A1 | 2/2003 | Chernoff et al. | |
| 2003/0038509 A1 | 2/2003 | Chernoff et al. | |
| 2003/0040827 A1 | 2/2003 | Chernoff et al. | |
| 2003/0040828 A1 | 2/2003 | Chernoff et al. | |
| 2003/0040933 A1 | 2/2003 | Chernoff et al. | |
| 2003/0040977 A1 | 2/2003 | Chernoff et al. | |
| 2003/0040979 A1 | 2/2003 | Borroni-Bird et al. | |
| 2003/0046802 A1 | 3/2003 | Chernoff et al. | |
| 2003/0047362 A1 | 3/2003 | Chernoff et al. | |
| 2003/0080577 A1 | 5/2003 | Roberts et al. | |
| 2003/0089536 A1 | 5/2003 | Chernoff et al. | |
| 2003/0094318 A1 | 5/2003 | Chernoff et al. | |
| 2003/0094319 A1 | 5/2003 | Chernoff et al. | |
| 2003/0094320 A1 | 5/2003 | Chernoff et al. | |
| 2003/0116374 A1 | 6/2003 | Chernoff et al. | |
| 2003/0141736 A1 | 7/2003 | Chernoff et al. | |
| 2003/0159866 A1 | 8/2003 | Claypole et al. | |
| 2003/0164255 A1 | 9/2003 | Borroni-Bird et al. | |
| 2003/0168267 A1 | 9/2003 | Borroni-Bird et al. | |
| 2003/0168844 A1 | 9/2003 | Borroni-Bird et al. | |
| 2003/0184075 A1 | 10/2003 | Freeman et al. | |
| 2004/0060750 A1 | 4/2004 | Chernoff et al. | |
| 2004/0066025 A1 | 4/2004 | Borroni-Bird et al. | |
| 2004/0069545 A1 | 4/2004 | Chernoff et al. | |
| 2004/0069556 A1 | 4/2004 | Chernoff et al. | |
| 2004/0129487 A1 | 7/2004 | Shabana et al. | |
| 2004/0163859 A1 | 8/2004 | Chernoff et al. | |
| 2004/0163875 A1 | 8/2004 | Chernoff et al. | |
| 2004/0164577 A1 | 8/2004 | Shabana et al. | |
| 2004/0189054 A1 | 9/2004 | Chernoff et al. | |
| 2004/0194280 A1 | 10/2004 | Borroni-Bird et al. | |
| 2004/0194313 A1 | 10/2004 | Chernoff et al. | |
| 2004/0195014 A1 | 10/2004 | Chernoff et al. | |
| 2005/0049944 A1 | 3/2005 | Chernoff et al. | |
| 2005/0082872 A1 | 4/2005 | Rich et al. | |
| 2005/0121926 A1 | 6/2005 | Montanvert et al. | |
| 2005/0161981 A1 | 7/2005 | Chernoff et al. | |

| | | | |
|---|---|---|---|
| 2005/0168016 A1 | 8/2005 | Svartvatn | |
| 2005/0263332 A1 | 12/2005 | Chernoff et al. | |
| 2006/0027406 A1 | 2/2006 | Borroni-Bird et al. | |
| 2006/0048994 A1 | 3/2006 | Young et al. | |
| 2006/0061080 A1 | 3/2006 | Luttinen et al. | |
| 2006/0102398 A1 | 5/2006 | Mizuno | |
| 2007/0222251 A1 | 9/2007 | Abraham | |
| 2008/0169671 A1 | 7/2008 | Hedderly | |
| 2009/0058134 A1 | 3/2009 | Hiraishi et al. | |
| 2009/0236877 A1 | 9/2009 | Peschansky et al. | |
| 2010/0025131 A1 | 2/2010 | Gloceri et al. | |
| 2010/0219720 A1 | 9/2010 | Namuduri et al. | |
| 2010/0219721 A1 | 9/2010 | Namuduri et al. | |
| 2010/0219798 A1 | 9/2010 | Namuduri et al. | |
| 2010/0242513 A1* | 9/2010 | Nishino | B60H 1/00371 |
| | | | 62/426 |
| 2010/0273411 A1 | 10/2010 | Kakizaki et al. | |
| 2010/0314905 A1 | 12/2010 | Mori | |
| 2011/0212355 A1 | 9/2011 | Essinger et al. | |
| 2011/0259657 A1 | 10/2011 | Fuechtner | |
| 2011/0296855 A1* | 12/2011 | Johnston | B60L 50/40 |
| | | | 62/160 |
| 2012/0049664 A1* | 3/2012 | Yokoyama | B60H 1/143 |
| | | | 165/41 |
| 2012/0169089 A1 | 7/2012 | Rawlinson et al. | |
| 2012/0174602 A1 | 7/2012 | Olivier et al. | |
| 2012/0175899 A1 | 7/2012 | Gadhiya et al. | |
| 2012/0183815 A1 | 7/2012 | Johnston et al. | |
| 2013/0088045 A1 | 4/2013 | Charbonneau et al. | |
| 2013/0300138 A1 | 11/2013 | Banasiak et al. | |
| 2013/0341882 A1 | 12/2013 | Ehrlich et al. | |
| 2014/0144160 A1* | 5/2014 | Jackson | H01M 10/613 |
| | | | 62/62 |
| 2014/0308551 A1 | 10/2014 | Schroeder et al. | |
| 2014/0353937 A1 | 12/2014 | Girelli Consolaro et al. | |
| 2015/0142245 A1 | 5/2015 | Cuddihy et al. | |
| 2015/0258955 A1 | 9/2015 | Jayasuriya et al. | |
| 2015/0298741 A1 | 10/2015 | Winberg et al. | |
| 2016/0003553 A1 | 1/2016 | Campbell | |
| 2016/0023532 A1* | 1/2016 | Gauthier | H01M 10/6568 |
| | | | 62/502 |
| 2016/0107501 A1* | 4/2016 | Johnston | B60H 1/00278 |
| | | | 165/41 |
| 2016/0107506 A1 | 4/2016 | Johnston | |
| 2016/0164055 A1 | 6/2016 | Saitou | |
| 2016/0207370 A1 | 7/2016 | Moeller et al. | |
| 2016/0318409 A1 | 11/2016 | Rawlinson | |
| 2017/0001507 A1 | 1/2017 | Ashraf et al. | |
| 2017/0001667 A1 | 1/2017 | Ashraf et al. | |
| 2017/0057546 A1 | 3/2017 | Dressel et al. | |
| 2017/0225588 A1 | 8/2017 | Newman | |
| 2017/0225714 A1 | 8/2017 | Ito | |
| 2017/0305248 A1 | 10/2017 | Hara et al. | |
| 2017/0369112 A1 | 12/2017 | Ashraf et al. | |
| 2018/0050606 A1 | 2/2018 | Sugitate et al. | |
| 2018/0050607 A1 | 2/2018 | Matecki et al. | |
| 2018/0065678 A1 | 3/2018 | Tutzer | |
| 2018/0072131 A1 | 3/2018 | Lee et al. | |
| 2018/0086224 A1* | 3/2018 | King | H01M 10/663 |
| 2018/0097265 A1 | 4/2018 | Tarlau et al. | |
| 2018/0105062 A1 | 4/2018 | Fees et al. | |
| 2018/0108891 A1 | 4/2018 | Fees et al. | |
| 2018/0208061 A1* | 7/2018 | Ben Ahmed | B60H 1/00899 |
| 2018/0215245 A1 | 8/2018 | Sudhindra et al. | |
| 2018/0229628 A1 | 8/2018 | Minato et al. | |
| 2018/0261899 A1 | 9/2018 | Milton et al. | |
| 2018/0281864 A1 | 10/2018 | Nishigaki et al. | |
| 2018/0337377 A1 | 11/2018 | Stephens et al. | |
| 2018/0337378 A1 | 11/2018 | Stephens et al. | |
| 2018/0361819 A1 | 12/2018 | Ryu et al. | |
| 2019/0023321 A1 | 1/2019 | Ayukawa | |
| 2019/0054956 A1 | 2/2019 | Stenvall | |
| 2019/0070924 A1* | 3/2019 | Mancini | B60H 1/32281 |
| 2019/0092113 A1 | 3/2019 | Girelli Consolaro et al. | |
| 2019/0131602 A1 | 5/2019 | Hilfrich et al. | |
| 2019/0135065 A1 | 5/2019 | Wolf-Monheim | |
| 2019/0160903 A1 | 5/2019 | Schramm et al. | |
| 2019/0210470 A1 | 7/2019 | Thomas et al. | |
| 2019/0225051 A1 | 7/2019 | Zenner et al. | |

(56) References Cited

U.S. PATENT DOCUMENTS

| | | |
|---|---|---|
| 2019/0308669 A1 | 10/2019 | Aitharaju et al. |
| 2019/0375270 A1* | 12/2019 | Boger ................ B60H 1/00392 |
| 2020/0079177 A1* | 3/2020 | Ferraris ............. B60H 1/00278 |
| 2020/0079431 A1 | 3/2020 | Stainer et al. |
| 2020/0114973 A1 | 4/2020 | Takahashi et al. |
| 2020/0152926 A1 | 5/2020 | Wynn et al. |
| 2020/0156486 A1 | 5/2020 | Howard et al. |
| 2020/0215943 A1 | 7/2020 | Hayashi |
| 2020/0231218 A1 | 7/2020 | Arvidsson et al. |
| 2020/0339197 A1 | 10/2020 | Kecalevic et al. |
| 2020/0369140 A1 | 11/2020 | McCarron et al. |
| 2020/0398732 A1 | 12/2020 | Glatfelter et al. |
| 2021/0001924 A1 | 1/2021 | Charbonneau et al. |
| 2021/0070123 A1 | 3/2021 | Haeusler et al. |
| 2021/0086665 A1 | 3/2021 | Lee et al. |
| 2021/0091352 A1 | 3/2021 | Weicker et al. |
| 2021/0122223 A1 | 4/2021 | McCarron et al. |
| 2021/0273285 A1 | 9/2021 | Bluemel |
| 2022/0123397 A1 | 4/2022 | Weicker et al. |
| 2022/0126922 A1 | 4/2022 | Charbonneau et al. |
| 2022/0234435 A1 | 7/2022 | McCarron et al. |
| 2023/0102921 A1 | 3/2023 | Odhekar et al. |

FOREIGN PATENT DOCUMENTS

| | | | | |
|---|---|---|---|---|
| CN | 1675092 A | 9/2005 | | |
| CN | 1695050 A | 11/2005 | | |
| CN | 1791519 A | 6/2006 | | |
| CN | 100379612 C | 4/2008 | | |
| CN | 201217453 Y | 4/2009 | | |
| CN | 102275521 A | 12/2011 | | |
| CN | 102548780 A | 7/2012 | | |
| CN | 103183053 B | 7/2013 | | |
| CN | 204150116 U | 2/2015 | | |
| CN | 104417303 A | 3/2015 | | |
| CN | 105522888 A | 4/2016 | | |
| CN | 106240637 A | 12/2016 | | |
| CN | 106458123 A | 2/2017 | | |
| CN | 205916190 U | 2/2017 | | |
| CN | 106573651 A | 4/2017 | | |
| CN | 206287960 U | 6/2017 | | |
| CN | 107074051 A | 8/2017 | | |
| CN | 206417059 U | 8/2017 | | |
| CN | 107651021 A | 2/2018 | | |
| CN | 107709074 A | 2/2018 | | |
| CN | 107792185 A | 3/2018 | | |
| CN | 107813674 A | 3/2018 | | |
| CN | 108357565 A | 8/2018 | | |
| CN | 108860040 A | 11/2018 | | |
| CN | 108891248 A | 11/2018 | | |
| CN | 208069806 U | 11/2018 | | |
| CN | 109204462 A | 1/2019 | | |
| CN | 109291747 A | 2/2019 | | |
| CN | 110053451 A | 7/2019 | | |
| CN | 210149098 U | 3/2020 | | |
| DE | 3430129 A | * 2/1986 | ........ | B60H 1/00371 |
| DE | 10154353 A1 | 5/2002 | | |
| DE | 10297137 T5 | 8/2004 | | |
| DE | 102006021149 A1 | 11/2007 | | |
| DE | 102007005873 A1 | * 8/2008 | ........ | B60H 1/00007 |
| DE | 102008052937 A1 | 5/2009 | | |
| DE | 10297133 B4 | 5/2013 | | |
| DE | 102017005938 B3 | 12/2018 | | |
| DE | 102018123357 A1 | 3/2019 | | |
| DE | 102018122854 A1 | 3/2020 | | |
| DE | 102020101867 A1 | 7/2020 | | |
| EP | 0770517 A1 | 5/1997 | | |
| EP | 0857590 A1 | 8/1998 | | |
| EP | 1245436 A1 | 10/2002 | | |
| EP | 1446645 A2 | 8/2004 | | |
| EP | 1448969 A1 | 8/2004 | | |
| EP | 2392486 A2 | 12/2011 | | |
| EP | 3088230 A1 | 11/2016 | | |
| FR | 8239 E | 2/1908 | | |
| FR | 2821046 A1 | 8/2002 | | |
| FR | 2938475 A1 | 5/2010 | | |
| FR | 2972169 A1 | 9/2012 | | |
| GB | 191217101 A | 6/1913 | | |
| GB | 1246803 A | * 9/1971 | ........ | B60H 1/00007 |
| GB | 2568538 A | 5/2019 | | |
| JP | 63151515 A | * 6/1988 | ........ | B60H 1/00371 |
| JP | H01-158206 U | 11/1989 | | |
| JP | H03-91867 U | 9/1991 | | |
| JP | H04-83926 U | 7/1992 | | |
| JP | H05-19010 U | 3/1993 | | |
| JP | H11-78966 A | 3/1999 | | |
| JP | H11-348815 A | 12/1999 | | |
| JP | 2001-047828 A | 2/2001 | | |
| JP | 2001-47828 A | 2/2001 | | |
| JP | 2002-229656 A | 8/2002 | | |
| JP | 2002-370544 A | 12/2002 | | |
| JP | 2004-338421 A | 12/2004 | | |
| JP | 2005500940 A | 1/2005 | | |
| JP | 2007-106320 A | 4/2007 | | |
| JP | 2007-303680 A | 11/2007 | | |
| JP | 2008-512627 A | 4/2008 | | |
| JP | 2008149914 A | 7/2008 | | |
| JP | 2010-221991 A | 10/2010 | | |
| JP | 4840196 B2 | 12/2011 | | |
| JP | 2013-136308 A | 7/2013 | | |
| JP | 2014-127338 A | 7/2014 | | |
| JP | 2015-074244 A | 4/2015 | | |
| JP | 2017001441 A | 1/2017 | | |
| JP | 2018-176790 A | 11/2018 | | |
| KR | 10-2003-0046824 A | 6/2003 | | |
| KR | 10-1286675 B1 | 7/2013 | | |
| WO | 199104875 A1 | 4/1991 | | |
| WO | 03018337 A2 | 3/2003 | | |
| WO | 03018358 A2 | 3/2003 | | |
| WO | 03018359 A2 | 3/2003 | | |
| WO | 03018373 A1 | 3/2003 | | |
| WO | 03019309 A1 | 3/2003 | | |
| WO | 03050498 A1 | 6/2003 | | |
| WO | 03054500 A2 | 7/2003 | | |
| WO | 2005084985 A1 | 9/2005 | | |
| WO | 2006029415 A2 | 3/2006 | | |
| WO | 2011134815 A1 | 11/2011 | | |
| WO | 2014173476 A1 | 10/2014 | | |
| WO | 2015128430 A1 | 9/2015 | | |
| WO | 2015136476 A1 | 9/2015 | | |
| WO | 2015/151064 A1 | 10/2015 | | |
| WO | 2017136351 A2 | 8/2017 | | |
| WO | 2017207125 A1 | 12/2017 | | |
| WO | 2017215857 A1 | 12/2017 | | |
| WO | 2018149762 A1 | 8/2018 | | |
| WO | 2018158363 A1 | 9/2018 | | |
| WO | 2019169080 A1 | 9/2019 | | |
| WO | 2020236913 A1 | 11/2020 | | |

OTHER PUBLICATIONS

Notification to Grant Patent Right for Invention dated Jun. 10, 2024, in connection with Chinese Application No. 202080079746.X, 4 pages.

Notification to Grant Patent Right for Invention dated Jun. 20, 2024, in connection with Chinese Application No. 202080080584.1, 6 pages.

International Search Report and Written Opinion of the International Searching Authority dated Feb. 5, 2021, in connection with International Application No. PCT/US2020/051505, 12 pages.

Notice of Allowance dated Apr. 22, 2024, in connection with U.S. Appl. No. 17/651,221, 10 pages.

Non-Final Office Action dated Apr. 24, 2024, in connection with U.S. Appl. No. 17/646,656, 11 pages.

Supplementary European Search Report dated Jul. 24, 2023, in connection with European Patent Application No. 20809867.3, 24 pages.

Decision to Grant a Patent dated Aug. 15, 2023, in connection with Japanese Application No. 2021-577866, 5 pages.

Supplementary Partial European Search Report dated Sep. 11, 2023, in connection with European Application No. 20864821.2, 14 pages.

(56) References Cited

OTHER PUBLICATIONS

Supplementary Partial European Search Report dated Sep. 19, 2023, in connection with European Application No. 20865142.2, 17 pages.

Final Office Action dated Aug. 1, 2024, in connection with U.S. Appl. No. 17/646,656, 9 pages.

Notice of Reasons for Rejection dated Aug. 6, 2024, in connection with Japanese Application No. 2023-114857, 11 pages.

Third Office Action dated Jul. 25, 2024, in connection with Chinese Application No. CN202080073120.8, 23 pages.

Decision of Refusal dated May 9, 2023, in connection with Japanese Application No. 2021-577866, 9 pages.

Invitation pursuant to Rule 63(1) EPC dated May 12, 2023, in connection with European Application No. 20809867.3, 7 pages.

Final Office Action dated Aug. 4, 2022, in connection with U.S. Appl. No. 16/879,235, 12 pages.

Notification of the First Office Action dated Dec. 7, 2023, in connection with Chinese Application No. 202080079746.X, 16 pages.

Non-final Office Action dated Jan. 16, 2024, in connection with U.S. Appl. No. 17/646,656, 7 pages.

Notice of review opinion dated Jan. 11, 2024, in connection with Taiwanese Application No. 11320040860, 16 pages.

Supplementary European Search Report dated Jan. 16, 2024, in connection with European Application No. 20865142.2, 16 pages.

International Search Report and Written Opinion for International Application No. PCT/US2020/050013, Search completed Nov. 4, 2020, mailed Nov. 30, 2020, 10 pages.

International Search Report and Written Opinion for International Application No. PCT/US2020/051870, Search completed Jan. 6, 2021, mailed Feb. 4, 2021, 13 pages.

International Search Report and Written Opinion for International Application No. PCT/US2020/033769, Completed Jul. 15, 2020, mailed Sep. 2, 2020, 30 pages.

International Search Report and Written Opinion for International Application No. PCT/US2020/051879, Search completed Nov. 24, 2020, mailed Dec. 14, 2020, 8 pages.

International Search Report and Written Opinion for International Application No. PCT/US2020/040788, Search completed Nov. 19, 2020, mailed Dec. 22, 2020, 14 pages.

Non-final Office Action for U.S. Appl. No. 17/027,626, dated Jul. 20, 2021, 20 pages.

Notice of Allowance for U.S. Appl. No. 17/142,889, dated Jul. 1, 2021, 7 pages.

Notice of Allowance for U.S. Appl. No. 17/027,626, dated Sep. 28, 2021, 7 pages.

Corrected Notice of Allowability for U.S. Appl. No. 17/027,626, dated Jan. 18, 2022, 7 pages.

Notice of Allowance for U.S. Appl. No. 16/920,375, dated Dec. 17, 2021, 9 pages.

Notice of Allowance for U.S. Appl. No. 17/491,217, dated Nov. 29, 2021, 10 pages.

Cropley, Steve, "Williams reveals electric vehicle skateboard chassis," Autocar Industry News, Haymarket Media Group, Sep. 6, 2017, 5 pages.

Decision to Grant a Patent dated Jun. 20, 2023, in connection with Japanese Application No. 2021-568853, 6 pages.

Notice of Allowance dated Jul. 6, 2023, in connection with U.S. Appl. No. 16/879,235, 10 pages.

Supplementary European Search Report dated Dec. 5, 2023, in connection with European Application No. 20864821.2, 13 pages.

Office Action dated Nov. 2, 2023, in connection with Canadian Application No. 3,155,162, 7 pages.

Non-final Office Action dated Dec. 20, 2023, in connection with U.S. Appl. No. 17/646,653, 14 pages.

Non-final Office Action dated Sep. 14, 2022, in connection with U.S. Appl. No. 17/016,299, 14 pages.

Notice of Allowance dated Nov. 7, 2022, in connection with U.S. Appl. No. 17/016,299, 5 pages.

Notice of Allowance dated Oct. 31, 2022, in connection with U.S. Appl. No. 17/027,600, 7 pages.

Non-final Office Action dated Oct. 7, 2022, in connection with U.S. Appl. No. 17/027,600, 7 pages.

Non-final Office Action dated Oct. 20, 2022, in connection with U.S. Appl. No. 16/879,235, 11 pages.

Notice of Reasons for Refusal dated Nov. 22, 2022, in connection with Japanese Application No. 2021-568853, 12 pages.

Office Action dated Apr. 12, 2023, in connection with Canadian Application No. 3,153,952, 3 pages.

International Preliminary Report on Patentability dated Mar. 9, 2022 in connection with International Patent Application No. PCT/US2020/050013, 9 pages.

Office Action dated Jun. 7, 2022 in connection with U.S. Appl. No. 16/879,235, 14 pages.

Office Action dated Aug. 10, 2023, in connection with Canadian Application No. 3,163,502, 3 pages.

Office Action dated Aug. 15, 2023, in connection with Canadian Application No. 3,163,499, 6 pages.

Notification of the First Office Action dated Aug. 16, 2023, in connection with Chinese Patent Application No. 202080080584.1, 20 pages.

Commissioners Notice—Application Found Allowable dated Feb. 19, 2024, in connection with Canadian Application No. 3,145,383, 1 page.

Commissioners Notice—Application Found Allowable dated Feb. 8, 2024, in connection with Canadian Application No. 3,153,952, 1 page.

Notification of Second Office Action dated Mar. 5, 2024, in connection with Chinese Application No. 202080073120.8, 6 pages.

Notification of Second Office Action dated Mar. 5, 2024, in connection with Chinese Application No. 202080080584.1, 14 pages.

International Search Report and Written Opinion of the International Searching Authority dated Mar. 8, 2024, in connection with International Application No. PCT/US2023/080393, 9 pages.

Final Office Action dated Mar. 12, 2024, in connection with U.S. Appl. No. 17/646,653, 17 pages.

Commissioner's Notice—Application Found Allowable dated Feb. 12, 2024, in connection with Canadian Application No. 3,163,499, 1 page.

Office Action dated Feb. 13, 2023 in connection with Canadian Patent Application No. 3,145,383, 4 pages.

Notice of Reasons for Refusal dated Mar. 14, 2023 in connection with Japanese Patent Application No. 2021-568853, 4 pages.

Non-Final Office Action dated Mar. 24, 2023 in connection with U.S. Appl. No. 18/052,460, 8 pages.

Notification of the First Office Action dated Aug. 29, 2023, in connection with Chinese Patent Application No. 202080052476.3, 20 pages.

Notification of the First Office Action dated Sep. 1, 2023, in connection with Chinese Patent Application No. 202080073120.8, 17 pages.

Notification of the First Office Action dated Aug. 30, 2023, in connection with Chinese Patent Application No. 202080048116.6, 20 pages.

Notice of Allowance dated Sep. 12, 2023, in connection with Canadian Application No. 3,141,572, 1 page.

Office Action dated Jan. 12, 2023 in connection with Canadian Patent Application No. 3,141,572, 3 pages.

Supplementary European Search Report dated Dec. 9, 2022 in connection with European Patent Application No. 20920386.8, 27 pages.

Notice of Reasons for Refusal dated Dec. 13, 2022 in connection with Japanese Patent Application No. 2021-577866, 16 pages.

Final Office Action dated Feb. 1, 2023 in connection with U.S. Appl. No. 16/879,235, 12 pages.

Notification of the Second Office Action dated Jan. 18, 2024, in connection with Chinese Application No. 202080048116.6, 14 pages.

Notice of Grant dated Apr. 1, 2024, in connection with Chinese Application No. 202080052476.3, 8 pages.

(56)          References Cited

OTHER PUBLICATIONS

Communication pursuant to Article 94(3) EPC dated Feb. 21, 2024, in connection with European Application No. 20920386.8, 10 pages.
Supplemental European Search Report dated Nov. 8, 2023, in connection with European Application No. 20863787.6, 10 pages.
Supplemental European Search Report dated Nov. 8, 2023, in connection with European Application No. 20865403.8, 13 pages.
Non-final Office Action dated Jul. 17, 2024, in connection with U.S. Appl. No. 17/646,653, 15 pages.
Notice of Reasons for Refusal dated Jun. 25, 2024, in connection with Japanese Application No. 2023-101515, 9 pages.
Notice of Allowance dated Jun. 19, 2024, in connection with Taiwanese Application No. 109116751, 3 pages.
Application Found Allowable dated May 24, 2024, in connection with Canadian Application No. 3,155,162, 1 page.
Rejection Decision dated Nov. 11, 2024, in connection with Chinese Application No. 202080073120.8, 28 pages.
Notification to Grant Patent Right for Invention dated Dec. 1, 2024, in connection with Chinese Application No. 202080048116.6, 3 pages.
Notice of Reasons for Refusal dated Dec. 3, 2024, in connection with Japanese Application No. 2023-101515, 8 pages.

* cited by examiner

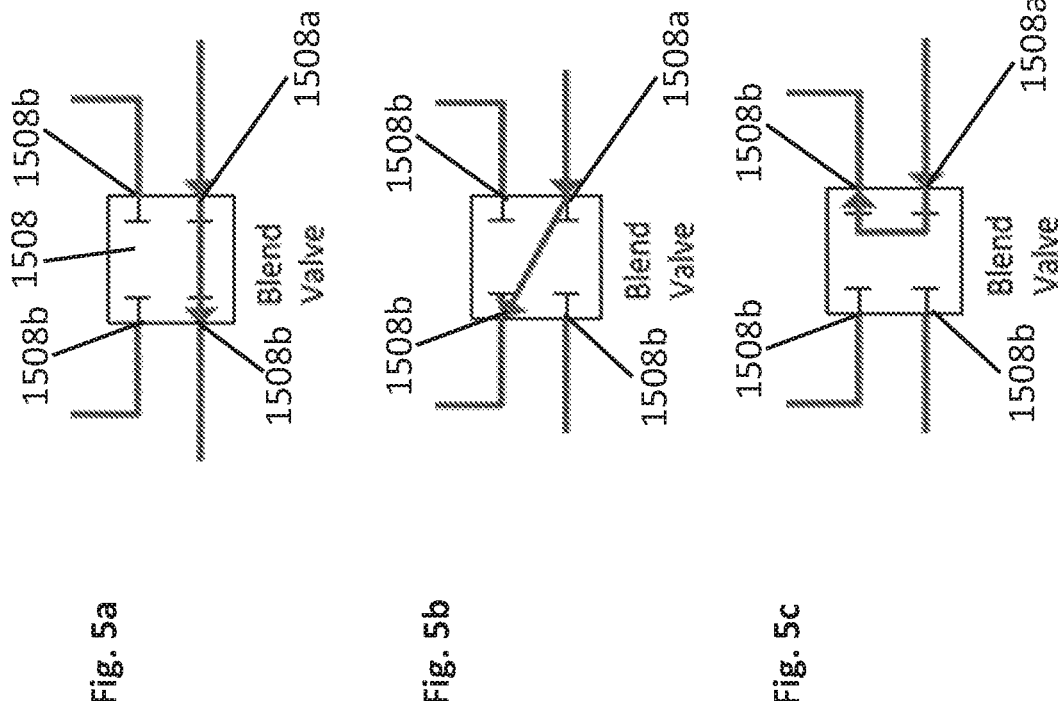
Fig. 5a
Fig. 5b
Fig. 5c
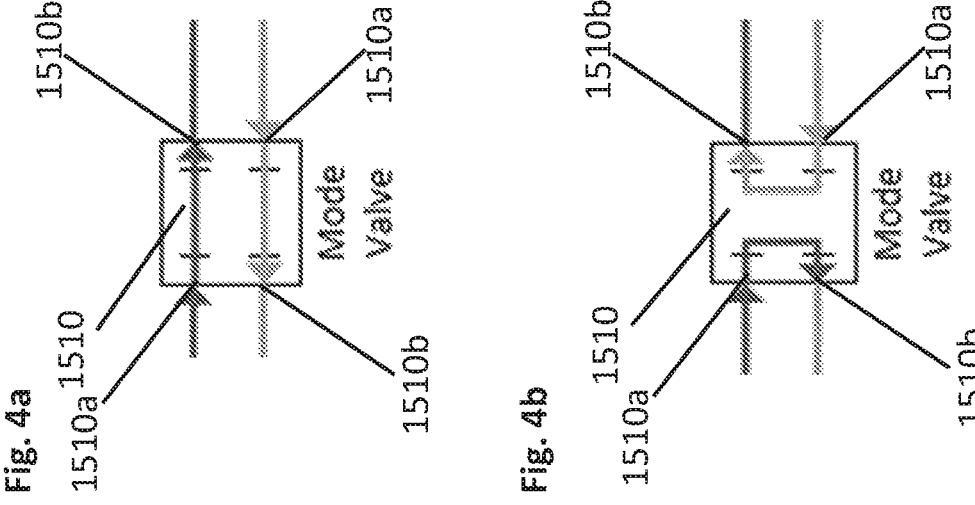
Fig. 4a
Fig. 4b

726

900

902

904

906

904

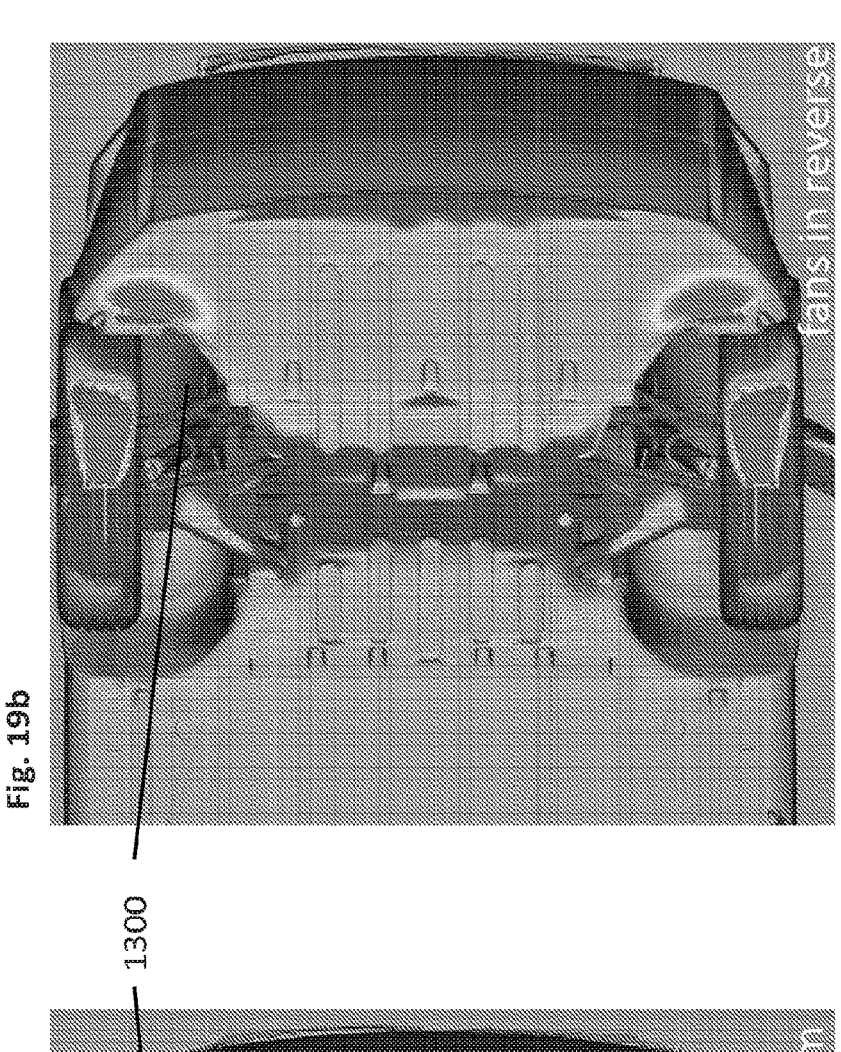
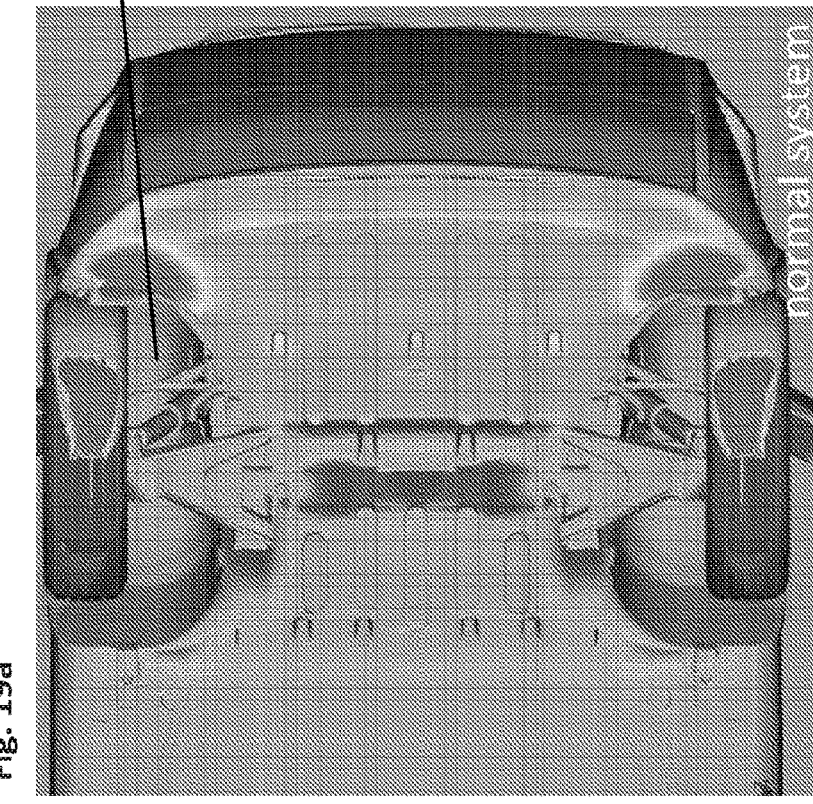
Fig. 19b
Fig. 19a

2104

2200

2102

THERMAL MANAGEMENT SYSTEMS FOR ELECTRIC VEHICLE PLATFORMS

CROSS-REFERENCE TO RELATED APPLICATIONS

This application is a 371 National Stage of International Application No. PCT/US2020/051505, filed Sep. 18, 2020, which claims priority to U.S. Provisional Application Nos. 62/902,043, filed Sep. 18, 2019, and 62/902,052, filed Sep. 18, 2019, the disclosures of which are herein incorporated by reference in their entirety.

TECHNICAL FIELD

The present invention relates generally to heating, ventilation, and air conditioning systems for electric vehicles, their design, methods of manufacture, component systems, and materials.

BACKGROUND

Automobile vehicles may generally be described in relation to a body or cabin, which are designed to enclose the passengers, and the various electrical, mechanical and structural systems, subsystems, and components that allow the vehicle to operate. One of the systems crucial to both the operation of the functional elements of a vehicle and the comfort of passengers located within the cabin of the vehicle is thermal management. Such thermal management typically involve one system for maintaining suitable operational temperatures for components of the drive train, such as, the motor and transmission, and a second separate heating, ventilation, and air conditioning (HVAC) system for cooling and heating the passenger cabin.

Conventional internal combustion vehicles have several advantages in implementing such thermal management systems. This is because internal combustion engines produce a great deal of waste heat that can be used to heat the vehicle cabin without the need for additional heating elements or the use of extra power resources. The engine can also be used to drive compressors and other elements necessary for the operation of air conditioning cooling systems.

Recent advances in electric motor and battery technologies have made electric vehicles practical to manufacture. While electric vehicles have a number of advantages over conventional internal combustion vehicles in drive train efficiency, that drive train efficiency also means that the amount of excess waste heat produced is significantly less than that produced by internal combustion engines. The lack of excess heat, while a desirable byproduct of the efficiency of the electric vehicle drivetrain, is problematic when it comes to the operation of conventional HVAC systems, which require the production and mixing of hot and cold air to obtain a desired temperature within the vehicle cabin. Moreover, one of the advantages of electric vehicles is the ability to create non-traditional cabin designs, for example, vehicle cabins with large open cabin areas and without many of the internal structures such as dashboards and traditional seating configurations that provide areas in which ducting can be fitted to direct this mixed air to the various zones of the vehicle cabin.

Further, recent advances in electric motor and battery technologies have made electric vehicles practical to manufacture. While electric vehicles have a number of advantages over conventional internal combustion vehicles in drive train efficiency, that drive train efficiency also means that the amount of excess waste heat produced is significantly less than that produced by internal combustion engines. In addition, electric vehicles incorporating battery power sources have the additional disadvantage of needing to regulate the temperature of these battery elements. In particular, batteries operate best within a limited temperature range. Accordingly, it is necessary to provide systems both for cooling and heating of such battery elements. In some cases it may even be necessary to provide heat for the batteries and separate cooling for the drive train and/or passenger cabin. Alternatively, some driving conditions may require cooling of battery elements and simultaneous heating of the passenger cabin. The requirements of having separate thermal management systems for HVAC, drive train and battery subsystems, sometimes operating in opposite modes, can create large inefficiencies in such electric vehicles.

SUMMARY

Many embodiments are directed to electric vehicle platforms, their design, methods of manufacture, component systems, and materials.

Various embodiments are directed to an integrated thermal management system including:

a drivetrain cooling loop including a drivetrain fluid conduit fluidly interconnecting at least a first cooling element and one or more heat producing drivetrain components such that drivetrain coolant fluid flows therebetween;

an energy storage system heating and cooling loop including an energy storage fluid conduit fluidly interconnecting one or more energy storage elements such that energy storage coolant fluid flows therebetween;

a heating, ventilation, and air conditioning (HVAC) heating and cooling loop including an HVAC fluid conduit fluidly interconnecting at least a compressor, a condenser, a first expansion valve interconnected with an evaporator, and a second expansion valve interconnected with a chiller such that a HVAC refrigerant may flow therebetween, the chiller is disposed in thermal communication with the energy storage fluid conduit;

a heater core disposed in thermal communication with the evaporator; and a blend valve fluidly interconnecting the drivetrain fluid conduit, the heater core, the first cooling element, and a bypass conduit configured to bypass the first cooling element and the heater core, the second expansion valve is configured such that thermal cooling from the HVAC heating and cooling loop is transferred into the energy storage coolant fluid through the chiller, and the blend valve is configured to perform at least one of:

transfer heat waste from the drivetrain cooling loop into the energy storage coolant fluid through the bypass conduit, transfer heat waste from the drivetrain cooling loop or the energy storage system heating and cooling loop into the HVAC refrigerant through the heater core, or transfer heat waste from the drivetrain cooling loop into the energy storage coolant fluid through the bypass line.

In various other embodiments, the first cooling element is a radiator.

In still various other embodiments, the integrated thermal management systems further includes at least a drivetrain pump in fluid communication with the drivetrain fluid conduit, and an energy storage pump in fluid communication with the energy storage fluid conduit.

In still various other embodiments, the integrated thermal management systems further includes a mode valve fluidly interconnecting the drivetrain fluid conduit and energy storage fluid conduit such that drivetrain coolant fluid and/or energy storage coolant fluid may be directed between the drivetrain cooling loop and energy storage heating and cooling loop.

In still various other embodiments, the blend valve is configured to transfer all expelled waste heat from the drivetrain cooling loop into the energy storage coolant fluid through the bypass conduit.

In still various other embodiments, the blend valve is configured to transfer all expelled waste heat from the drivetrain cooling loop into the HVAC heating and cooling loop through the heater core.

In still various other embodiments, the blend valve is configured to transfer all expelled waste heat from the drivetrain cooling loop into the first cooling element.

In still various other embodiments, the blend valve outputs the drivetrain coolant fluid to two or more of the heater core, the first cooling element, and the bypass conduit.

In still various other embodiments, the blend valve is configured to transfer heat waste from the drivetrain cooling loop and energy storage system heating and cooling loop into the heater core.

Various embodiments are directed to an electric vehicle including a vehicle cabin; and one of the integrated thermal management systems discussed above. In the electric vehicle, the heater core and the evaporator may be in thermal connection with the vehicle cabin.

Further, many embodiments are directed to flow-based HVAC systems for electric vehicles, their design, methods of manufacture, component systems, and materials.

Various embodiments are directed to HVAC systems for a vehicle including:

a first HVAC component disposed in a front portion of a vehicle cabin and including at least a first blower unit and at least one heating element and having at least one air intake communicative with an environment external to the vehicle cabin and at least one air vent communicative with an inner compartment of the vehicle cabin; and a second HVAC component disposed in a rear portion of the vehicle cabin and including at least a second blower unit and at least one cooling element and having at least one air intake communicative with the inner compartment of the vehicle cabin and at least one air vent communicative with the inner compartment of the vehicle cabin;

the second HVAC component is configured to cool the vehicle cabin and the first HVAC component is configured to heat the vehicle cabin.

In yet various embodiments, the HVAC system further includes:

a first air duct network interconnected with the at least one air vent of the first HVAC component and configured to communicate heated air at least to a front portion and a rear portion of the vehicle cabin; and a second air duct network interconnected with the at least one air vent of the second HVAC component and configured to communicate cooled air at least to the front portion and rear portion of the vehicle cabin.

In still yet various embodiments, the first HVAC component further comprises at least one cooling element, and a first cooling air duct network interconnected with the at least one air vent of the first HVAC component configured to communicate cooled air to the front portion of the vehicle cabin.

In still yet various embodiments, the second duct network is configured to extend above the level of a floor of the vehicle cabin.

In still yet various embodiments, at least a portion of the second duct network is arranged within a ceiling portion of the vehicle cabin.

In still yet various embodiments, the vents of the first and second HVAC components are each configured to distribute variable volumes of air to at least two separate portions of the vehicle cabin.

In still yet various embodiments, the at least one air intake of the first HVAC component is further communicative to the interior of the vehicle cabin.

In still yet various embodiments, at least the first HVAC component further comprises an air filtration system disposed between the at least one air intake and the blower unit.

In still yet various embodiments, the second HVAC component further comprises another air filtration system disposed between the at least one air intake of the second HVAC component and the second blower unit.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 4a and 4b illustrate mode valve configurations in accordance with embodiments.

FIGS. 5a to 5c illustrate blend valve configurations in accordance with embodiments.

FIGS. 19a and 19b illustrate images of aerodynamic flow studies conducted on the underside of a vehicle in normal (FIG. 19a) and reversible (FIG. 19b) fan configurations in accordance with embodiments.

DETAILED DESCRIPTION

Figure 1A:
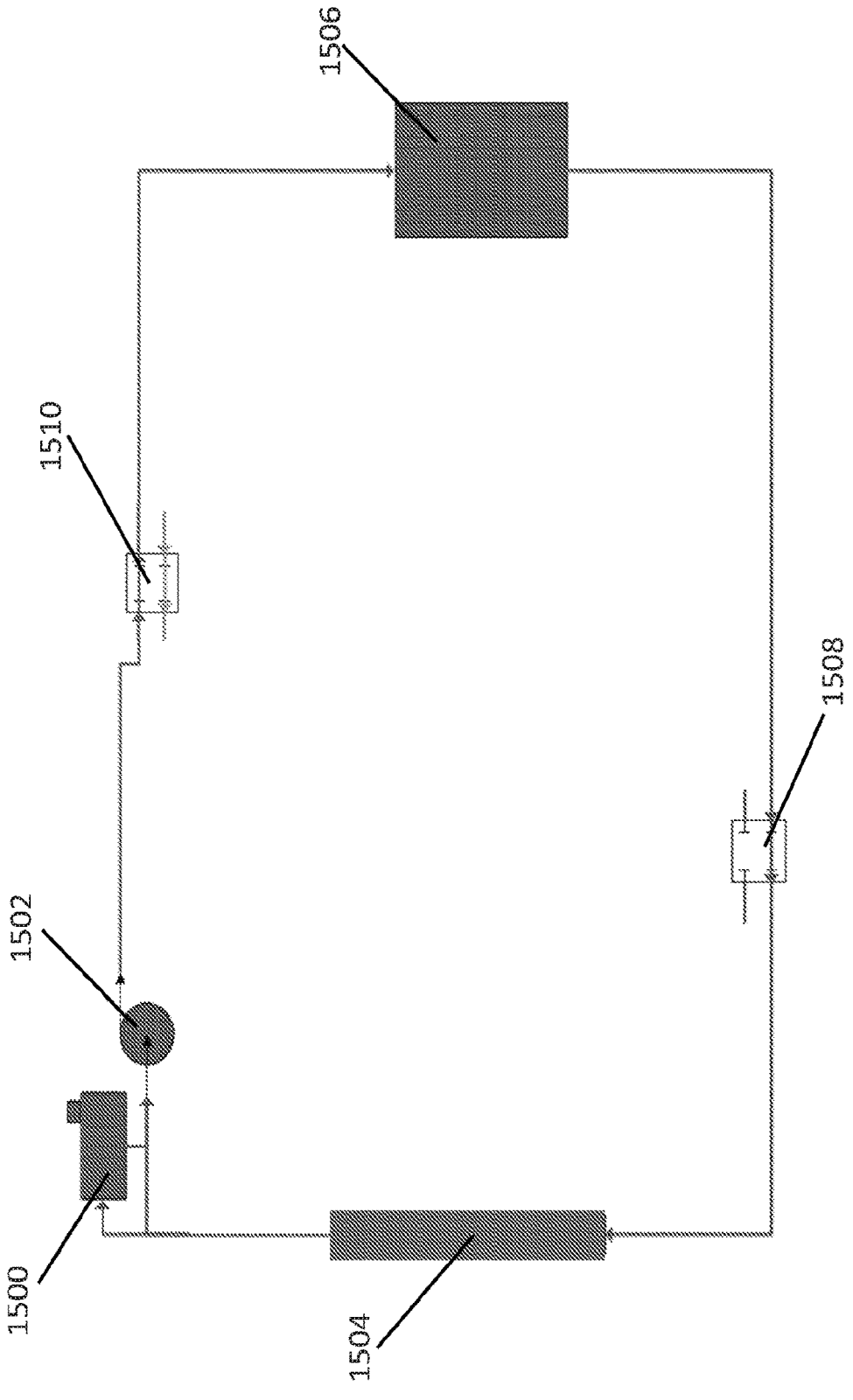
FIG. 1a illustrates a drivetrain thermal management system in accordance with embodiments.

Turning now to the drawings, many embodiments of thermal management architectures and systems incorporate thermal management cycles for one or more of drive train, energy storage and passenger cabin systems. Various embodiments are configured such that the flow of heating and cooling coolant fluids through such thermal management cycles may be combined in various configurations. Several embodiments incorporate systems having thermal management cycles for drive train (e.g., motor, transmission, etc.) and energy storage (e.g., battery) that may be operated through a combined heating/cooling fluid loop. Embodiments are also directed to systems having thermal management cycles for a HVAC heating/cooling loop that is fluidly isolated, but thermally coupled to one or both drive train and energy storage. In various such embodiments, heating/cooling fluid loops for these thermal management cycles may be linked through one or more valves such that the fluid flow through such cycles may be combined together, isolated from each other or mixed in various desired configurations.

Specific functional components and systems in accordance with many embodiments of thermal management cycles may include any number of suitable components including, for example, pumps, condensers, radiators, evaporators, heaters, blowers, fans, fluid reservoirs, and valves and fluid conduits suitable to interlink these components. Functional vehicle components cooled by such thermal management cycles in accordance with various embodiments may include drive train systems, which may comprise one or more motor and interrelated transmission components, and energy storage components, which may include battery elements. HVAC systems incorporated into thermal cycles in accordance with embodiments may be arranged in any suitable configuration and may include the use of evaporators, condensers, radiators, heater cores, auxiliary air heaters, blowers, etc. in suitable combination such that cooling and heating of the passenger compartment can be achieved.

The described apparatuses, systems, and methods should not be construed as limiting in any way. Instead, the present disclosure is directed toward all novel and nonobvious features and aspects of the various disclosed embodiments, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, systems, and apparatuses can be used in conjunction with other systems, methods, and apparatus.

Electric vehicles, and particularly battery electric vehicles (BEV) with large capacity batteries, can have several thermal management heating and cooling loops. Most BEVs have an HVAC loop to provide thermal comfort for the occupants in the vehicle cabin and provide cooling for the high voltage battery if ambient temperatures are higher than the desired battery or battery cooling fluid temperatures (for liquid cooled battery systems). To cool the battery below the ambient temperature a chiller or liquid-to-liquid heat exchanger may be used. This heat exchanger transfers thermal energy from the battery cooling fluid to a refrigerant. Some BEVs also have the ability to use a low temperature radiator for cooling scenarios where the desired component or fluid temperature is below the ambient temperature. Drivetrain systems (electric motors, gearboxes, high voltage inverters and other power electronics) have higher component temperature limits than batteries and are therefore often cooled by a separate loop with a high temperature radiator. This loop is referred to as drivetrain cooling loop in this disclosure. For heating of the cabin or the high voltage battery, electric vehicles often carry a high voltage fluid or air heater.

Traditional combustion engine vehicles often use the waste heat of the combustion engine to warm the cabin; however, due to the high efficiency of the electric propulsion drive train system of such vehicles, the waste heat of the powertrain system is typically not sufficient by itself to warm the cabin and/or help to defrost the windshield. In certain scenarios, one thermal management loop or system might require cooling while another loop or system might require heating. As an example:

Driving in cold ambient temperatures while heating the cabin. Depending on the drive cycle, the high voltage (HV) inverter, electric motor and gearbox might generate enough heat that active cooling is needed. In conventional thermal management architectures for electric vehicles, the powertrain and the cabin loop are not connected in a way that thermal energy (heat) can be exchanged, and as a result it is necessary to cool the powertrain while heating the cabin.

Driving after an electric vehicle has been sitting in cold ambient temperatures. Depending on the drive cycle, the HV inverter, electric motor and gearbox might generate enough heat that again active cooling is needed. However, if the high voltage battery needs to be warmed, to optimize performance for example, then conventional thermal management architectures would require one system to cool the powertrain while another heats the battery.

The various embodiments described herein illustrate thermal management architectures and systems addressing the underlying inefficiencies of traditional systems. Embodiments illustrate thermal management systems for powertrain, battery and HVAC that are fully integrated and allow for functional interconnection and disconnection of such systems in response to operational and environmental conditions.

Thermal management system embodiments may also be interconnected through a set of valve systems. Further, it will be understood that thermal management systems in this context refer to heating/cooling loops for use in drivetrains, energy storage, and HVAC systems, and all components thereof. In many embodiments, components may include, for example, condensers, radiators, evaporators, blowers, heaters, etc. It will also be understood that while certain arrangements of such components and systems are shown in the embodiments, thermal management systems may be arranged in many suitable configurations. In other words, embodiments described herein illustrate thermal management architectures, systems and components that may be adaptable to a variety of functional systems and vehicles.

In many embodiments thermal management systems comprise a set of three interconnected heat/cool loops, including at least an HVAC loop configured to supply heating and cooling to a passenger compartment, a drivetrain loop configured to supply heating and cooling to the functional drivetrain components (e.g., motor, transmission, etc.), and an energy storage loop configured to supply heating and cooling to the functional energy storage system (e.g., high voltage battery, inverter, etc.). As shown, these thermal management heating and cooling loops comprise suitable arrangements of functional heat/cooling components, and these components and loops can be configured such that heating/cooling fluid can be shared across various heating and cooling loops or separated as required by the specific operational and environmental conditions. Example HVAC systems will be described below in connection with FIGS. 10 to 14.

The thermal management system for the drivetrain is required to cool the drivetrain components (e.g., motor, transmission, etc.) to ensure that the components do not reach temperatures exceeding their operational temperature during operation. As shown in FIG. 1a, in various embodiments a drivetrain cooling loop may comprise a coolant reservoir 1500, a fluid pump 1502, a heat exchanger 1504 (e.g., cooling radiator, etc.), and drive train components 1506 (e.g., motor, transmission, etc.). All of the drivetrain cooling loop may be fluidly connected through a set of fluid conduits and/or valves. For example, a blend valve 1508 may be placed between the drive train components 1506 and the heat exchanger 1504 and a mode valve 1510 may be between the drive train components 1506 and the fluid pump 1502. During operation of such a system, the coolant fluid would be pumped from the fluid reservoir 1500 through the drivetrain components 1506 where excess heat would be taken up by the coolant fluid and then the heated fluid would pass through a cooling system, such as, for example, a heat exchanger 1504 where the excess heat would be passed into the external environment. The chilled coolant fluid would then be recirculated back through the drivetrain components and the process repeated such that a suitable operating temperature can be maintained in the drivetrain.

Figure 1B:
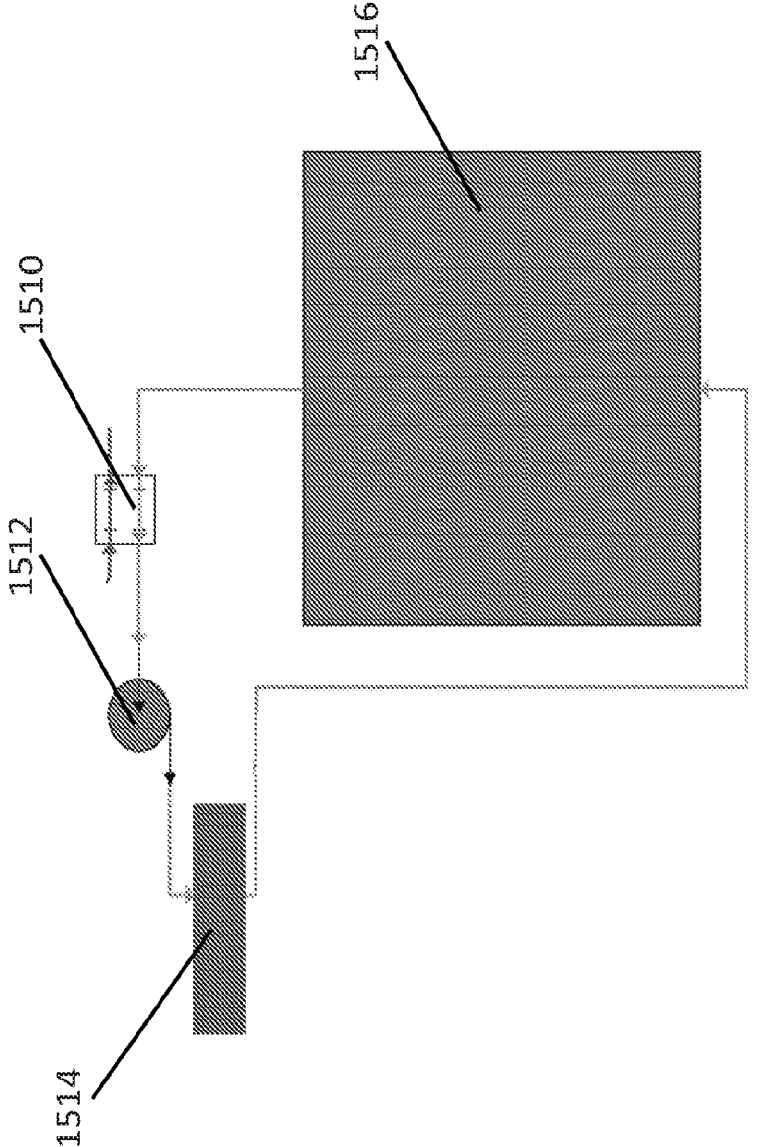
FIG. 1b illustrates an energy storage thermal management system in accordance with embodiments.

The thermal management system for the energy storage system is required to both cool, and in cold ambient conditions, to heat the energy storage components (e.g., batteries) to ensure that the components remain within a suitable operational temperature range. As shown in FIG. 1b, embodiments of an energy storage heating/cooling loop may comprise a fluid pump 1512 (e.g. a battery pump), temperature controller 1514 (e.g. heating elements, cooling elements, chiller, etc.), and energy storage components 1516 (e.g., battery elements). The components of the energy storage heating/cooling loop may be interconnected through a set of suitable fluid components, valves, etc. capable of circulating a coolant fluid therethrough. For example, a mode valve 1510 may be between the energy storage components 1516 and the fluid pump 1512. The mode valve may be shared a shared component between the energy storage heating/cooling loop and the drivetrain cooling loop as both described and illustrated below in FIG. 3.

Figure 1C:
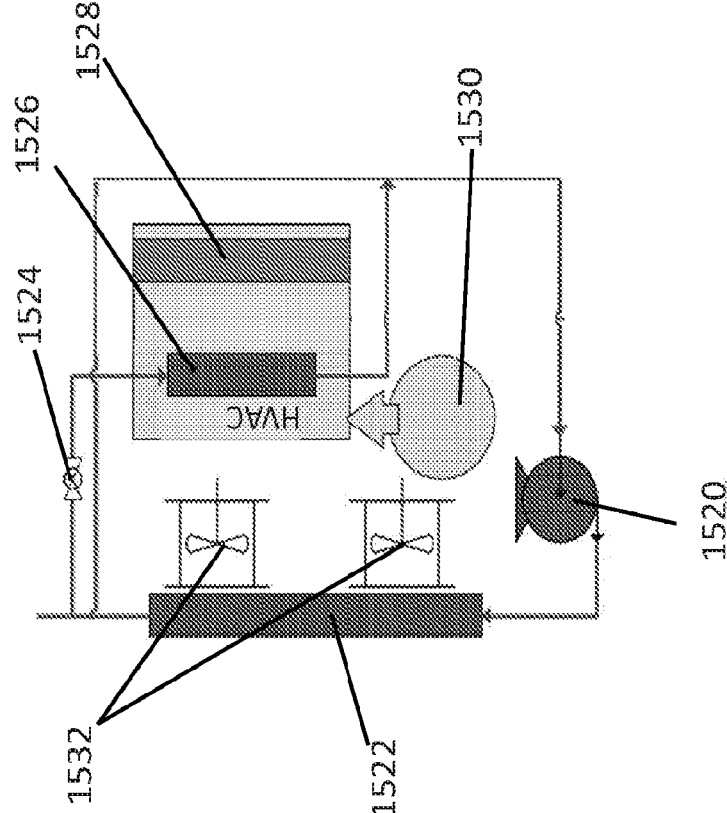
FIG. 1c illustrates an HVAC thermal management system in accordance with embodiments.

Finally, as shown in FIG. 1c, embodiments of an HVAC heating/cooling loop may comprise all suitable components for heating and cooling of the passenger compartment, including but not limited to, a compressor 1520, a heat exchanger 1522 (e.g., a condensing coil or condenser), one or more expansion valves 1524, one or more evaporators 1526 (e.g. evaporator coils), and one or more auxiliary heaters 1528. The HVAC heating/cooling loop may further include other components such as one or more suitable blowers 1530, fans 1532, fluid conduits and/or valves. During operation of such a system, a refrigerant in a gaseous state is pumped through the compressor 1520, which compresses the refrigerant gas up to a high pressure and temperature. This high-pressurized refrigerant gas is then passed through the heat exchanger 1522 where it loses energy (heat) to the outside, cools, and condenses into its liquid phase. The expansion valve 1524 or meter valve regulates the refrigerant liquid to flow at a desired rate. The expansion valve 1524 may also be referred to as a meter valve. The liquid refrigerant is returned to the evaporator 1526 where it is allowed to evaporate. The evaporator 1526 may also be a suitable heat exchanger which performs the function of allowing the liquid refrigerant to evaporate. As the liquid refrigerant evaporates it absorbs energy (heat) from the inside air, returns to the compressor 1520, and repeats the cycle. In the process, heat is absorbed from inside the passenger compartment and transferred to the exterior environment through the condenser 1522 which cools the vehicle cabin through the evaporator 1526.

Figure 2:
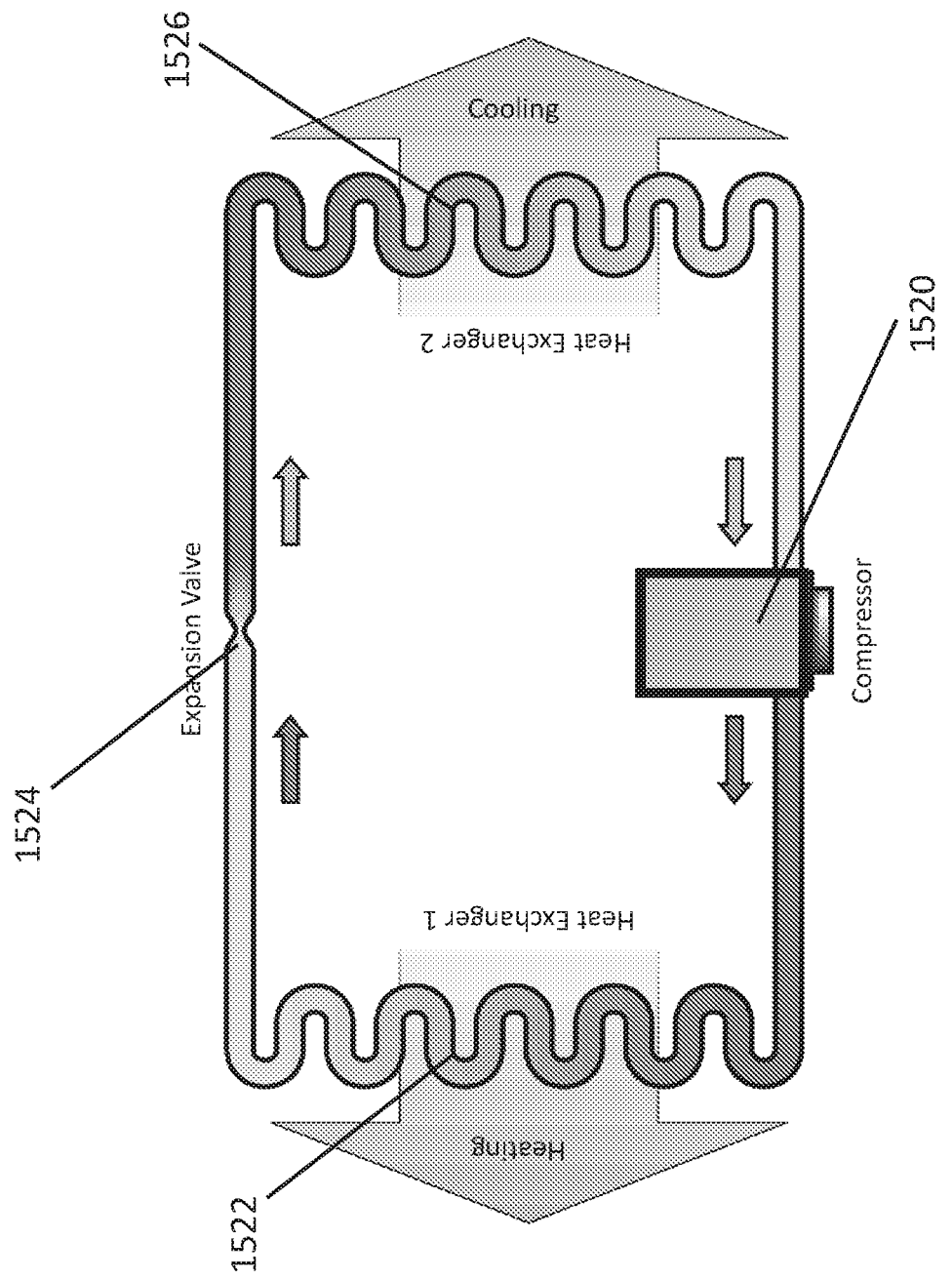
FIG. 2 illustrates an HVAC cycle in accordance with embodiments.
Figure 16:
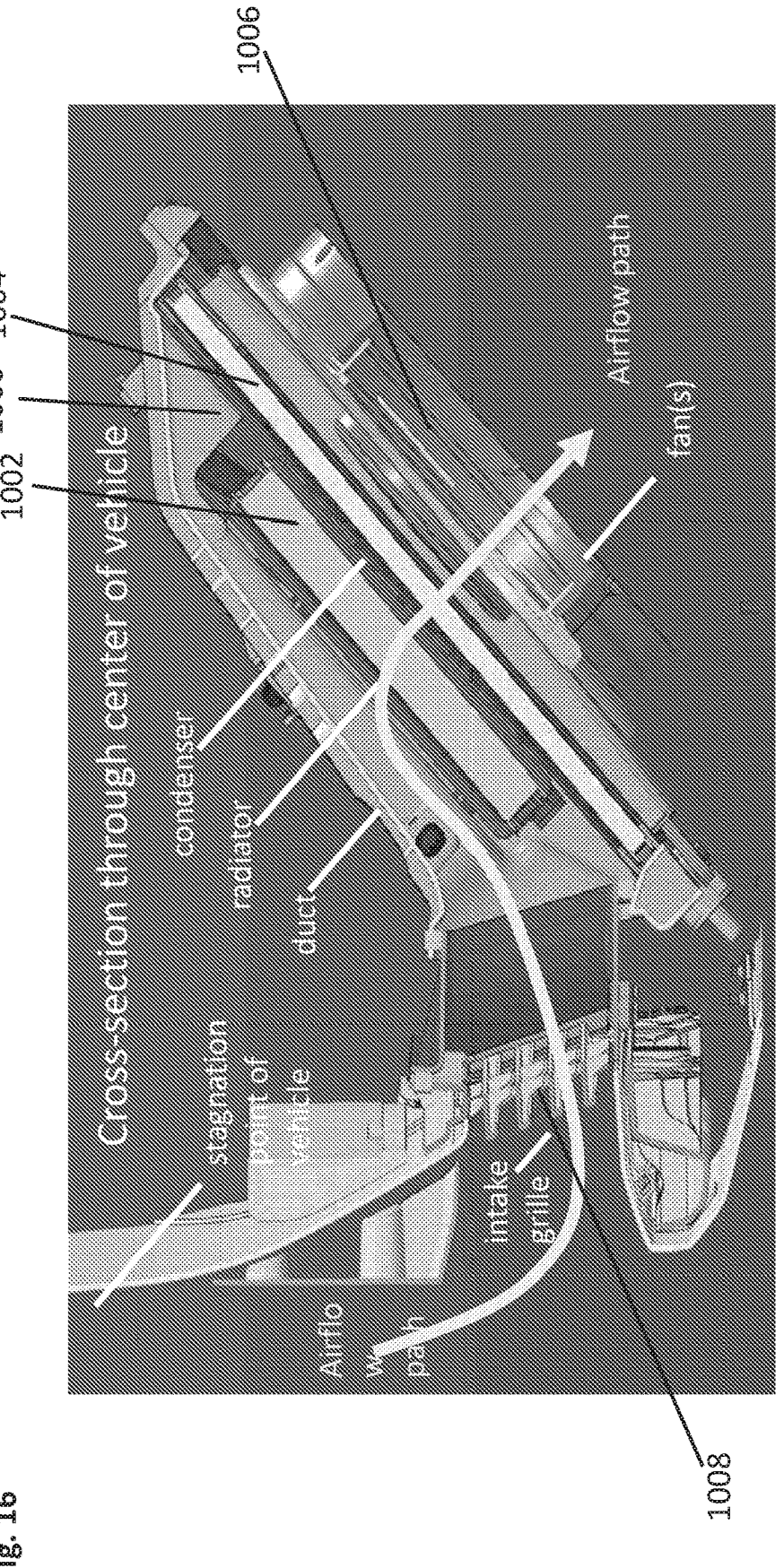
FIG. 16 illustrates a fan configuration in accordance with the prior art.

The system of FIG. 1*c* is schematically shown in FIG. 2. A first heat exchanger 1522 (e.g. a condenser) connects to an expansion valve 1524. The expansion valve 1524 then connects to a second heat exchanger 1526 (e.g. an evaporator). A refrigerant flows from the first heat exchanger 1522 to the second heat exchanger 1526 through the expansion valve 1524. As shown in FIG. 16, the expansion valve 1524 allows the refrigerant to expand and thus lower in pressure. The lower pressure changes the refrigerant from a liquid to a vapor. This vapor allows the refrigerant to absorb heat in the second heat exchanger 1526 and simultaneously cool the cabin of the vehicle. Further, as illustrated in FIG. 2, the second heat exchanger 1526 is connected to the first heat exchanger 1522 through a compressor 1520. The compressor 1520 raises the pressure of the refrigerant which changes the state of the refrigerant from a vapor to a liquid which enables the first heat exchanger 1522 to expel heat out of the refrigerant. It is noted that this schematic representation does not include all components of the HVAC heating/cooling loop and more components may be present to aid efficiency of the loop.

Figure 3:
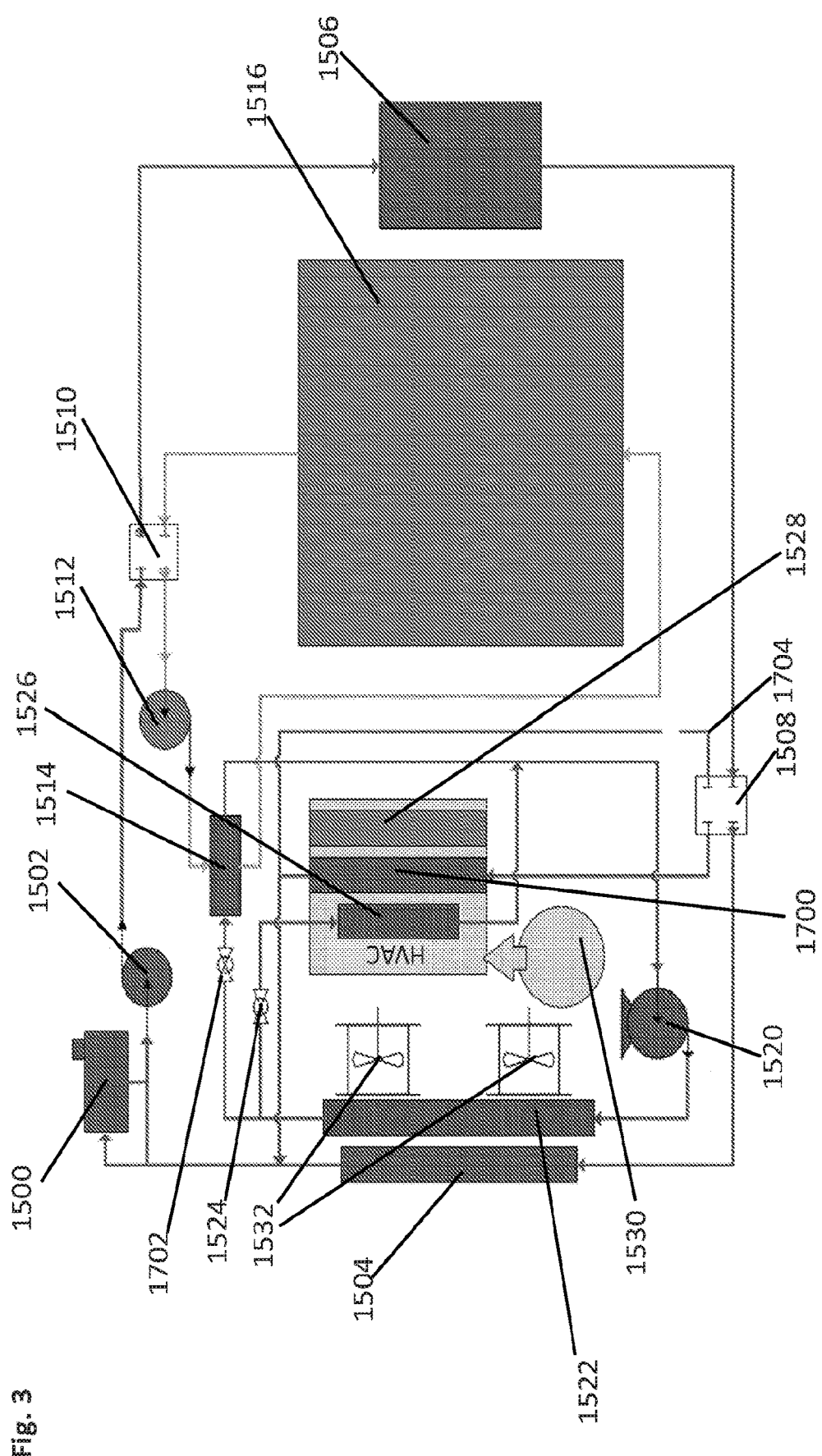
FIG. 3 illustrates an integrated thermal management system in accordance with embodiments.

Although the above discussion has focused on individual thermal management system heating/cooling loops in accordance with embodiments, it will be understood that such thermal management system embodiments may also be interconnected through a set of valve systems. FIG. 3 illustrates an exemplary system including a drivetrain cooling loop, an energy storage heating/cooling loop, and an HVAC heating/cooling loop into a single system. As shown, embodiments may incorporate two valves, a shared mode valve 1510 fluidly interconnecting the drivetrain cooling loop and the energy storage heating/cooling loop, and a shared blend valve 1508 interconnecting the HVAC heating/cooling loop and drivetrain cooling loop. The blend valve 1508 may be connected to a heater core 1700, the heat exchanger 1504, and a bypass line 1704. Specifically, as shown, in some embodiments the HVAC heating/cooling loop is connected with the drivetrain cooling loop through a heater core 1700 inside the HVAC unit. The bypass line 1704 bypasses both the heater core 1700 and the heat exchanger 1504 and may be used in cases when it is desirable to transfer heat from the drivetrain into the energy storage components. Further, the temperature controller 1514 of the energy storage heating/cooling loop is connected is connected to the condenser 1522 through an expansion valve 1702. The expansion valve 1702 connected to the condenser 1522 is connected to the condenser in parallel with the expansion valve 1524 connected to the evaporator 1526. Thermal management systems according to such embodiments allow for waste heat, generated for example by the powertrain (including at least one of a HV inverter, an electric motor, a gear box and potentially other electronic modules), to be used to support the heating of the passenger compartment and/or the energy storage system (e.g., high voltage battery) if needed. The system illustrated in FIG. 3 shares many identically numbered features from FIGS. 1*a* to 1*c* and description of these features will not be repeated.

In various embodiments, the mode valve may be a 4 port/2-way valve, and the blend valve may be a 4 port/3-way valve. FIGS. 4*a* and 4*b* illustrates two operations of an exemplary mode valve 1510 including 2 inlets 1510*a* and 2 outlets 1510*b* which make 4 ports and is designed to combine or disconnect the energy storage heating/cooling loop and the drivetrain cooling loop (as will be described in greater detail in FIGS. 6*a* to 6*d*, below). Disconnecting the drivetrain cooling loop and the energy storage heating/cooling loop, as shown in FIG. 4*a*, is referred to as parallel mode where the fluid for each loop will flow separately. Combining these drivetrain and battery loops, as shown in FIG. 4*b*, is referred to as series mode where the cooling fluid flows in series through the energy storage heating/cooling loop and the drivetrain cooling loop.

Further, FIGS. 5*a* to 5*c* illustrate an exemplary blend valve 1508 including one inlet 1508*a* and 3 outlets 1508*b*. One outlet of the 3 outlets 1508*b* may be connected to the radiator 1504, a second outlet of the 3 outlets 1508*b* may be connected to the heater core 1700, and a third outlet of the 3 outlets 1508*b* bypasses both radiator 1504 and heater core 1700 and connects to the fluid pump 1502. The blend valve 1508 may also be positioned downstream of the radiator 1504 and heater core 1700, in which case the blend valve 1508 would be configured to have 3 inlets and one outlet depending on the flow direction of the coolant fluid. The blend valve 1508 may also be operated to blend or split the fluids in order to have a desired amount of fluid going through the heat exchanger 1504, the heater core 1700 and/or a bypass line 1704 bypassing both the heat exchanger 1504 and the heater core 1700.

FIG. 5*a* illustrates an operation of the blend valve 1508 where the blend valve 1508 is operated to allow coolant to flow from the inlet 1508*a* through the outlet 1508*b* which corresponds to the heat exchange 1504. FIG. 5*b* illustrate an operation of the blend valve 1508 where the blend valve 1508 is operated to allow coolant to flow from the inlet 1508*a* through the outlet 1508*b* which corresponds to the heater core 1700. FIG. 4*c* illustrates an operation of the blend valve 1508 where the blend valve 1508 is operated to allow coolant to flow from the inlet 1508*a* through the outlet 1508*b* which corresponds to a bypass line 1704 which bypasses both the heat exchanger 1504 and the heater core 1700. It is understood that the blend valve 1508 may be operated such that when it is desirable for the heat from the drivetrain to provide heat to the HVAC loop, the blend valve is operated in the mode of FIG. 5*b* where the coolant is directed to the heater core 1700. Further, the blend valve 1508 may be operated such that it is desirable to cool the drivetrain but it is not desirable to provide heat to the HVAC loop, the blend valve 1508 is operated in a mode of FIG. 5*a* where the coolant is directed to the heat exchanger 1504. Lastly, the blend valve 1508 may be operated such that when it is not desirable to cool the drivetrain can be operated in the mode depicted in FIG. 5*c* where the coolant is directed through a bypass line 1704 which bypasses both the heat exchanger 1504 and the heater core 1700. Advantageously, allowing the operation of three different modes allows for heat from the drivetrain to the utilized to provide heat to the HVAC loop when heat is desirable which saves energy. It is understood that electrically producing heat through the auxiliary heaters 1528 is inefficient and thus utilizing the heat from the drivetrain may provide considerable energy efficiencies. Saving energy may increase range and decease wear and tear on the energy storage system.

Moreover, although many embodiments exhibit various systems in association with various embodiments of interconnected thermal management systems, it should be understood that any combination of the various structural and functional elements of such individual thermal management systems can be included and or omitted in any number of thermal management system designs.

Using embodiments of thermal management systems, it is possible to operate the combined system of FIG. 3 which includes a drivetrain cooling loop, an energy storage heating/cooling loop, and an HVAC heating/cooling in a variety of configurations based on the operational needs of the vehicle and the environmental conditions. Schematics of example thermal management system operational configurations are illustrated in FIGS. 6a to 6d. These operational configurations share features described in connection with FIG. 3 and these shared features are applicable to the operational configurations as well.

Figure 6A:
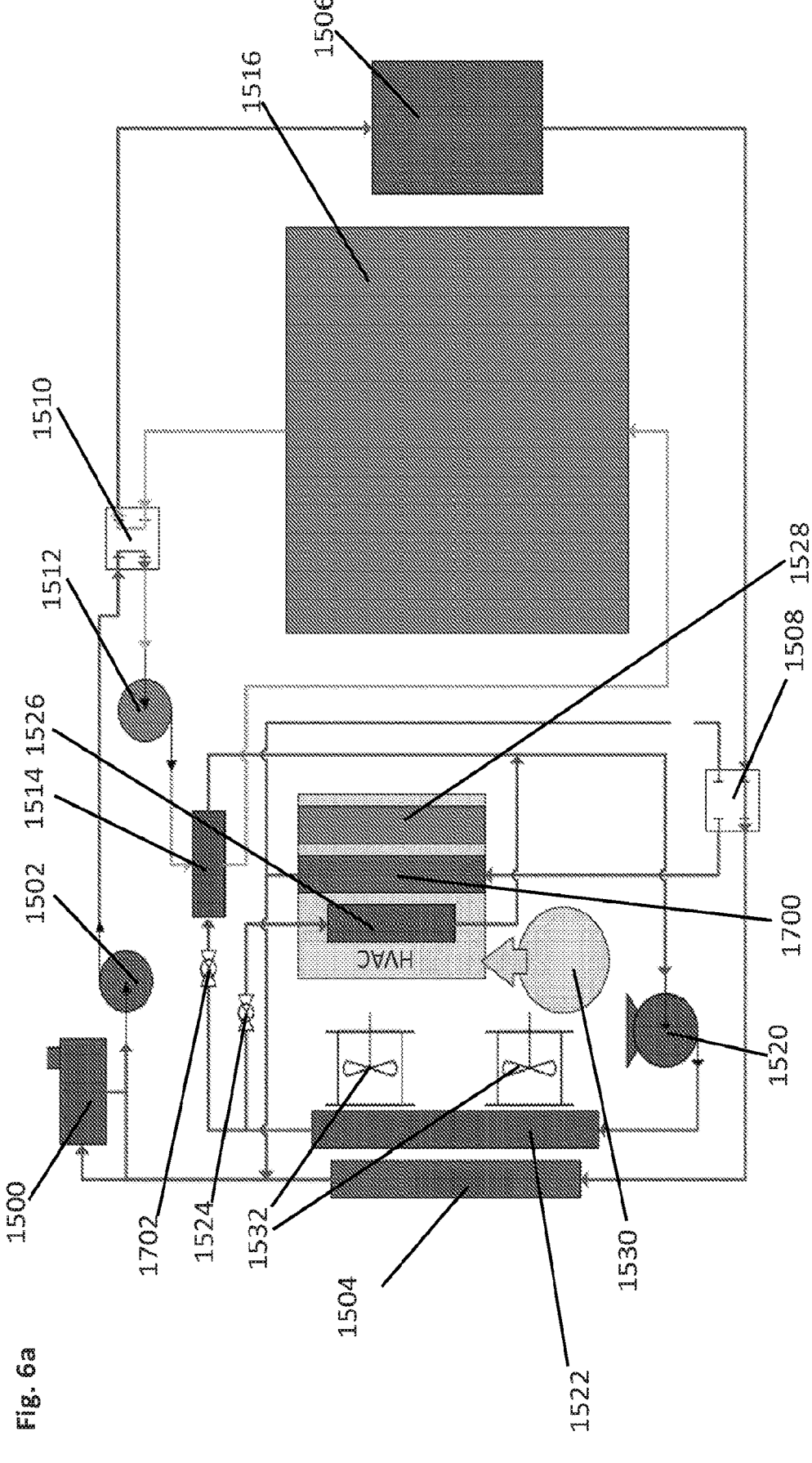
FIGS. 6a to 6d illustrate operational modes of thermal management systems in accordance with embodiments.

In one operation, as shown in FIG. 6a, the drivetrain cooling loop and energy storage system heating/cooling loop may be arranged in series such that the heat exchange radiator 1504 is operated in common between them for cooling of drivetrain and energy storage components. In such a configuration, the HVAC heating/cooling loop for passenger compartment cooling or heating is operated independently of the other thermal management loops. In such an operation, the mode valve 1510 is operated in a series arrangement as illustrated in FIG. 4b, and the blend valve 1508 would be configured such that fluid flow from the drivetrain cooling loop and energy storage heating/cooling loop flow through the cooling radiator as illustrated in FIG. 5a. During operation, coolant fluid from the coolant reservoir 1500 is pumped using the fluid pump 1502 through the mode valve 1510 into the battery pump 1512 to the energy storage component 1516 (e.g., high voltage battery) and one or more drivetrain components 1506 (e.g., motor, transmission, etc.). The coolant fluid then flows through the blend valve 1508 to the heat exchanger 1504, and then back through the system. It will be understood that although the HVAC loop is run independently of the coolant fluid of the drivetrain/energy storage thermal management systems in such a configuration, auxiliary cooling can also be provided through the temperature controller 1514 (e.g. the chiller). In such an embodiment, as illustrated in FIG. 3, refrigerant from the HVAC system would be directed through the expansion valve 1524 connected to the evaporator 1526 of the HVAC heating/cooling loop in parallel with the expansion valve 1702 connected to the temperature controller 1514 of the energy storage system heating/cooling loop. The temperature controller 1514 allows the coolant fluid passing from the battery pump 1512 to additionally cool the refrigerant in the HVAC heating/cooling system. An operational and environmental use case for such a configuration would be in mid to low ambient conditions and low to moderate drive cycles, where cooling of both drivetrain and energy storage components is needed, but where the passenger compartment may need to be intermittently heated or cooled.

Figure 6B:
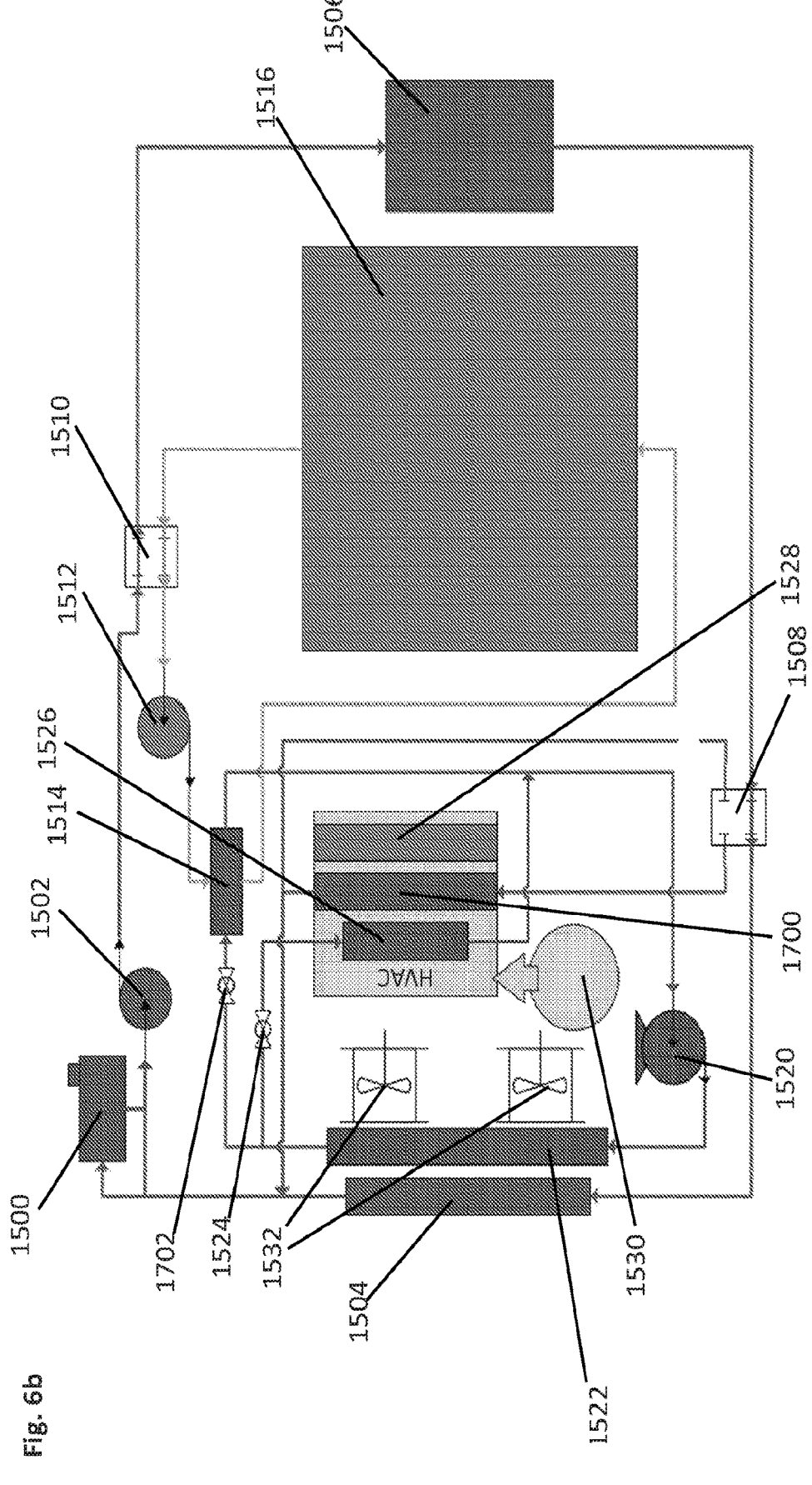

In another exemplary operation, as shown in FIG. 6b, the drivetrain cooling loop and energy storage system heating/cooling loop are arranged in a separate flow configuration (parallel flow). In such an embodiment, drivetrain cooling utilizes the heat exchange 1504 while the energy storage component 1516 is cooled by the temperature controller 1514. In this operation, the HVAC heating/cooling loop for passenger compartment cooling or heating is operated independently of the other thermal management loops. The mode valve 1510 is configured in a parallel arrangement as illustrated in FIG. 4a, and the blend valve 1508 is configured such that fluid flows from the drivetrain system through the cooling radiator as illustrated in FIG. 5a). During operation, coolant fluid from the coolant reservoir 1500 is pumped from the fluid pump 1502 through the mode valve 1510 to the one or more drivetrain components 1506, and then through the blend valve 1508 to the heat exchange 1504, and back through the system. In the energy storage system heating/cooling loop, coolant fluid is pumped by the fluid pump 1512 to the energy storage component 1516 through the temperature controller 1514. Refrigerant from the HVAC system is directed through both the expansion valves 1524, 1702 such that cooling occurs both at the evaporator 1526 and at the temperature controller 1514 such that coolant fluid from the fluid pump 1512 passing through the temperature controller 1514 undergoes cooling. An operational and environmental use case for such a configuration would be in high ambient environmental conditions under more aggressive drive cycles or supercharging, where maximum cooling is needed for both the functional components and the passenger compartment.

Figure 6C:
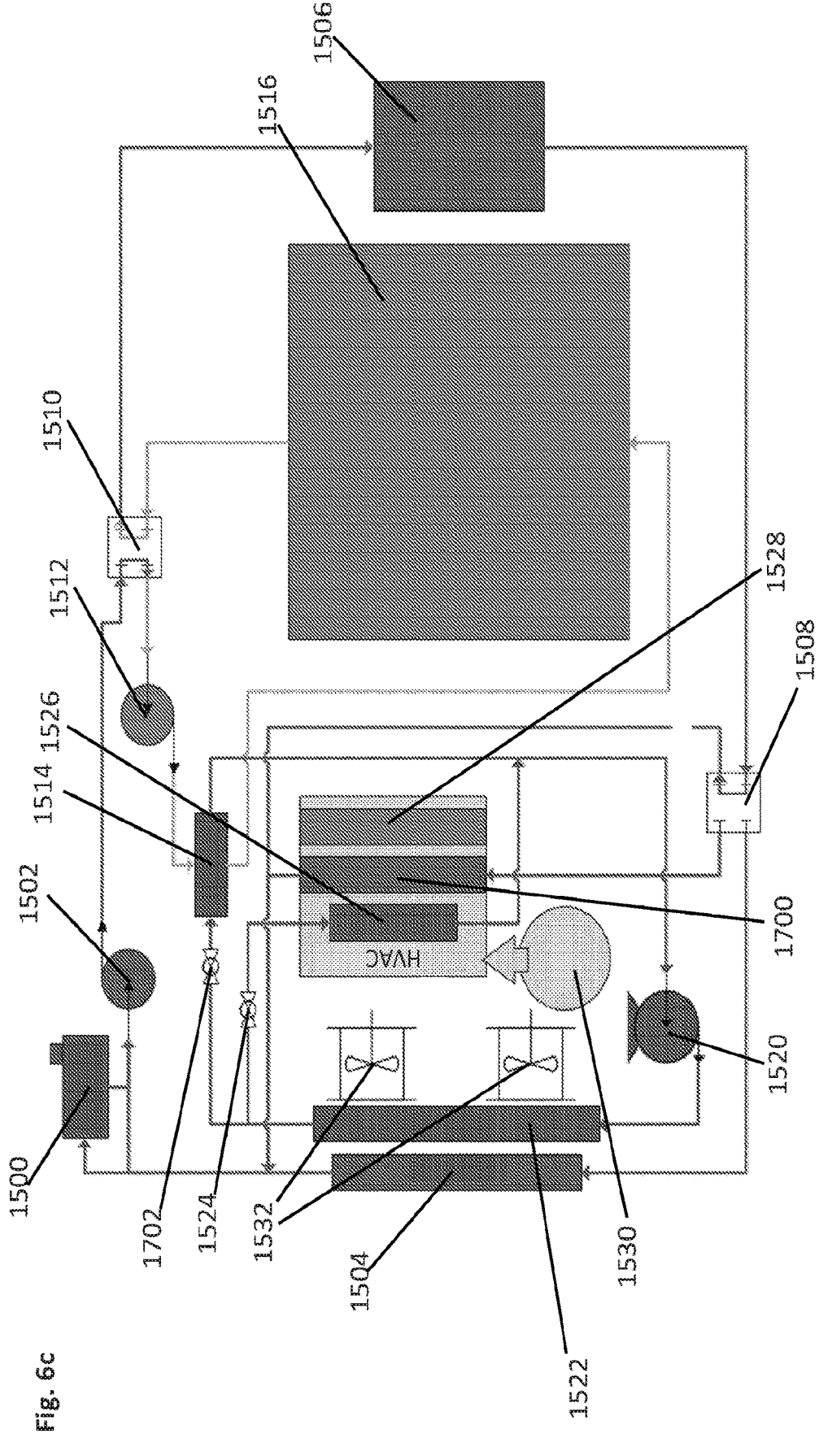

In another exemplary operation, as shown in FIG. 6c, the drivetrain cooling loop and energy storage system heating/cooling loop are arranged in a combined flow configuration (series flow), and are configured to bypass the heat exchanger 1504. In such an operational case, drivetrain waste heat is directly transferred into the components of the energy storage system to provide heating thereto. In such a configuration, the HVAC heating/cooling loop for passenger compartment cooling or heating is operated independently of the other thermal management loops. In such an operational case, the mode valve 1510 is configured in a series arrangement as illustrated in FIG. 4b, and the blend valve 1508 is configured such that fluid flowing from the drivetrain system bypasses the radiator 1504 and the heater core 1700 as illustrated in FIG. 5c. Coolant fluid from the coolant reservoir 1500 is pumped through the fluid pump 1502 through the mode valve 1510 to the battery pump 1512 and then through the one or more energy storage components 1516 and one or more drivetrain components 1506. The blend valve 1508 then redirects the flow back to the system through the bypass line 1704. Note, although the blend valve 1508 is shown directing all coolant fluid flow through the bypass line 1704, it will be understood that the valve could be set to split the flow between various other paths such as through the heater core 1700 inside the HVAC heating/cooling loop and the bypass line 1704 so that the waste heat from the drivetrain can be utilized for both passenger compartment heating (via the heater core 1700) and heating the one or more energy storage components (via the bypass line 1704). An operational and environmental use case for such an operation would be in low ambient environmental conditions where maximum heating is needed for both the functional one or more energy storage components and the passenger compartment.

Figure 6D:
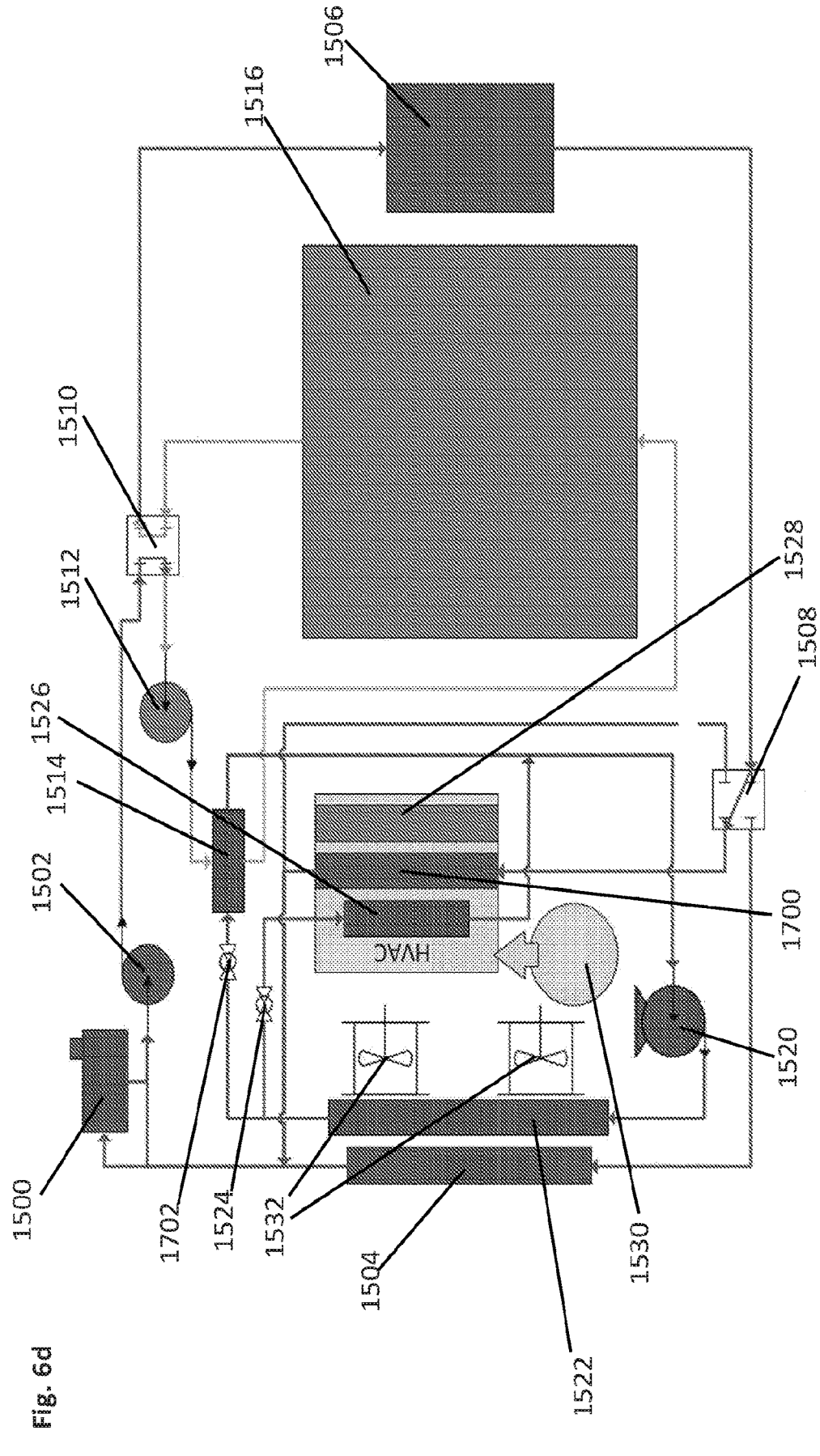

In another exemplary operational case, as shown in FIG. 6d, the drivetrain cooling loop and energy storage system heating/cooling loop are arranged in either a combined (series) or separate (parallel) flow configuration, and are configured to pass coolant through the heater core 1700 of the HVAC heating/cooling loop. Drivetrain and energy storage waste heat is transferred into the HVAC system to provide heating to the passenger compartment. Note, the HVAC heating/cooling loop for passenger compartment heating is still operated independently of the other thermal management loops, but the heater core 1700 which run is parallel with the auxiliary heater 1528 of the HVAC allows for the waste heat from the drivetrain cooling loop and the energy storage heating/cooling loop to be transmitted to the HVAC refrigerant and a passenger compartment. In this operational case, the mode valve 1510 is configured in a series arrangement as illustrated in FIG. 4*b*, and the blend valve 1508 is configured such that fluid flows from the drivetrain cooling loop through the heater core 1700 as illustrated in FIG. 5*b*. During operation, coolant fluid from the coolant reservoir 1500 is pumped by the fluid pump 1502 through the mode valve 1510 to the fluid pump 1512 connected to the one or more energy storage components 1516. Thus, coolant is pumped through both the one or more energy storage components 1516 and the one or more drivetrain components 1506 in series. The blend valve 1508 then redirects the flow of coolant through the heater core 1700 in the HVAC heating/cooling loop and then back to the coolant reservoir 1500 and subsequently through the fluid pump 1502. Note, although the blend valve 1508 is shown directing all fluid flow through the heater core 1700, it will be understood that the valve could also direct portions of the coolant to be split between the heater core 1700 inside the HVAC heating/cooling loop and the bypass line 1704 so that the waste heat from the drivetrain can be utilized for both passenger compartment heating (via the heater core 1700) and energy storage component heating (via the bypass line 1704). An operational and environmental use case for such this configuration is driving in low ambient environmental conditions where heating is needed for the passenger compartment. In many contemplated operational cases, the drivetrain cooling loop and energy storage system heating/cooling loops may be combined or disconnected dynamically, depending on the energy storage system temperature.

As will be understood, the above operational configurations of the interconnected thermal management system are meant only to be illustrative. These configurations may be combined or dynamically altered during use to address changing operational or environmental conditions. Exemplary operational cases utilizing such dynamically alterable interconnected thermal management heating/cooling loops allows for unwanted heat (e.g., drivetrain waste heat) to be used instead of spending energy to cool one system while one or two others use energy to heat. Using such operations can provide significant energy savings and ultimately increase the range of battery electric vehicles into which such systems are integrated.

Moreover, although many embodiments exhibit various systems in association with various embodiments of operational configurations of thermal management systems, it should be understood that any combination of the various structural and functional elements of such individual components of thermal management systems can be included and or omitted in any number of thermal management system designs.

Vehicle platforms, heating, ventilation and air conditioning (HVAC) systems, subsystems, and components for use therewith, and thermal management systems, subsystems, and components for use therewith are described. These HVAC systems may be implemented within the thermal management systems described above. Many embodiments of HVAC architectures and systems incorporate a dual system having HVAC components disposed in both front and rear portions of the vehicle. Dual HVAC systems according to various embodiments employ flow-based strategies for cooling portions of the passenger cabin. Embodiments of dual HVAC systems may incorporate a front HVAC component configured solely for providing heating to the passenger cabin, or for providing a mix of heating and cooling to the passenger cabin. Ducting for embodiments of dual HVAC systems incorporating front heating components may include elements to extend heated air to the rear of the vehicle cabin. Embodiments of dual system HVAC systems may also incorporate a rear HVAC component configured solely for providing cooling to the passenger cabin. Ducting for embodiments of split HVAC systems incorporating rear cooling components may include elements to extend cooled air to the front of the vehicle cabin. Various embodiments of HVAC systems may also incorporate wellness features including, for example, air filtration systems capable of functioning in either fresh or recycled air configurations. Embodiments are also directed to systems having thermal management cycles for HVAC that is fluidly isolated, but thermally coupled to one or both drive train and energy storage. In various such embodiments, heating/cooling fluid loops for these thermal management cycles may be linked through one or more valves such that the fluid flow through such cycles may be combined together, isolated from each other or mixed in various desired configurations.

Specific functional components and systems in accordance with many embodiments of HVAC systems may include any number of suitable components including, for example, pumps, condensers, radiators, evaporators, heaters, blowers, fans, fluid reservoirs, and valve and fluid conduits suitable to interlink these components in suitable combination such that cooling and heating of the passenger compartment can be achieved.

Vehicles with multi-zone HVAC systems provide a variable comfort feel in certain areas of the vehicle cabin. Different comfort feel can be achieved by different air flow temperatures, different air mass flow or a combination of both. Traditional HVAC systems with multi-zone auto AC functionality usually vary the temperature of the air flow to generate different comfort zones within one vehicle. HVAC systems for combustion engines and most electric vehicle HVAC systems generate the different air temperatures by a certain mixture of hot and cold air.

Cold air in modern HVAC systems is generated by airflow over an evaporator. The temperature of an evaporator can be varied only slightly, between about 2 and 10° C. at mid-ambient conditions. Hot or warm air is either generated by air flow over a heater core (combustion engines or EVs with fluid heaters) or over an electric air heater (positive temperature coefficient (PTC), for example). Heater core temperatures are often dependent on the coolant fluid which runs through the core (often generated by the cooling system of a combustion engine). So, in order to generate an exact temperature of the air flow the mixture of air is the only reliable control mechanism. The disadvantage of this solution is that energy has to be spent to cool down the air and energy has to be spent to heat up the air, which is then mixed to yield a desired temperature somewhere between the two extremes. While traditional combustion engine vehicles are able to use the waste heat of the combustion engine to warm the cabin and to alter the temperature of the cooling fluid to adjust cabin temperature, due to the high efficiency of the electric propulsion drive train system of electric vehicles and battery electric vehicles (BEVs) in particular, the waste heat of the powertrain system is typically not sufficient by itself to warm the cabin and/or help to defrost the windshield.

Figure 7A:
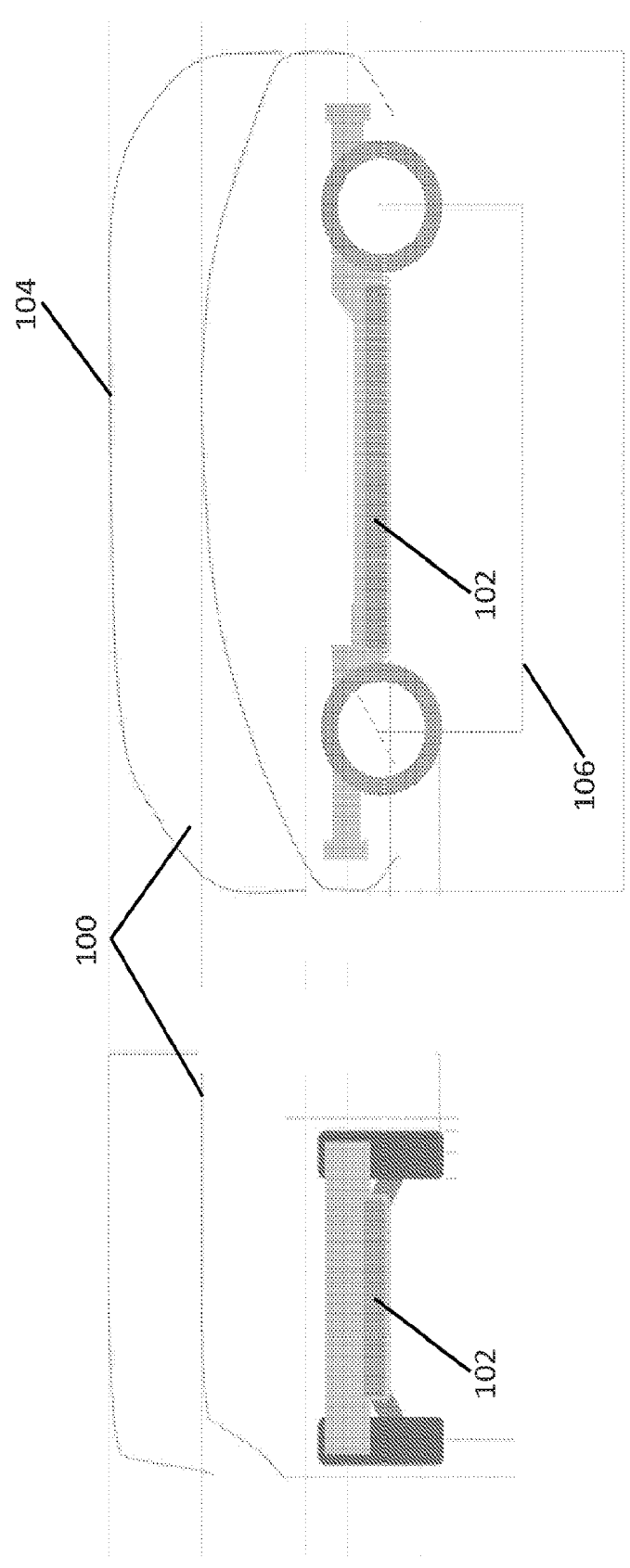
FIGS. 7a and 7b illustrates a schematic of an electric vehicle in accordance with embodiments.
Figure 7B:
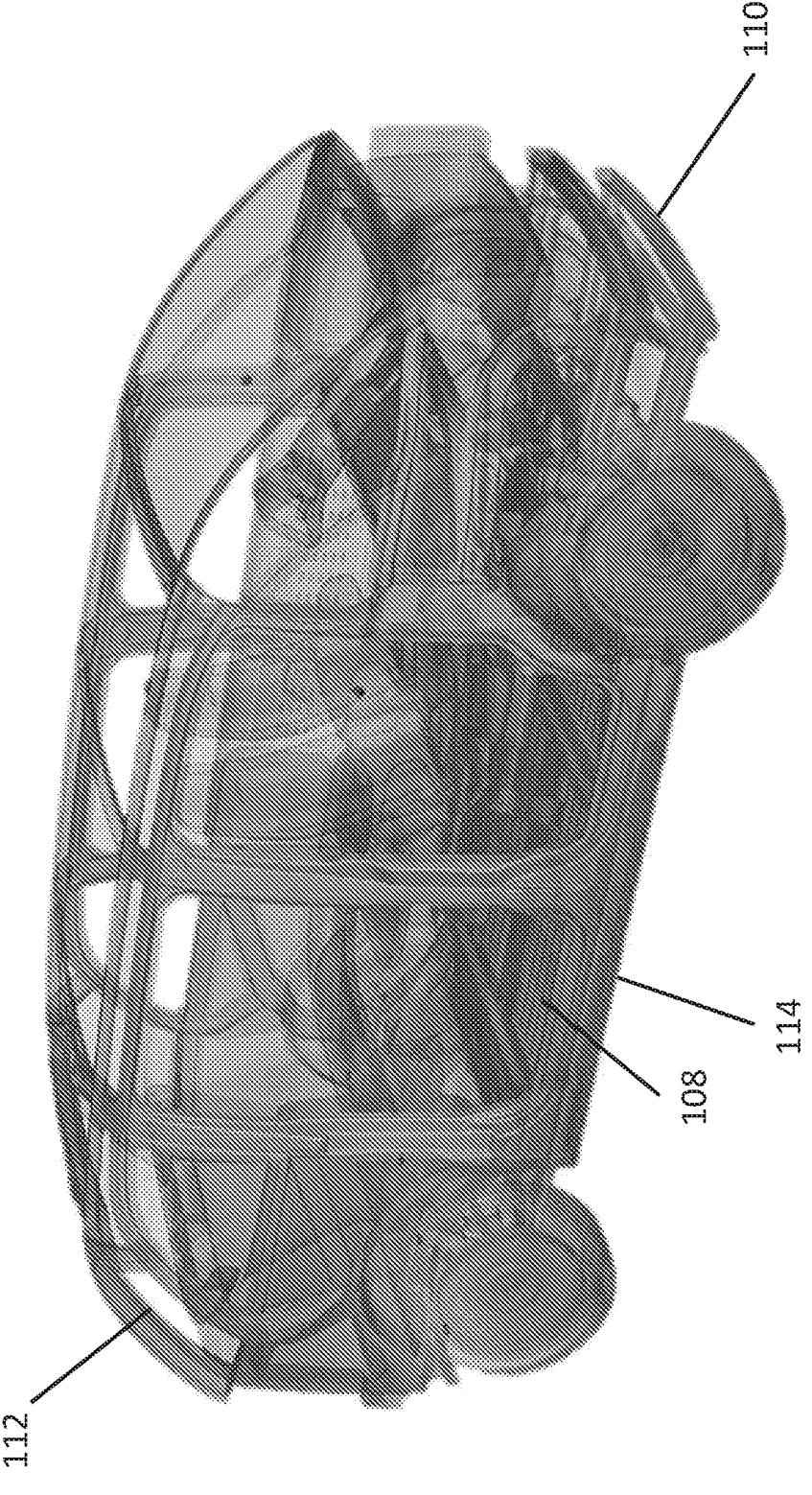

Moreover, because the compact nature of electric motors and battery packs allow for the power train and energy storage components 102 of BEVs 100 to fit within a small and unobtrusive footprint, it is possible to create vehicle cabins 104 that maximize the possible passenger space within a specified wheelbase 106, as shown schematically in FIG. 7*a*. In particular, many electric vehicles operate on an underlying vehicle platform or what is commonly referred to as a skateboard. As shown schematically in FIG. 7*b*, the vehicle platform 108 provides the functional framework (e.g., mechanical, electrical, etc. components) allowing for vehicle operation as well as a frame structure 110 on which to mount the various functional systems, subsystems and components of the vehicle such as the motors, suspension, wheels, and passenger compartments, and the vehicle body 112 itself. In alternative fuel vehicles the vehicle platform is also typically where the energy storage elements 114 (e.g., batteries for electric vehicles or fuel containment areas for fuel cell vehicles) are located.

Figure 8:
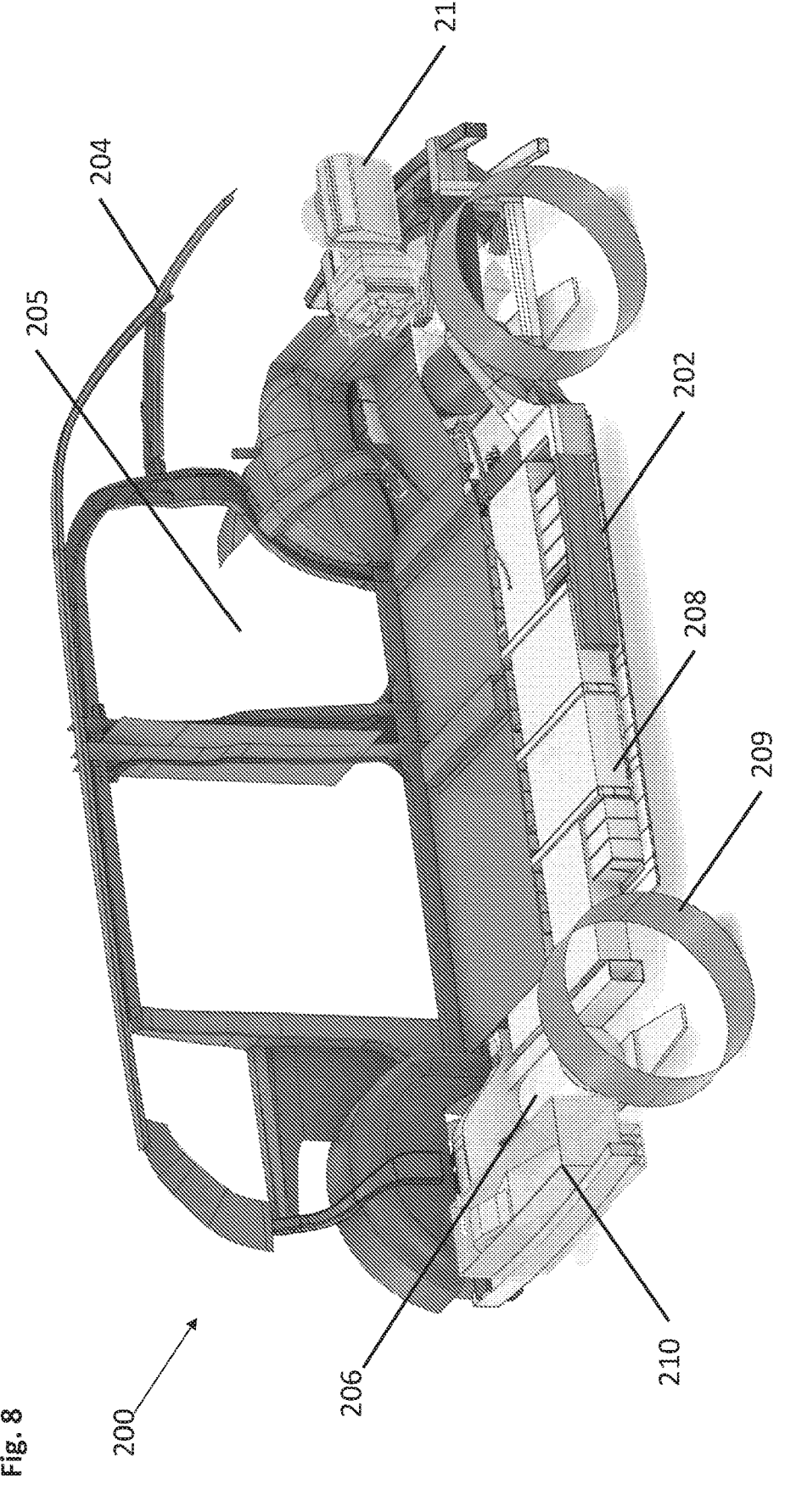
FIG. 8 illustrates a schematic of an electric vehicle cabin in accordance with embodiments.

As shown schematically in FIG. 8, the vehicle platform or skateboard 200 provides the functional framework (e.g., mechanical, electrical, etc. components) allowing for vehicle operation as well as a frame structure 202 on which to mount the various functional systems, subsystems and components of the vehicle such as the one or more motors 206, suspension, wheels 209, and passenger compartments 205, and the vehicle body 204 itself. In alternative fuel vehicles the vehicle platform is also typically where the energy storage elements 208 (e.g., batteries for electric vehicles or fuel containment areas for fuel cell vehicles) are located. In such vehicles the HVAC components 210 may also be mounted on or within this vehicle platform structure.

While this enhanced drivetrain efficiency and ability to maximize vehicle cabin is ultimately desirable, it does create substantial challenges in adapting conventional HVAC systems to service such novel vehicle designs. Specifically, conventional HVAC systems typically comprise a single heating/cooling HVAC component disposed in either the front or the rear of the vehicle that use mixed hot and cold air to provide zoned HVAC capabilities. Examples of such single-unit systems are shown schematically in FIGS. 9a and 9b. Although these types of HVAC systems may work well with conventional internal combustion engines where excess heat is available and in conventional cabin designs, creating HVAC systems capable of distributing zoned heating/cooling air throughout the radically open cabin designs capable of being implemented for new BEVs can be problematic.

Figure 9A:
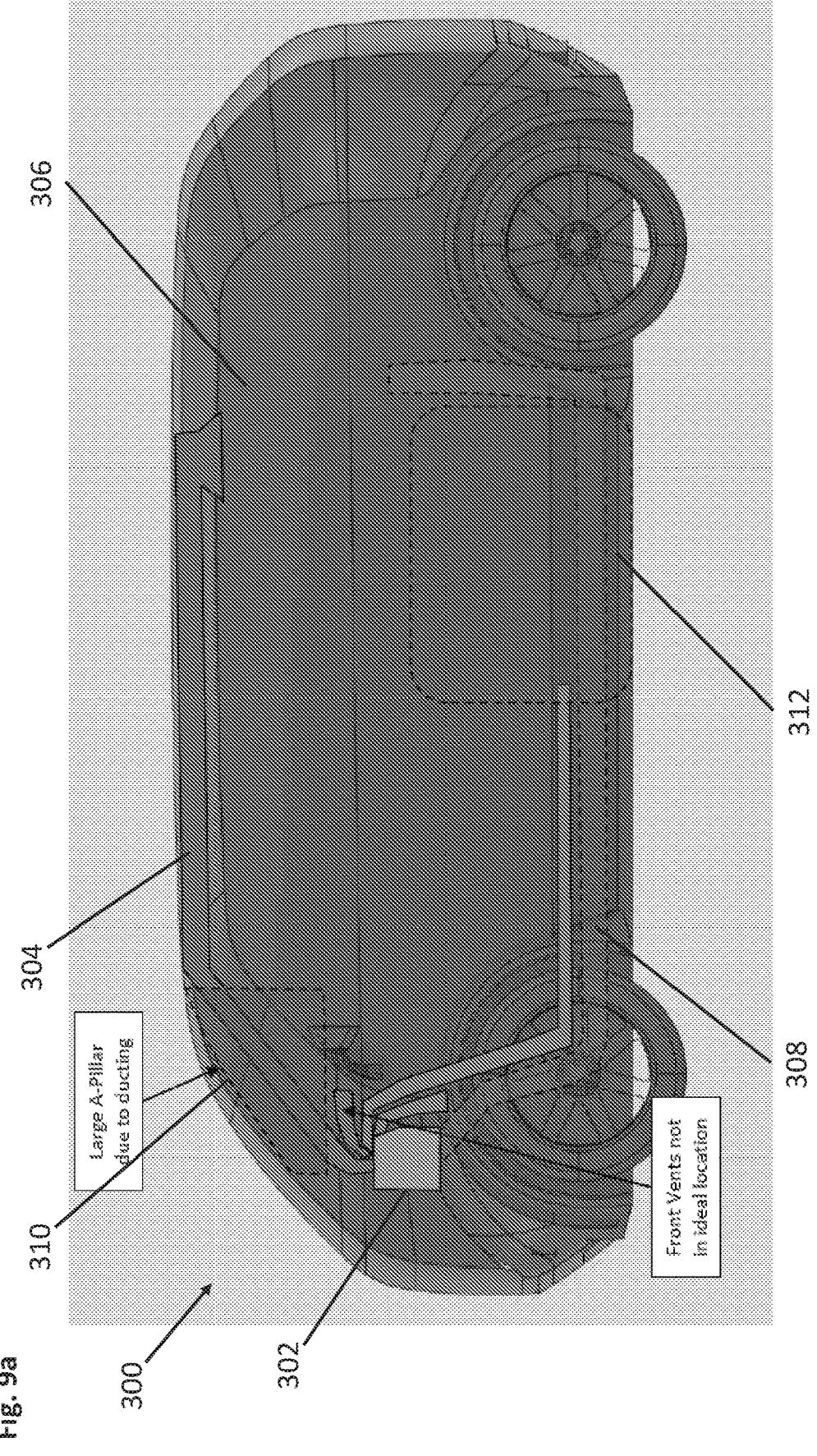
FIGS. 9a and 9b illustrate conventional single-unit HVAC configurations in accordance with the prior art.

Specifically, as shown in FIG. 9a, an HVAC system 300 implementing a single front heating/cooling HVAC component 302 requires ducting that extends either up 304 through the ceiling of the vehicle cabin 306, and/or down 308 beneath the floor of the vehicle cabin in order to reach the rear portion of the vehicle cabin. However, an upward directed system would require the ducting to run through the A-pillar 310 of the vehicle which would result in a very large A-pillar that would restrict driver sightlines. Meanwhile, a lower directed system would require the ducting to run through the battery compartment 312 of the vehicle, which would restrict battery compartment space, or if directed above the battery compartment would intrude on the occupant space. Finally, such a system would also require the placement of a large front HVAC unit 302 forward of the passenger compartment 306, restricting the ability to include this space for passenger use, thus limiting the ability to design fully flexible vehicle cabins.

Figure 9B:
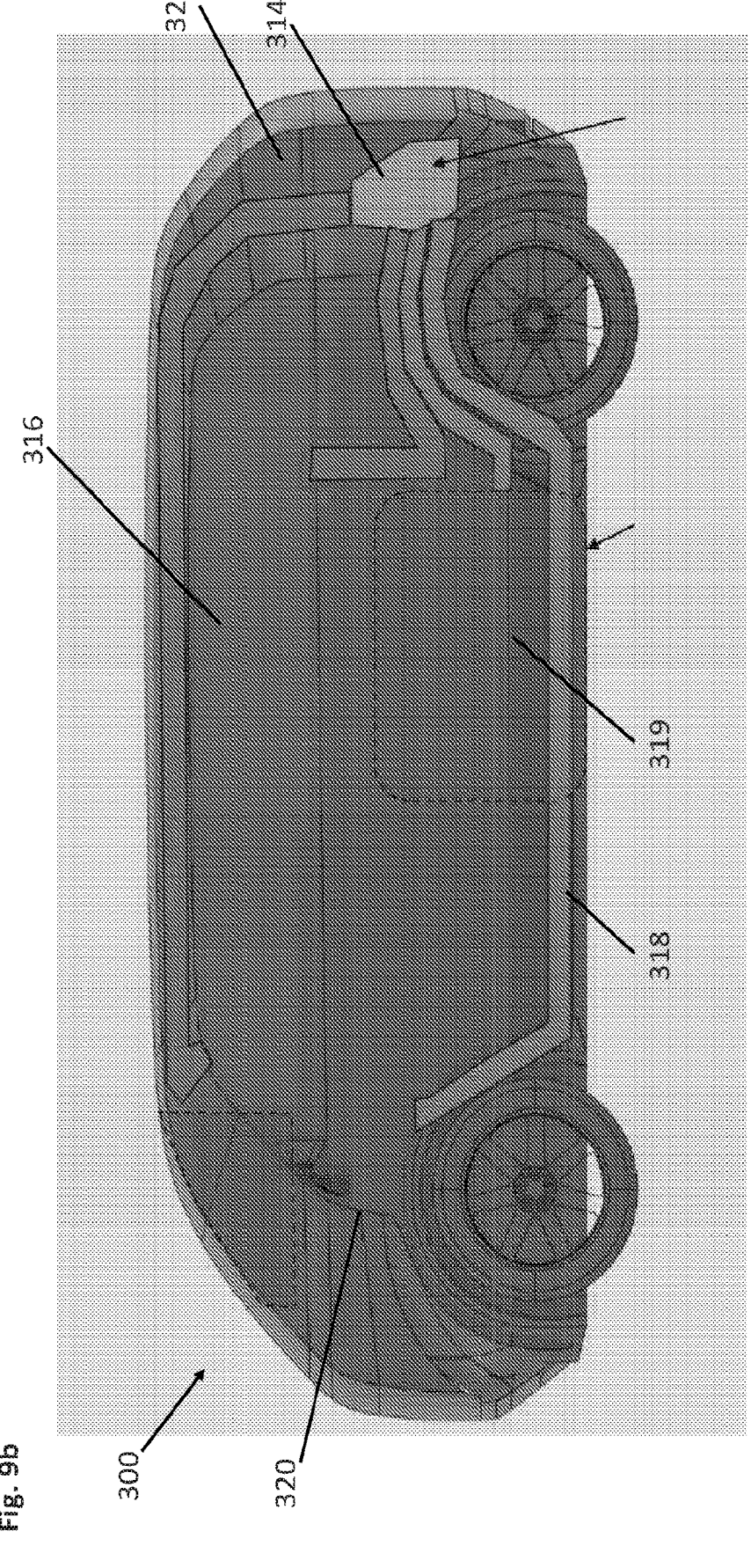

Similar issues arise from HVAC systems comprising a single heating/cooling HVAC component disposed in the rear of a vehicle. As shown in FIG. 9b, in such systems the heating/cooling HVAC component 314 is located behind the passenger compartment 316 and requires ducting 318 for heating that, again, runs beneath the floor of the vehicle cabin through the battery compartment 319 or through the occupant space to allow heating air to reach the front passenger area 320. Additionally, the large rear HVAC unit restricts storage space in the rear 322 of the vehicle, and running suitable air intakes to the rear HVAC unit can be difficult to engineer.

Moreover, even were the necessary ducting possible to engineer, such single unit systems would still typically rely on the mixing of hot and cold air to achieve a desired cabin temperature, which, as previously discussed, creates large inefficiencies in electric vehicles. The various embodiments described herein illustrate HVAC architectures and systems addressing the underlying deficiencies of traditional systems. Embodiments also illustrate thermal management systems for HVAC that allow for functional interconnection and disconnection with other thermal management systems, such as drivetrain and battery, in response to operational and environmental conditions.

Moreover, although many embodiments exhibit various systems in association with various embodiments of operational configurations of HVAC systems, it should be understood that any combination of the various structural and functional elements of such individual components of HVAC systems can be included and or omitted in any number of HVAC systems and/or thermal management systems.

Turning now to the drawings, schematics of dual HVAC systems for use in electric vehicles, and particularly electric vehicles with large interior volumes, in accordance with embodiments of the invention are illustrated. It will be understood that HVAC systems in this context refer to heating/cooling loops for use in providing heating/cooling air to the vehicle cabin, and all components thereof. In many embodiments, components may include, for example, condensers, radiators, evaporators, blowers, heaters, etc. It will also be understood that while certain arrangements of such components and systems are shown in the embodiments, HVAC system components may be arranged in many suitable configurations. In other words, embodiments described herein illustrate HVAC architectures, systems and components that may be adaptable to a variety of functional systems and vehicles.

Figure 10:
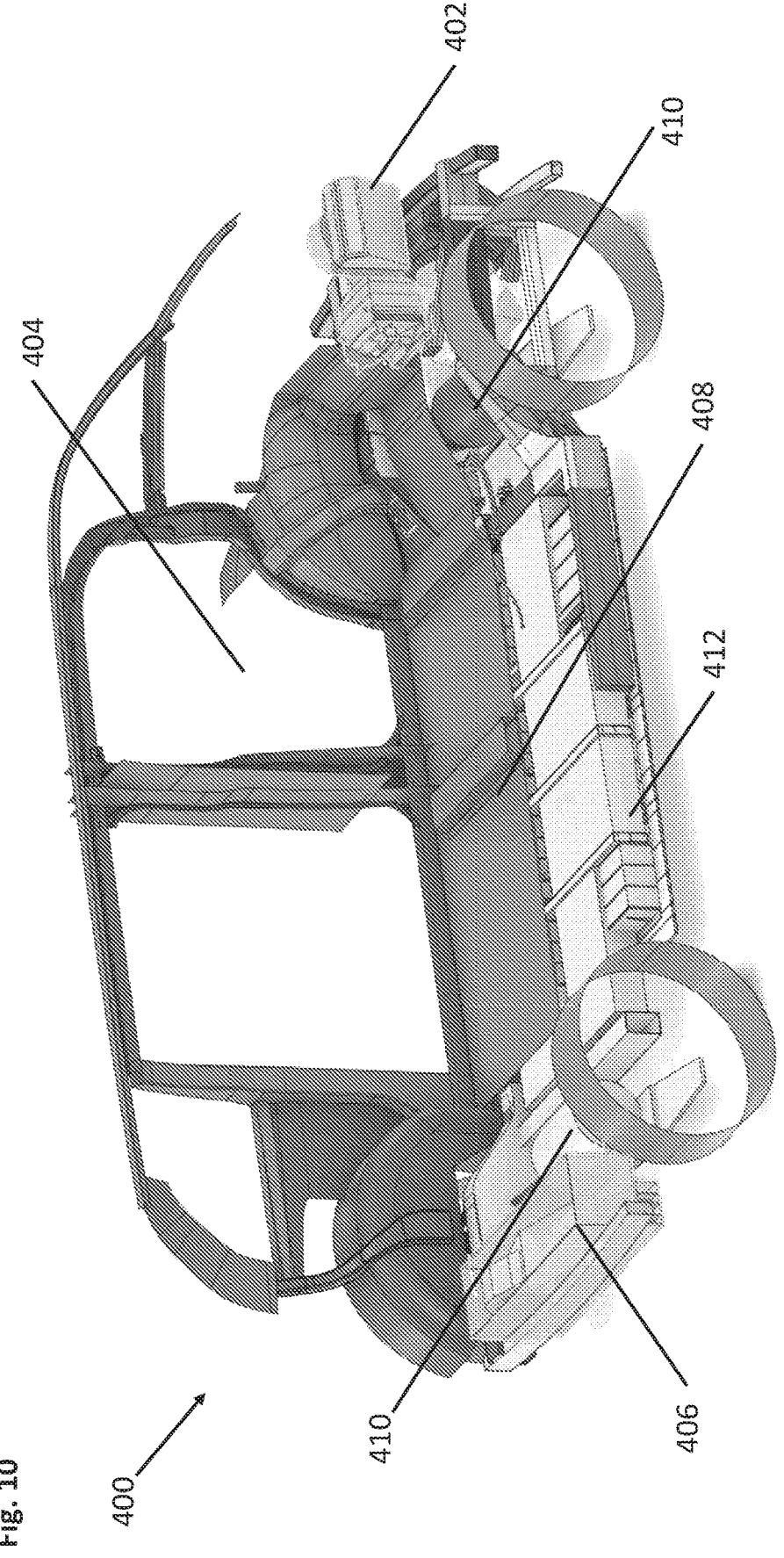
FIG. 10 illustrates a schematic of an electric vehicle cabin in accordance with embodiments.

Turning to the figures, in many embodiments as shown schematically in FIG. 10, split HVAC systems 400 to comprise a front HVAC component 402 configured to supply at least heating to the entire passenger compartment 404 and optionally cooling to the front portion of the passenger compartment, and a rear HVAC component 406 configured to supply cooling to at least the rear passenger compartment and optionally cooling to the entire passenger compartment. As will be described in greater detail below, these front and rear HVAC components work in concert to supply desired heating/cooling air to the passenger compartment, and comprise all necessary ducting to direct air to necessary portions of the passenger compartment. In many embodiments, such ducting may also comprise suitable venting and valves to vary the temperature of the heating/cooling air delivered between two or more zones (e.g., front/rear, left/right, etc.) such that different desired air temperatures may be maintained between zones. Moreover, in many embodiments such ducting is arranged such that it does not impinge on the areas beneath the passenger compartment floor 408, such as, for example, areas containing drivetrain 410 or battery elements 412 or above the floor into the occupant space.

Figure 11A:
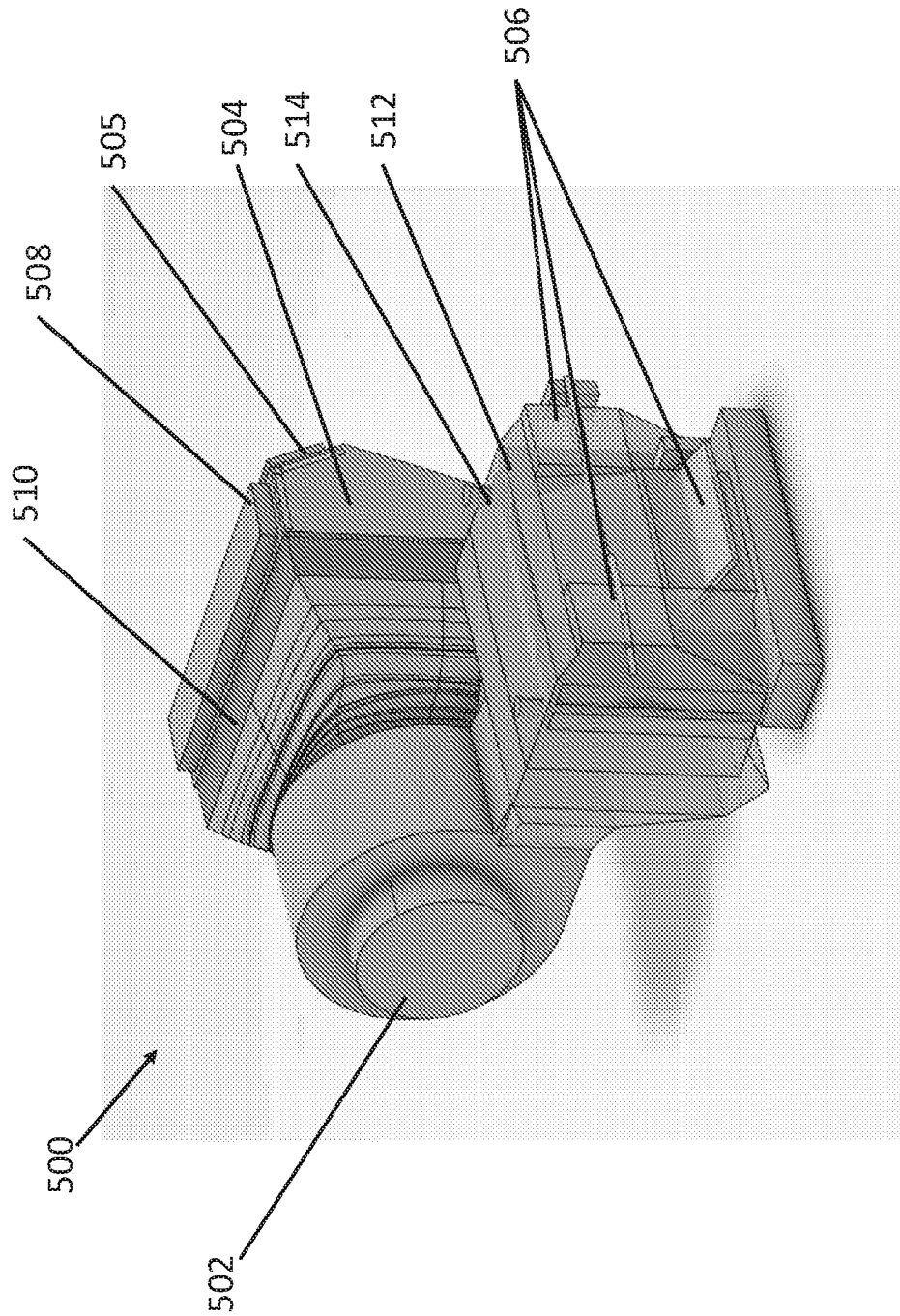
FIGS. 11a and 11b illustrate front HVAC components of a dual HVAC system in accordance with embodiments.

Turning to the HVAC components, as shown in FIG. 11a, in many embodiments the front HVAC component 500 generally comprises a blower unit 502 having an air intake 504 at one end comprising at least a fresh air intake 505 and a recirculation intake 508, and one or more air outlets 506 at the other end. Between the air intakes 505/508 and the blower unit 502 is disposed a wellness unit 510, which may comprise, for example, an air filtration unit. Downstream of the blower unit 502 and upstream of the outlet(s) 506 is disposed at least a heater element 512, such as, for example, a PTC heater or a heat pump. In many embodiments, the heater element may be variable and capable of heating at least two different zones through the various outlets 506, which may be directed through the various outlets and into suitable ducts to different areas of the passenger compartment (as will be discussed in greater detail below). In many embodiments, the front HVAC component may also comprise an auxiliary heater element 514 that may include, for example, a heat exchanger capable of providing heat to the HVAC component using waste heat from, for example, the drivetrain and/or battery elements.

Figure 11B:
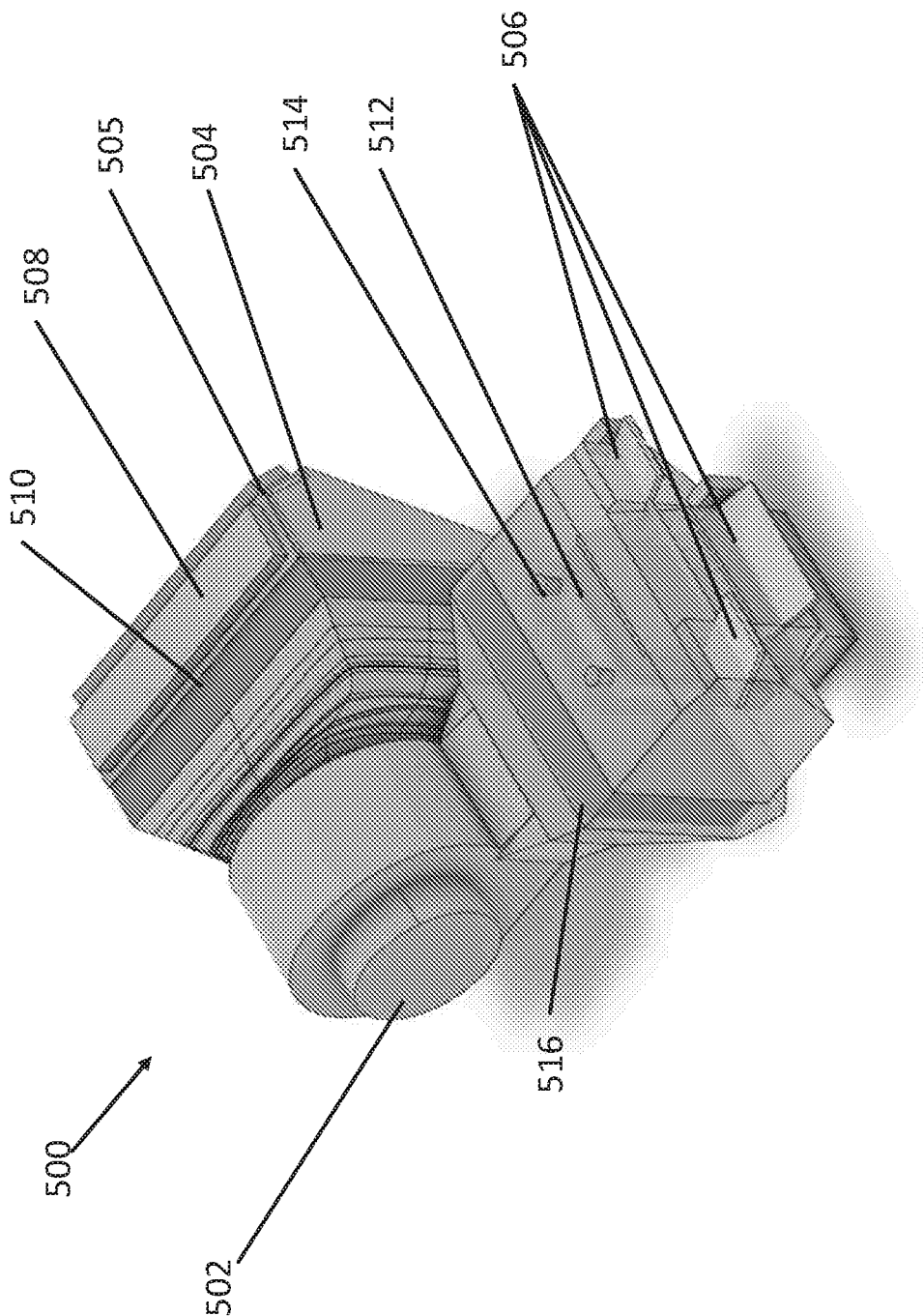

Embodiments of front HVAC components may also include cooling element 516, such as, for example, through an evaporator unit configured to provide cool air downstream of the blower unit 502, as shown in FIG. 11b, for example. In such embodiments, the front HVAC component may be configured to provide heating and cooling functionality to the overall HVAC system.

Figure 12A:
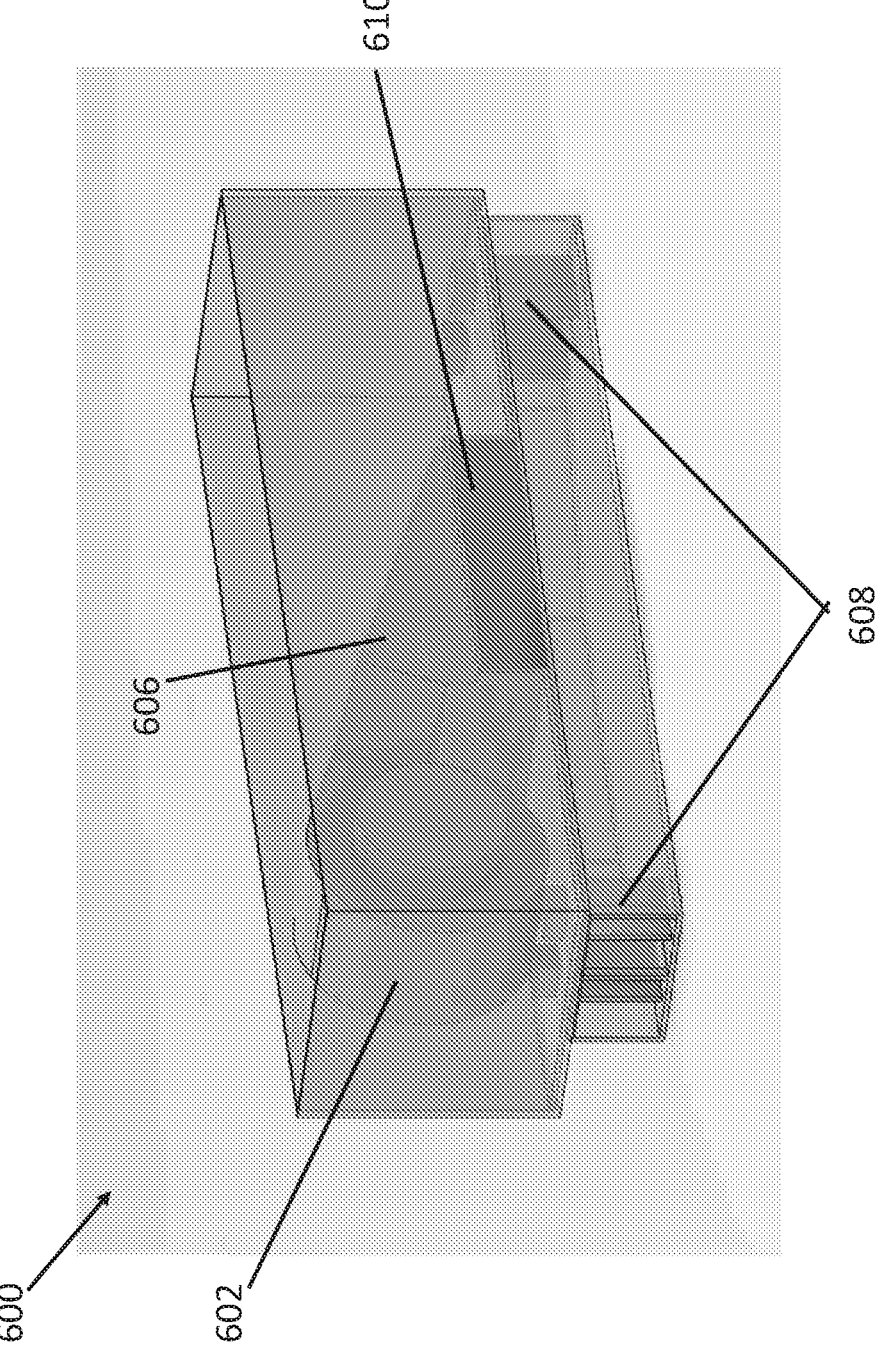
FIGS. 12a and 12b illustrate rear HVAC components of a dual HVAC system in accordance with embodiments.
Figure 12B:
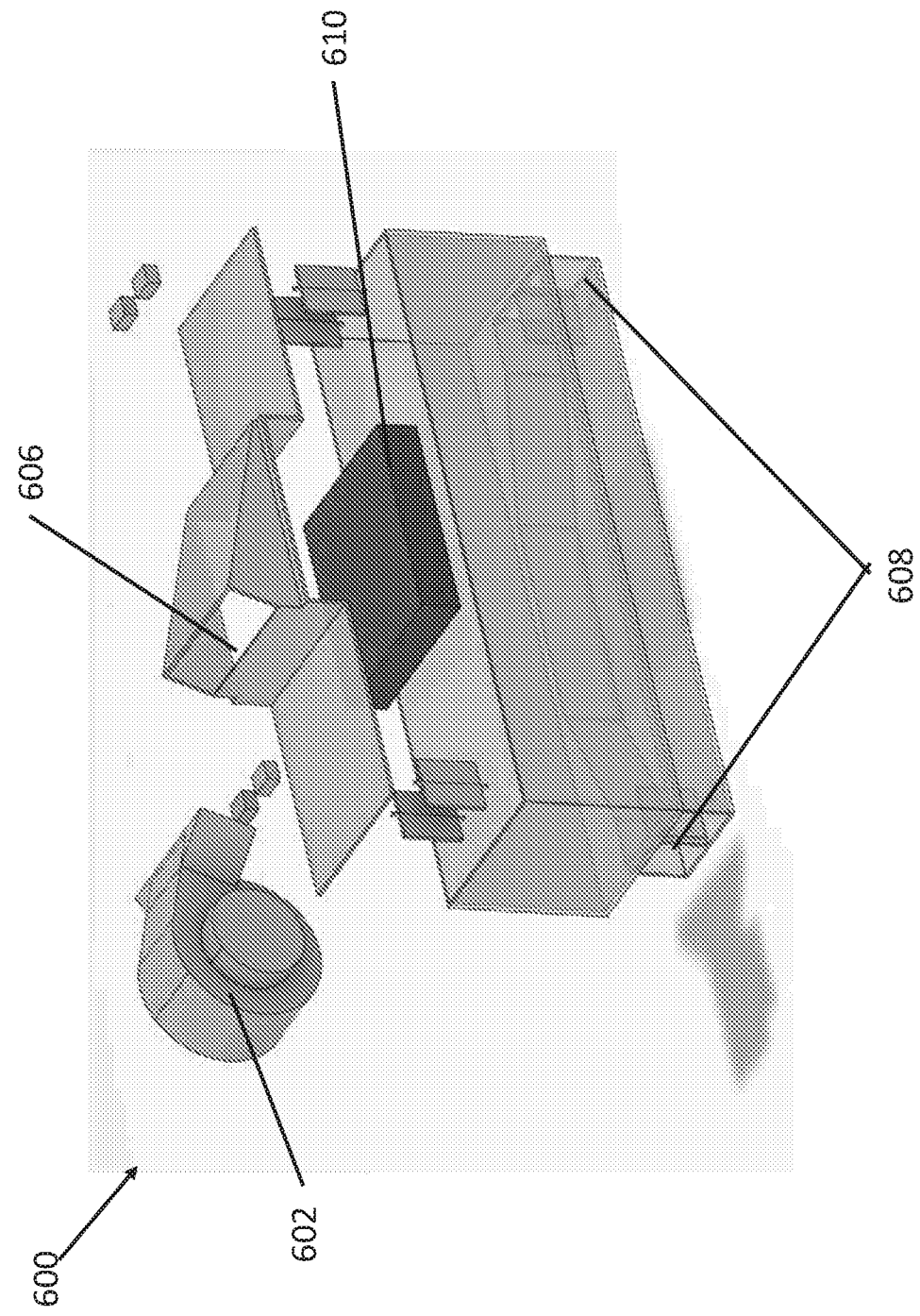

As shown in FIGS. 12a and 12b, in many embodiments the rear HVAC component 600 generally comprises a blower unit 602 having an air intake 606 at one end comprising at least a recirculation intake capable of pulling in air from within the passenger compartment of the vehicle cabin, and one or more air outlets 608 at the other end. Downstream of the blower unit 602 and upstream of the outlet(s) 608 is disposed at least a cooling unit 610, such as, for example, an evaporator unit to provide cool air downstream of the blower unit. The outlets 608 of the cooling unit 610 may configured to cool at least two different zones by directing air variably through the various outlets 608, which may be directed through suitable ducts to different areas of the passenger compartment (as will be discussed in greater detail below). In addition, (although not shown) wellness elements may be disposed between the air intakes 606 and the blower unit 604, such as, for example, air filtration units, etc.

Although specific component designs are shown in FIGS. 11a to 11b, it will be understood that many different component configurations and packaging designs having equivalent functionality may be incorporated with designs in accordance with the specific space availability and needs of the vehicle.

As previously described, designing a suitable HVAC system for electric vehicles requires addressing both the issue of how to obtain a desired temperature and how to deliver that air to the passengers. Dual HVAC systems, as set forth in embodiments, describe flow-based heating/cooling configured to provide air conditioning throughout the vehicle cabin as efficiently as possible. Flow-based heating/cooling relies on convection heat transfer to effect air conditioning for passengers. Such systems utilize differences in the volume of airflow over a passenger rather than the temperature of airflow to create a difference in perceived temperature. In particular, a passenger with more airflow over his/her body will generally feel colder than a passenger with less air flow at the same temperature. Such a system is referred to as forced convection heat transfer (from the human body in this case) where air is forced over a hot surface the hot surface (person's skin in this example) radiates heat into the surrounding environment at a higher rate when compared to the rate that would occur from natural convection.

Figure 13A:
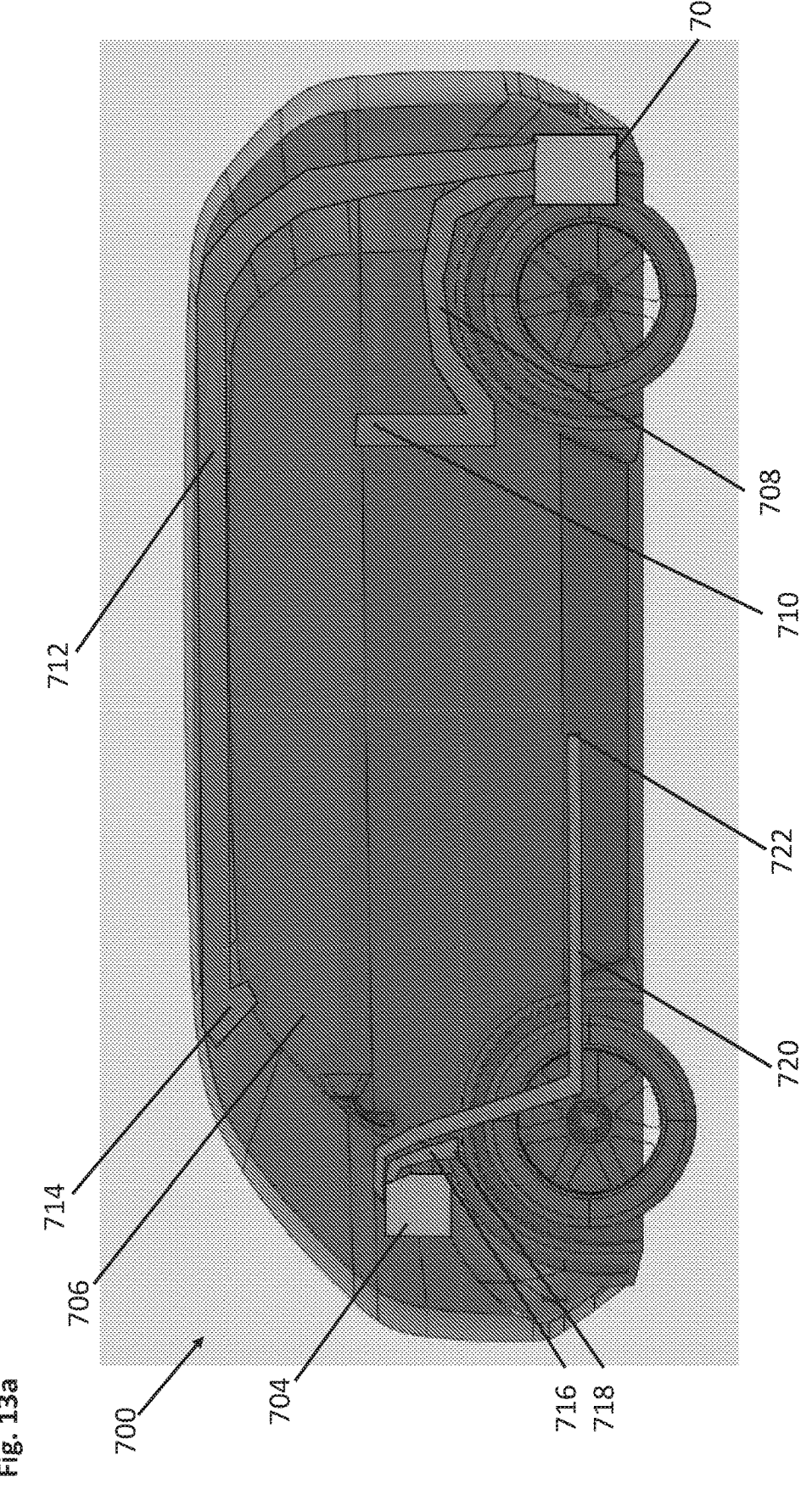
FIG. 13a illustrates a side view of a dual HVAC configuration in accordance with embodiments.
Figure 13B:
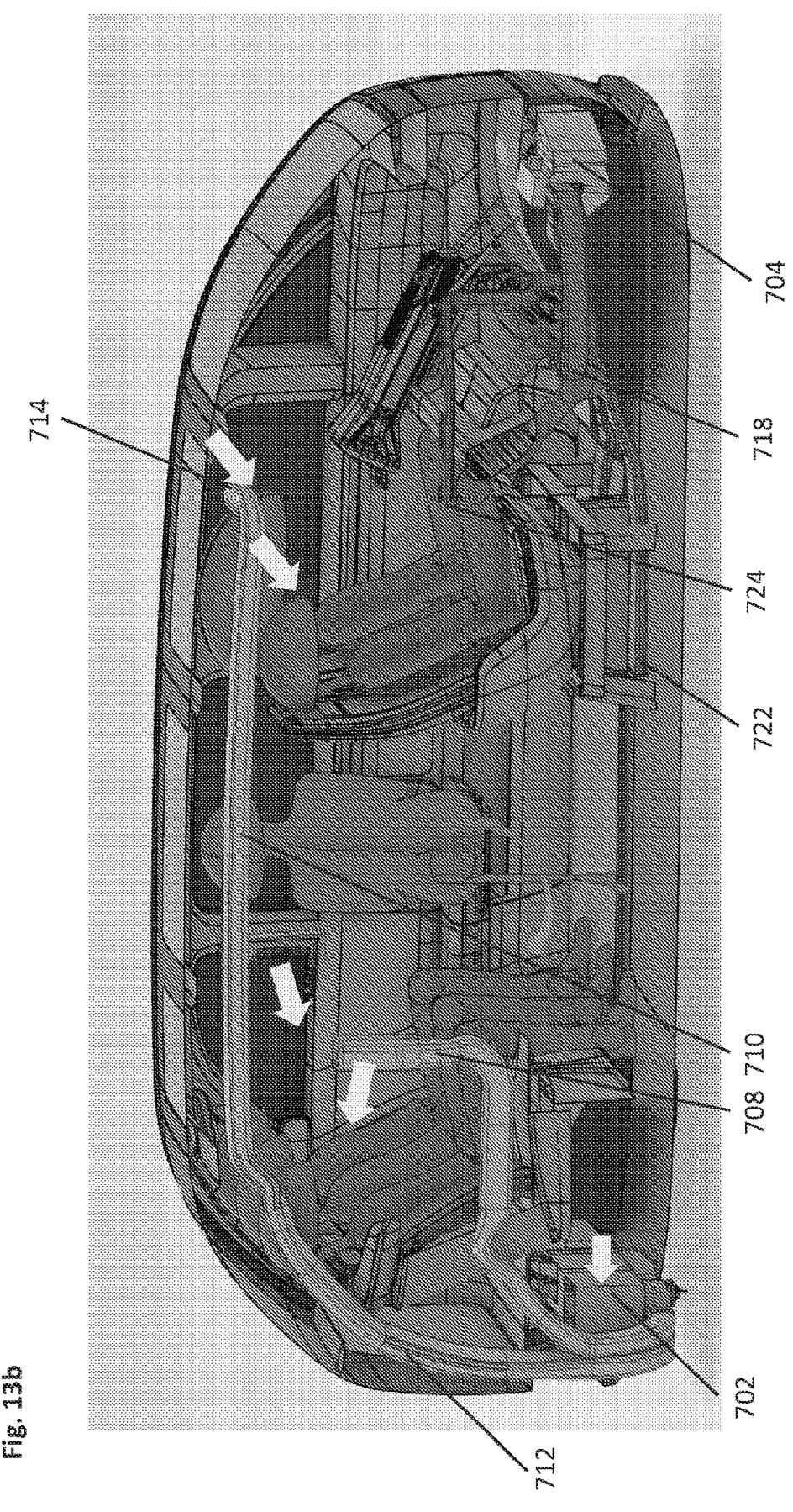
FIG. 13b illustrates a perspective view of a dual HVAC configuration in accordance with embodiments.

Such flow-based systems have the advantage of not requiring the mixing of hot and cold air to affect a specific temperature. However, in order for flow-based HVAC systems to be effective, the ducts and vents of the HVAC system need to be arranged to deliver airflow as close to the passengers as possible. FIGS. 13a and 13b, and 14a and 14b provide schematics of dual HVAC systems according to embodiments capable of implementing multi-zone flow-based comfort for cooling and multi-zone temperature-based comfort for heating. As shown in FIGS. 13a and 13b, many such embodiments of such HVAC systems 700 comprise a first HVAC unit 702 in the rear of the vehicle configured to provide at least cooling air (e.g., with a blower and an evaporator as shown, for example, in FIGS. 12a and 12b) and a second HVAC unit 704 in the front of the vehicle configured to provide at least heating air (e.g., with a recirculation/fresh air inlet door, blower, evaporator, heater core and 3-zone PTC heater as shown, for example, in FIGS. 11a and 11b).

In such embodiments, as shown in FIGS. 13a and 13b, the rear HVAC unit 702 is configured to provide most of the cooling power needed to cool down the cabin 706 and maintain comfort in high ambient, high sun load environment. In such embodiments, as shown, the rear HVAC unit is arranged in connection with at least first ducting 708 configured to provide cold air to the rear portion of the vehicle cabin through outlets 710 disposed in the C-Pillar of the vehicle body, and at least second ducting 712 configured to provide cold air through front outlets 714 disposed through and within the headliner along the top of the vehicle cabin. These outlets are often referred to as "above beltline". As previously discussed, although temperature mixing may be used, in many embodiments the temperature of the air for all outlets may be identical such that different comfort feel is provided instead by different amounts of air mass flow through the various outlets to the specific passengers.

Similarly, the heating power in such embodiments is provided primarily or entirely by a front HVAC unit 704. In various embodiments, the front HVAC unit may include two sources of heat (e.g., as described above with reference to FIGS. 11a and 11b). In various such embodiments, as previously discussed, a heater core may be provided to allow the transfer of thermal energy from the powertrain system, through the coolant into the cabin. In addition, as also discussed, a second multi-zone heater (such as, for example, a PTC heater) may provide a tailored amount of thermal energy for each zone into the cabin. Warming outlets 718/720 for the occupants may be located throughout the cabin, such as, for example, ducting 716 and outlets 718 may be provided in the front for the driver and passenger, under the second row seat for the rear occupants (not shown), and through ducting 720 under the first row seat 722 to provide warm air into the large volume between first and second row seats. As shown in FIG. 13b, while warming vents are typically provided as near to the vehicle cabin floor as possible such that the rising heat can be allowed to rise and warm the rest of the cabin, additional vents 724 may be provided higher in the cabin to provide warm air to the side windows in the front of the vehicle for defrosting and de-icing.

Figure 13C:
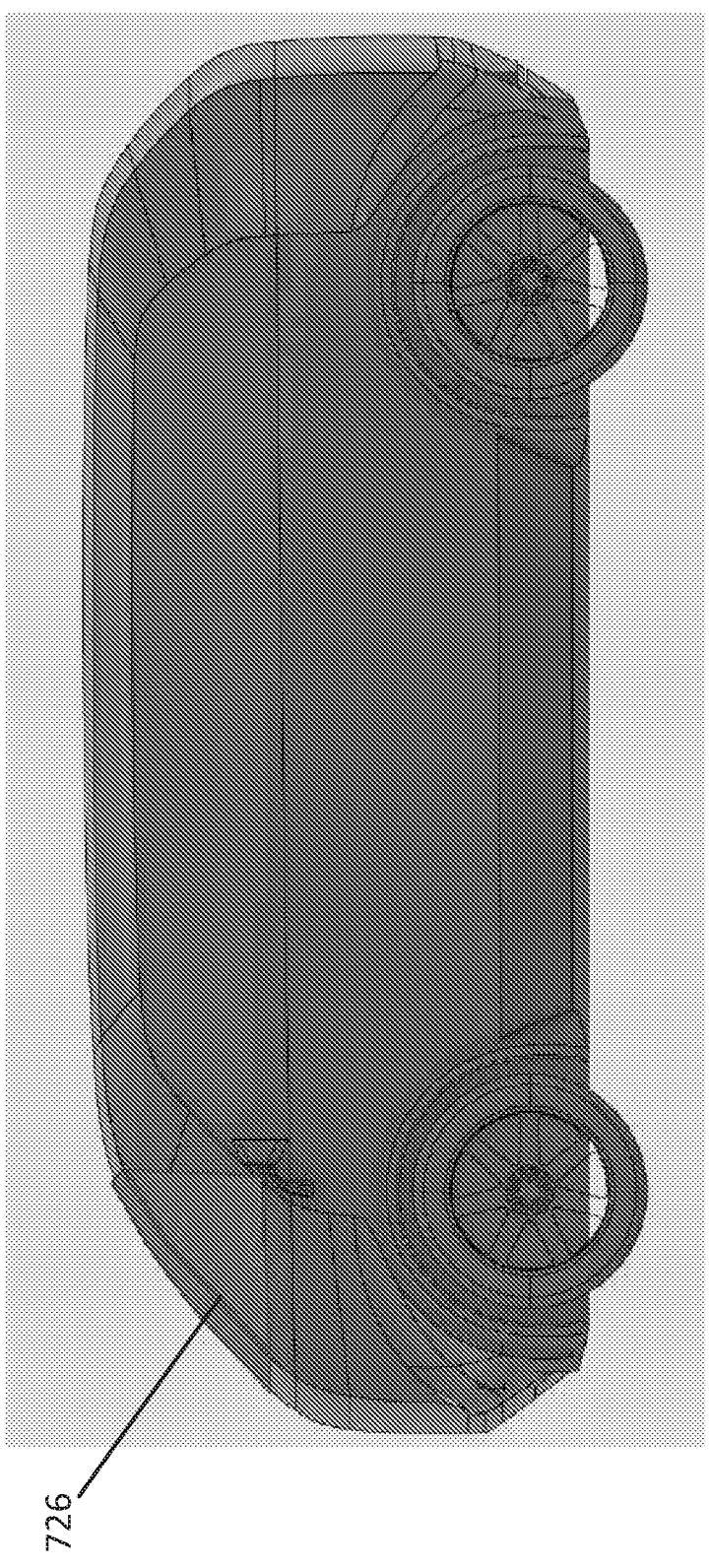
FIG. 13c illustrates a vehicle incorporating a heated front windshield in accordance with embodiments.

Although embodiments of dual HVAC systems may be configured to provide front/side window defrosting, it will be understood that these may be further supplemented by a heated forms 726 disposed on the wind shield itself, such as heated wired grids, etc., as shown schematically in FIG. 13c.

Although the embodiments provided in FIGS. 13a and 13b provides schematics and descriptions of a dual HVAC system configured such that heating is provided solely by the front HVAC unit and cooling from the rear HVAC unit, it will be understood that embodiments of such systems may also be configured such that front HVAC units may also provide supplemental cooling (e.g., as described in reference to HVAC components shown in FIGS. 11*a* and 11*b*). In such dual HVAC system 800 embodiments, as shown schematically in FIGS. 14*a* and 14*b*, the front HVAC unit 802 has a may be provided with an evaporator to help with the cooling demand and with air flow distribution throughout the cabin 804. In such embodiments, along with the cooling ducts 806 and vents 808 interconnected with the rear HVAC unit 810, and the heating ducts 812 and vents 814 interconnected with the front HVAC unit 802, ducting 816 and vents 818 may also be provided that allow for supplemental cooling of the front portion of the vehicle cabin.

Figure 14A:
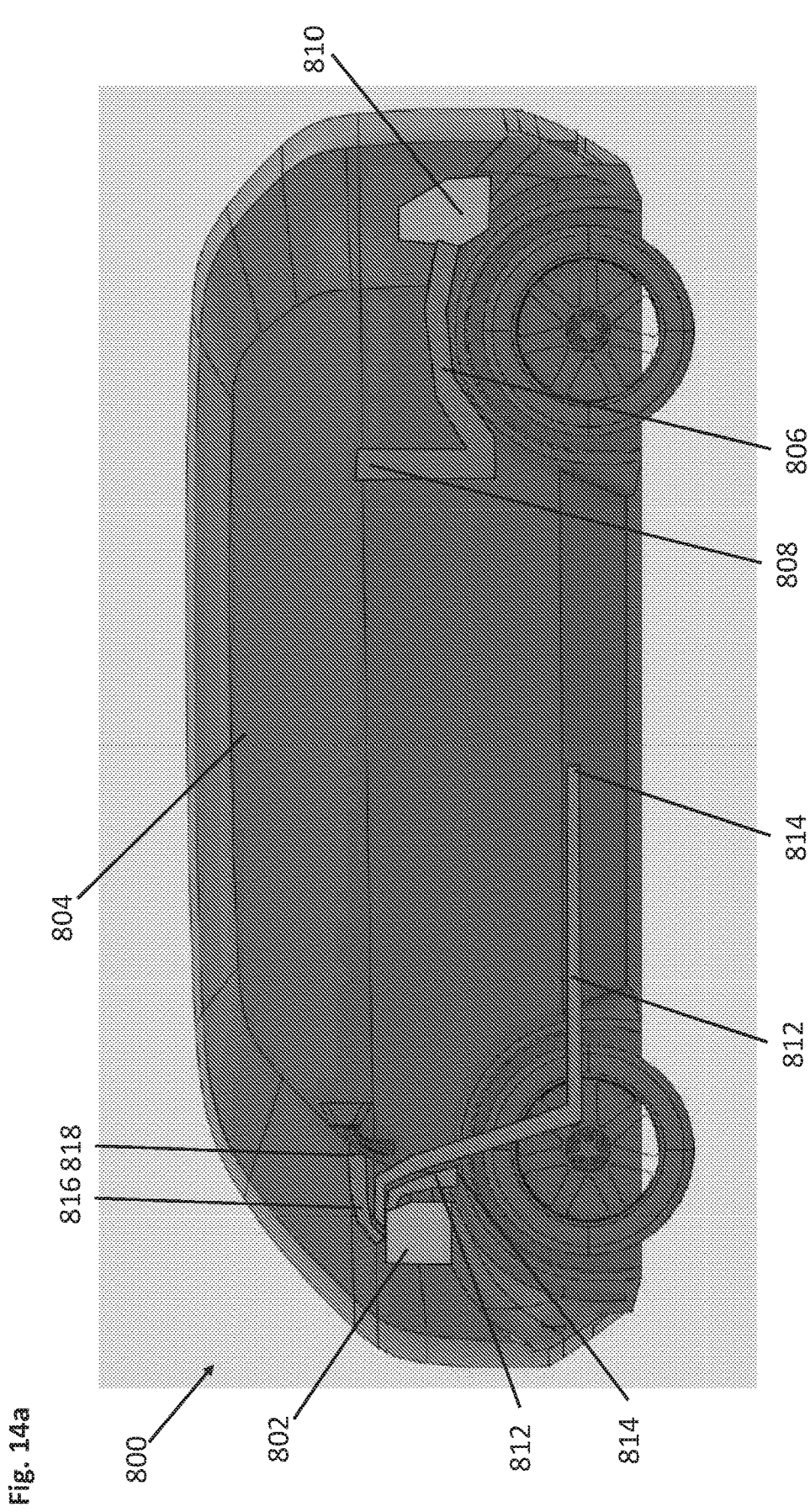
FIG. 14a illustrates a side view of a dual HVAC configuration in accordance with embodiments.
Figure 14B:
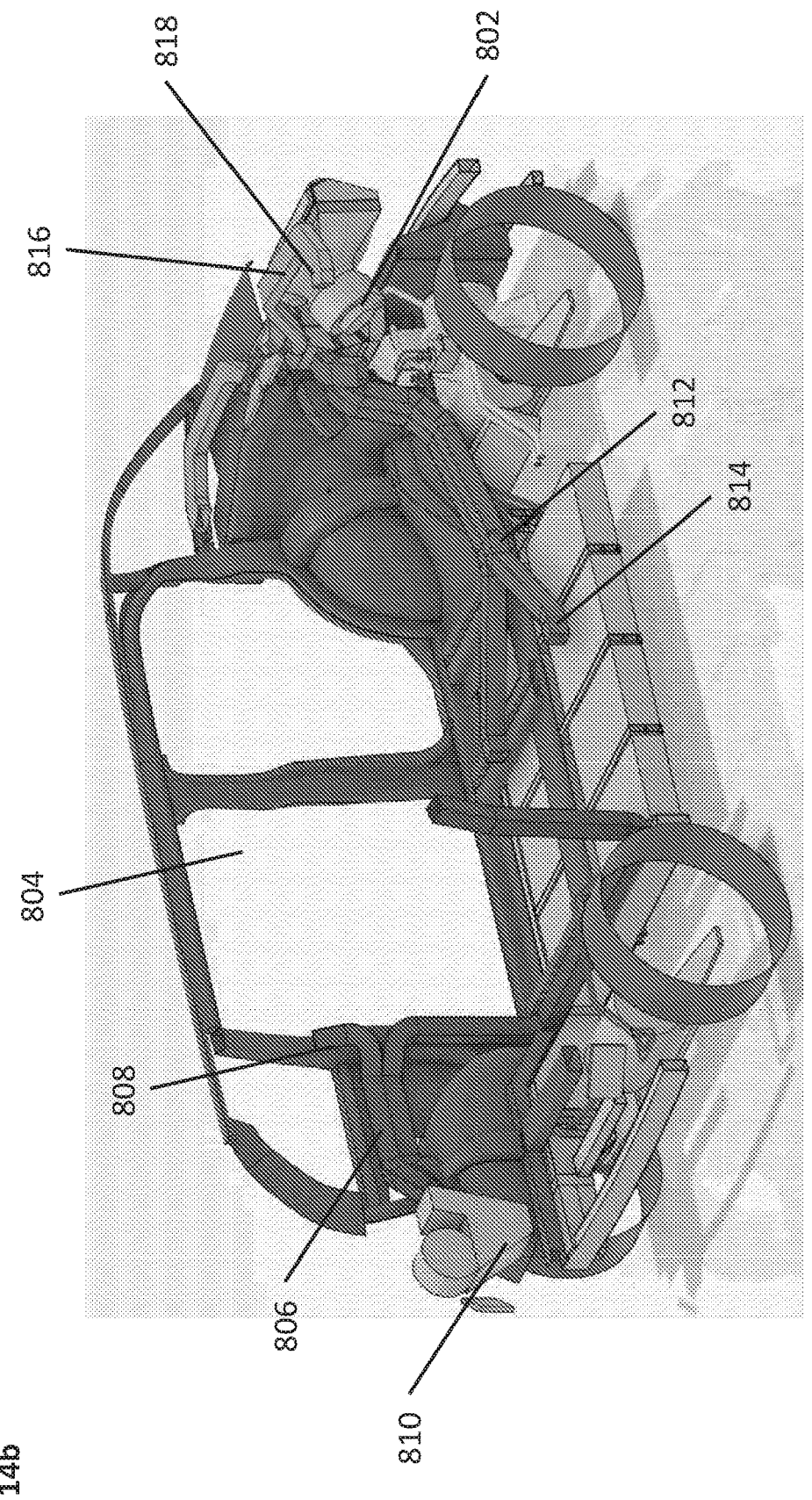
FIG. 14b illustrates a perspective view of a dual HVAC configuration in accordance with embodiments.
Figures 15A, 15B:
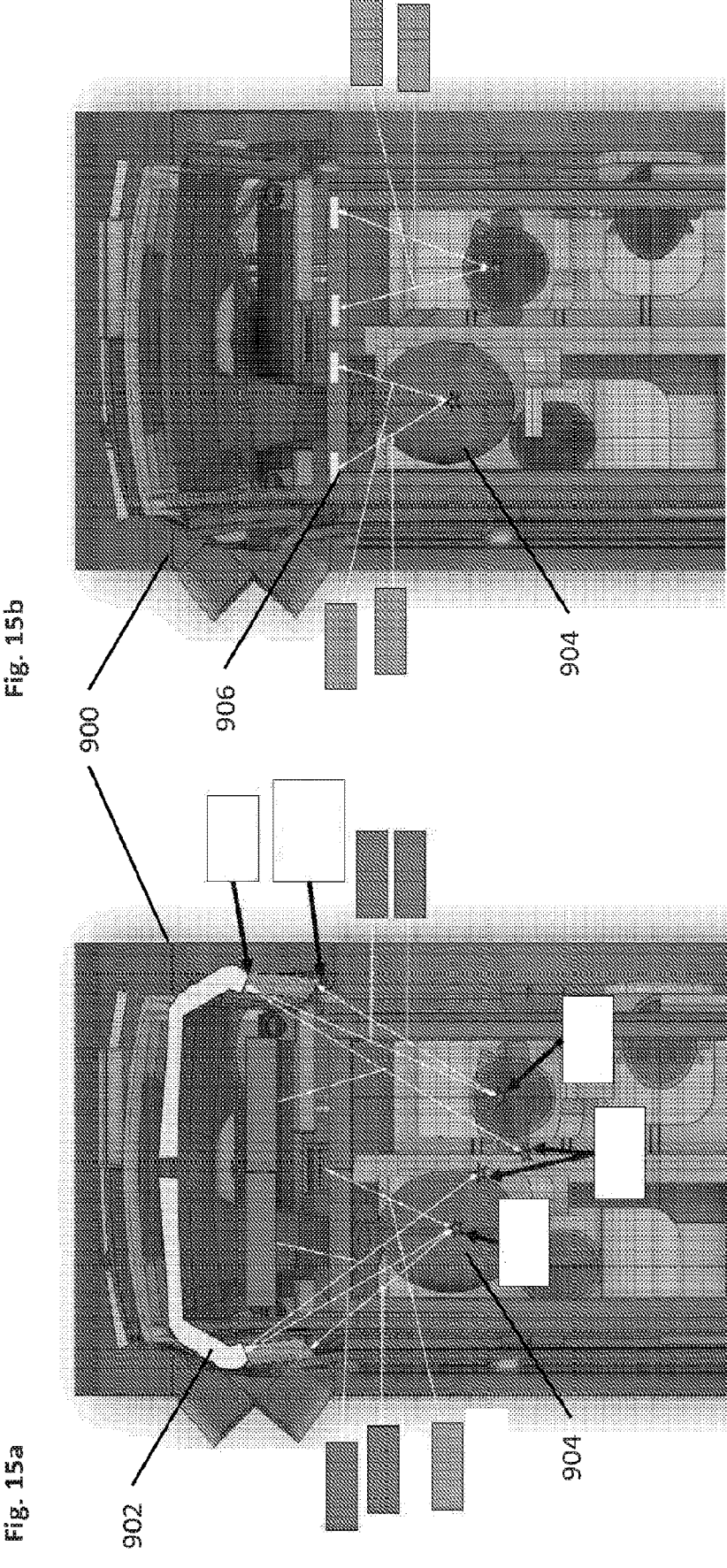
FIG. 15a illustrates a top view of the front vent layout of a dual HVAC configuration in accordance with embodiments.
FIG. 15b illustrates a top view of the front vent layout of a dual HVAC configuration in accordance with embodiments.

Although the embodiment shown in FIGS. 14*a* and 14*b* omit the cooling ducts and vents necessary to direct cooling air from the rear HVAC unit 810 to the front portion of the vehicle cabin, it will be understood that in many embodiments this ducting can be provided in addition to the ducting and vents of the supplemental cooling ducts 816 and vents 818 interconnected with the front HVAC unit 802. The advantage of including vents and ducting configured to direct cooling air from the rear HVAC unit to the front vehicle cabin through the cabin ceiling can be understood in reference to the schematics provided in FIGS. 15*a* and 15*b*. These figures provide exemplary distances from front vents 902 to a front passenger 904 when interconnected to a front HVAC unit in a dual HVAC system (as shown in FIGS. 14*a* and 14*b*), and from upper vents 906 to the same front passenger 904 when interconnected to a rear HVAC unit in a dual HVAC system (as shown in FIGS. 13*a* and 13*b*). These measurements show that front vents from a front HVAC system (FIG. 15*a*) in such embodiments where an open cabin is desired will be positioned significantly farther from the passenger than upper vents from a rear HVAC system (FIG. 15*b*), which are able to pass through the cabin ceiling headliner and thus be positioned quite close to the front passengers. This can provide certain advantages, particularly for flow-based HVAC system where force convection cooling of passengers is used to provide comfort.

Although the above embodiments have described certain arrangements of components and architectures for dual HVAC systems and interconnecting ducting therefore, it will be understood that alternative arrangements may be provided that allow for the implementation of such dual HVAC systems for electric vehicles, including, for example, alternative arrangements of front and rear HVAC components, ducting and vents.

Moreover, although many embodiments exhibit various systems in association with various embodiments of operational configurations of dual HVAC systems, it should be understood that any combination of the various structural and functional elements of such individual components of dual HVAC systems can be included and or omitted in any number of HVAC systems and/or thermal management systems.

Although the above discussion has focused on the overall HVAC system architecture, it will be understood that embodiments may also incorporate certain HVAC components capable of operating within the HVAC system to improve the overall efficiency of either the HVAC system or the electric vehicle. In various embodiments, HVAC fan components may be configured to improve the aerodynamic efficiency of the electric vehicle.

Specifically, in conventional vehicles a non-trivial amount of drag is created due to air flowing in through a grille or intake to the front heat exchanger, as shown schematically in FIG. 16. As depicted in the figures, the heat exchanger 1000 typically comprises a radiator bank 1002, a condenser bank 1004, and a fan or fans 1006 to pull sufficient air through in situations where there is not enough "ram" air coming in through the front intake. A conventional approach to tackling this aerodynamic inefficiency when the heat exchanger 1000 is not heavily loaded is to close off the intake grille 1008 with active shutters (or louvres) to block air coming in, thus redirecting it around and under the vehicle—a saving which could add several miles of range. Examples of vehicles that operate using such a design include, for example, vehicles manufactured by Ford, Chevy, Mazda, and electric vehicles including the Tesla S, X, and 3. In addition, companies like *Magna* International provide off-the-shelf solutions that provide such functionality to millions of vehicles.

One problem with active shutters is that they increase the cost, weight, airflow, and/or complexity of such vehicles. Accordingly, many vehicles omit such shutters meaning that this region on the car may contribute substantial permanent aerodynamic drag in typical usage, even when the air intake is not needed. Another strategy for addressing these aerodynamic inefficiencies involves active flow control—defined as an aerodynamic effect that requires power to produce. However, such active systems are typically not energy-efficient for normal cars, as the power saved due to drag reduction is often outweighed by the power input to a blowing/suction system. Such systems may also produce unwanted noise, and additional weight due to new components.

Figures 17A, 17B, 17C:
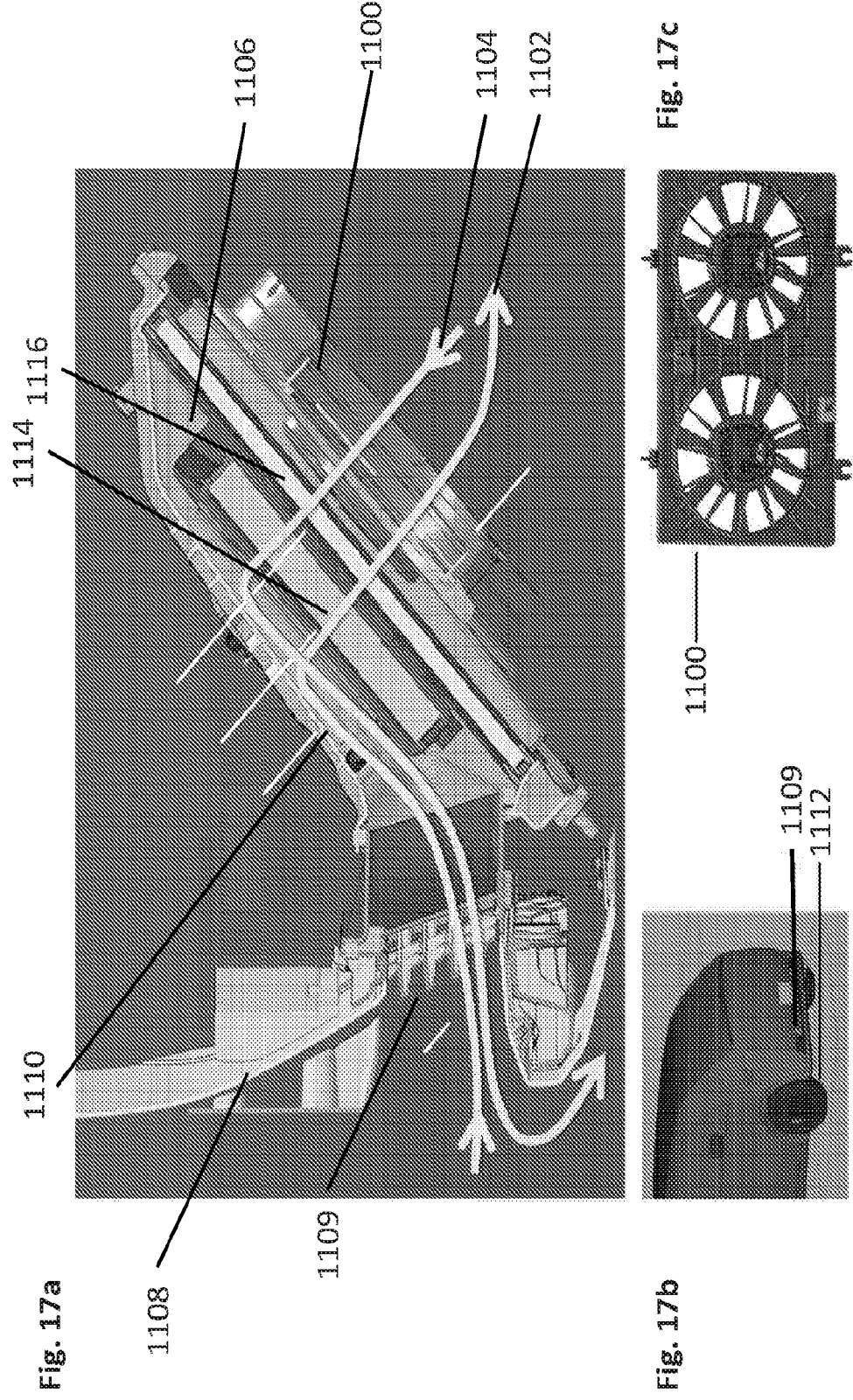
FIG. 17a illustrates a reversible front fan configuration in accordance with embodiments.
FIG. 17b illustrates a front view of an electric vehicle incorporating a reversible fan configuration in accordance with embodiments.
FIG. 17c illustrates a reversible fan component in accordance with embodiments.

As shown in FIGS. 17*a* to 17*c*, in many embodiments the HVAC system may comprise one or more fans 1100 configured to pull air 1102 in through the air intake of the vehicle and/or reverse the flow of air to expel it 1104 from the air intake. In various embodiments, as shown in the figures, a fan-driven heat exchanger 1106 (e.g., one or more fans as shown in FIG. 17*c*) is disposed at the front of the vehicle 1108 (as shown in FIG. 17*b*) in line with the air intake 1109. The heat exchanger 1106 includes a radiator bank 1114 and a condenser bank 1116. This fan-driven heat exchange is fed by a duct 1110. During operation, the fan(s) 1100 pull air through the heat exchanger 1106 and dump the air 1102 out usually into the wheel wells 1112 of the vehicle. In various embodiments, the fan(s) are configured to also operate in reverse—that is, instead of pulling air "in" to the system 1102 they also are capable of pushing air "out" through the system (e.g., drawing air from the wheel wells and pushing it into the "intake" duct) 1104.

Figure 18:
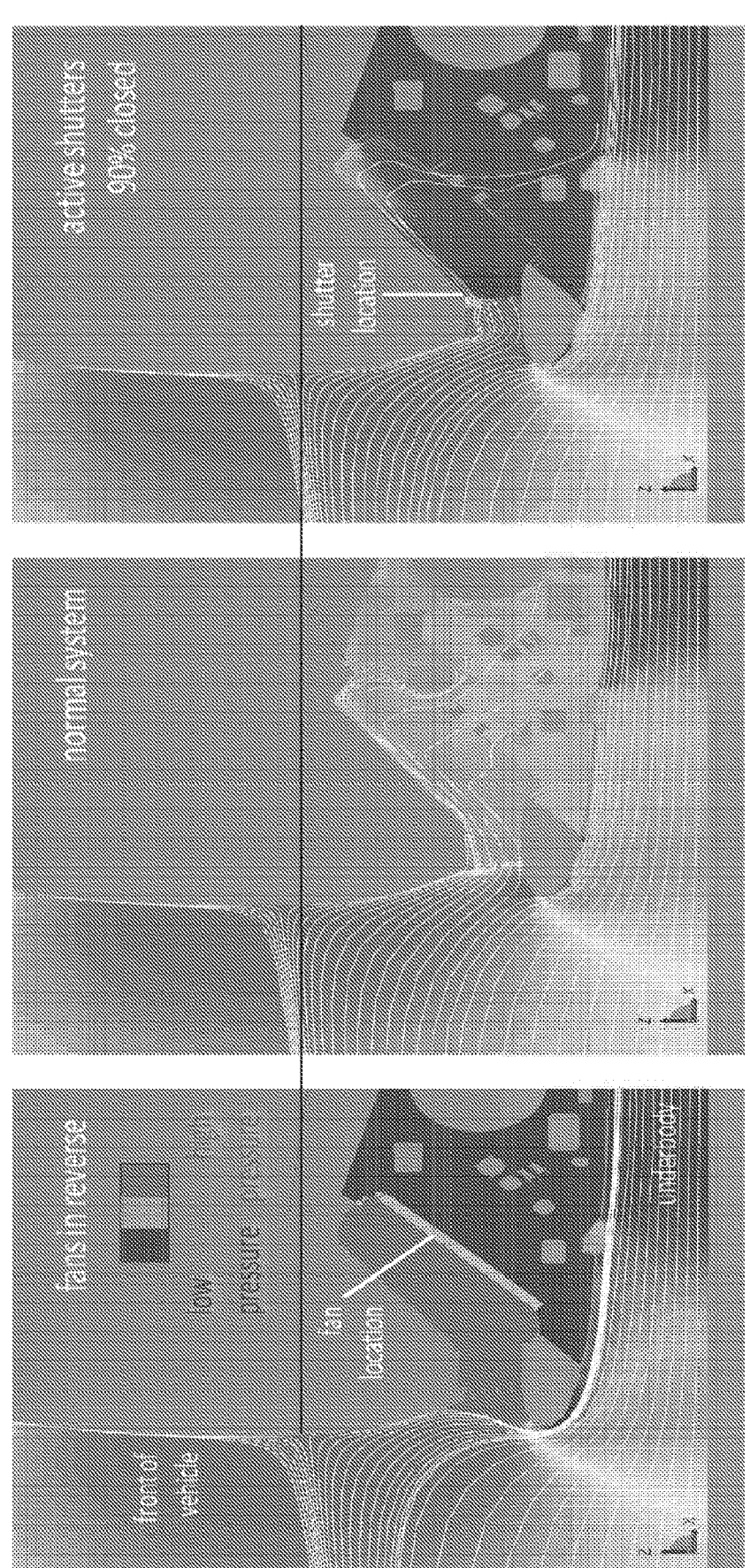
FIG. 18 illustrates images of aerodynamic flow studies conducted on reversible fan configurations in accordance with embodiments.
Figure 20B:
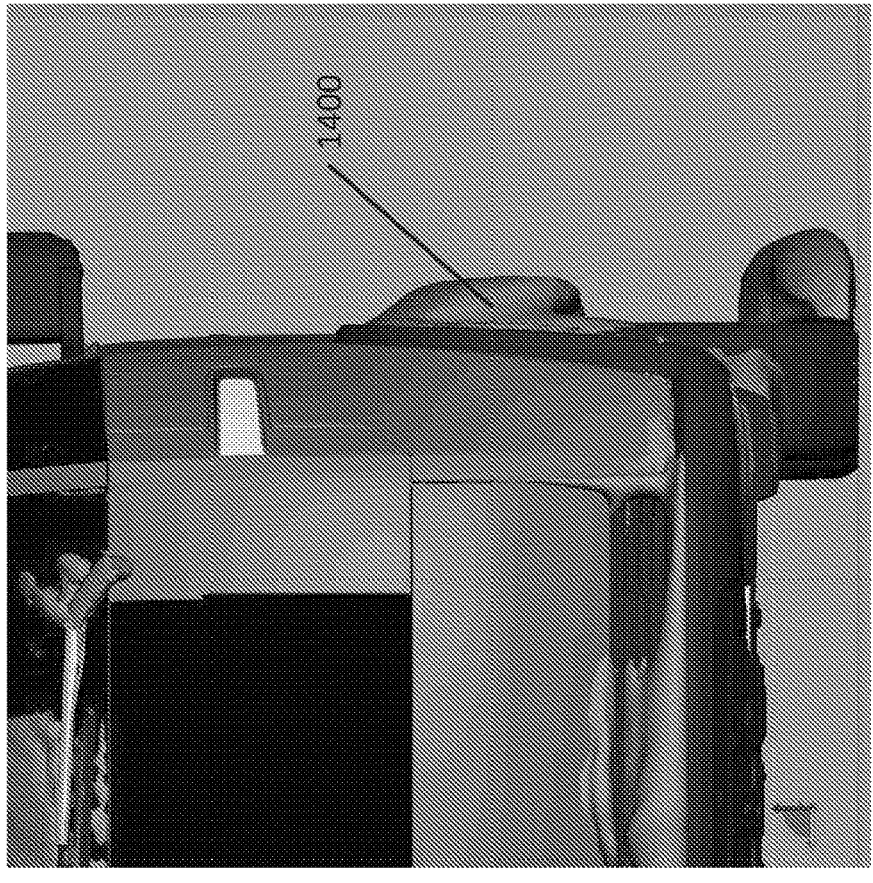
FIGS. 20a and 20b illustrate images of aerodynamic flow studies conducted on the wheel well of a vehicle in normal (FIG. 20a) and reversible (FIG. 20b) fan configurations in accordance with embodiments.
Figure 20A:
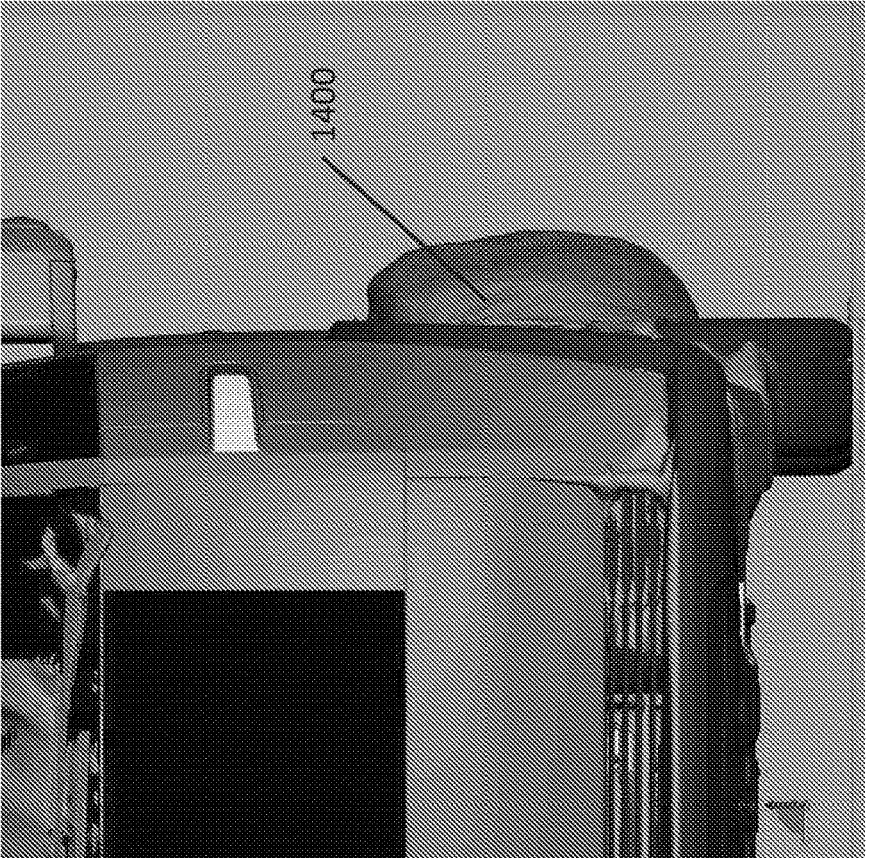

By pushing air out through the intake, the intake duct is brought to a relatively high pressure. Air likes to flow from high to low pressure and not vice-versa. Accordingly, air in such a configuration would be highly discouraged from entering the front intake, providing the same effect as active shutters, as shown by the comparative high resolution computational fluid dynamics (CFD) simulation provided in FIG. 18. Moreover, in various embodiments the fans may be operated at higher rpm, such that air flow is actually pushed out of the duct 1110 whereupon it is sucked under the car. This underbody airflow can be beneficial from an aerodynamic perspective. Specifically, as shown in the simulations provided in FIG. 19*a*, during normal operation the wheel well area 1300 from which flow into the fans would now be drawn can be at a relatively high pressure and feature stagnant air—in normal driving this tends to get sucked outboard to the lower pressure area 1400 around the car (as shown in the simulation provide in FIG. 20*a*), creating a highly undesirable "pumping" effect of air being pushed out to the side of the car where it constitutes a significant source of drag, known as a wheel wake. However, with reverse fans in operation, the air in this region is drawn into the vehicle to feed the duct, thus lowering the pressure (see FIG. 19*b*) and reducing the amount of air pushed out to the side of the car (see FIG. 20*b*).

The combined effect of pulling in the front wheel wakes, pressurizing the duct to stop air coming in naturally, and exhausting air out the front and under the car, according to embodiments, can provide a substantial drag reduction effect that can offer a net power saving the vehicle. In particular, since drag increases with the square of velocity, while the effect might be almost negligible at 30 mph, at freeway speeds it can provide a substantial power savings. Moreover, this drag reduction effect is more significant for large (bluff) vehicle with un-optimized wheel well regions (e.g., where styling or other reasons prevent aerodynamic optimization of the wheels and wheel wells).

Although embodiments shown in the drawings depict fans 1100 configured in line with an air intake 1009 and various cooling elements of a heat exchanger 1106, such as, for example, a radiator 1014 and condenser 1016, it will be understood that any suitable arrangement of ducts and cooling elements may be provided as required for the specific application. Regardless of the specific arrangement of elements, embodiments of such a system allow for the use of pre-existing components on a vehicle, such that, when not in use, do not add extra weight or cause additional drag. Accordingly, by using existing fans and ducts, embodiments are able to achieve a similar effect to active shutters with reduced cost, mass and complexity. Moreover, simulations of such embodiments show that, rather than just reproduce the effect of shutters, the pull of air from the wheel wells may provide a secondary aerodynamic advantage capable of reducing drag when compared to either the pressurized duct or an existing shutter system. The overall effect of implementing such embodiments would be to increase range and/or reduced battery size/weight to achieve a range advantage in such vehicles.

Moreover, although many embodiments exhibit various systems in association with various embodiments of operational configurations of reversible fans, it should be understood that any combination of the various structural and functional elements of such individual components of reversible fans can be included and or omitted in any number of HVAC systems and/or thermal management systems.

Figure 21:
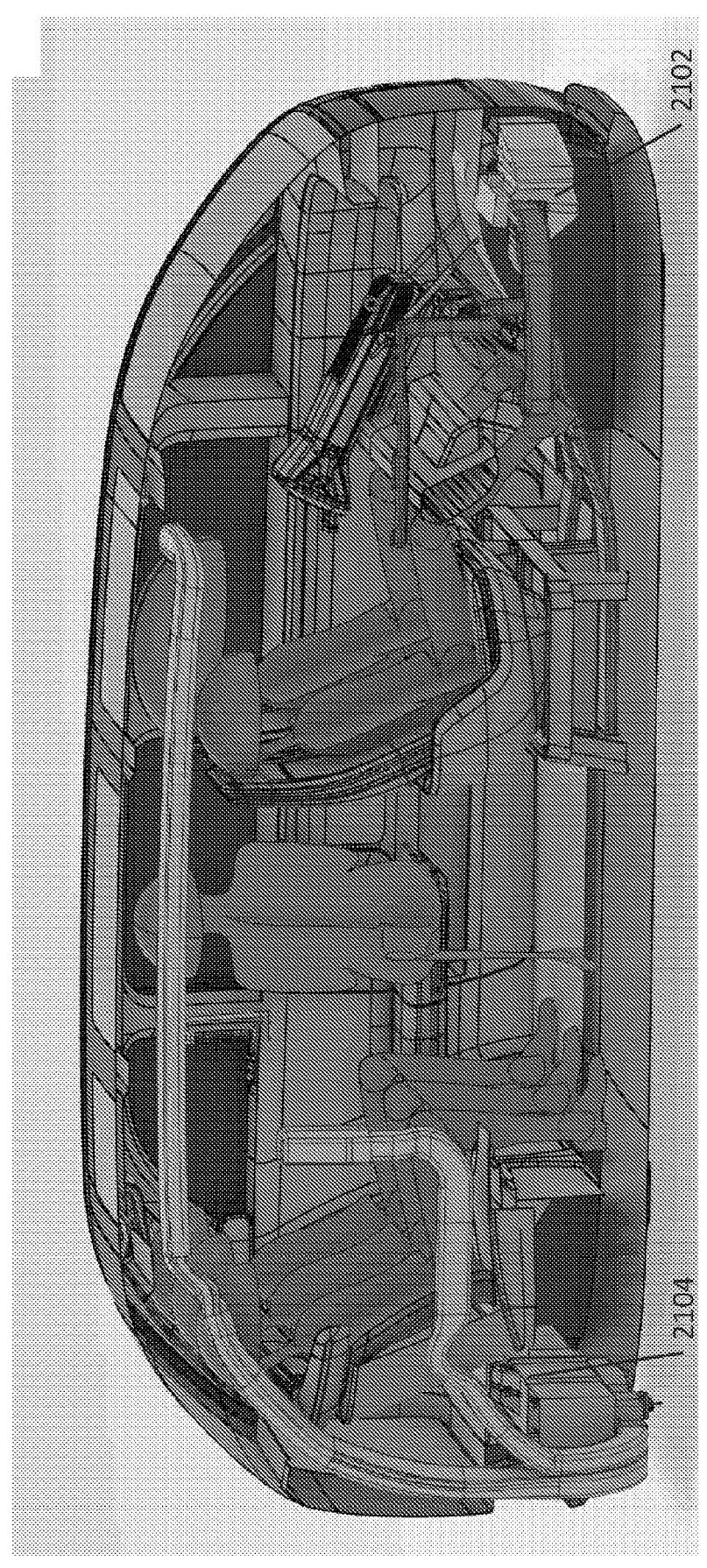
FIG. 21 illustrates a schematic of an electric vehicle cabin implementing a dual HVAC system incorporating wellness elements in accordance with embodiments.

Although the above discussion has focused on the details of HVAC systems necessary for supplying cooling air, embodiments are also directed to components provided for improving the wellness of passengers riding within the vehicle. Specifically, studies show that fine dust and other particulates are increasingly linked to a slew of health conditions, from asthma to cancer and neurological conditions. A range of specialist filters have been developed capable of capturing different ranges of fine particulate matter. In particular, as shown in FIG. 21, embodiments may include filters 2102/2104 within the HVAC system components (e.g., a front filter 2102 and/or a rear filter element 2104) configured to filter a desired level of particulates from the air entering or recirculating within the vehicle, along with other support elements such as, for example, air quality sensors, etc.

Embodiments of filters may take any suitable form, such as, for example, fine particulate filters designed to remove dust and other airborne particles; advanced barriers designed to destroy viruses, mold, bacteria and yeast; and physical methods of destroying airborne microorganisms through exposure to constant electric fields. Examples of fine particulate filters may include, for example, particle filters, high efficiency particular air (HEPA) filters, activated carbon filters and other proprietary filters, as may be deemed suitable for a particular application. Exemplary sensors may also take a suitable form, including laser sensors, $CO_2$ level monitoring, etc.

Figure 22B:
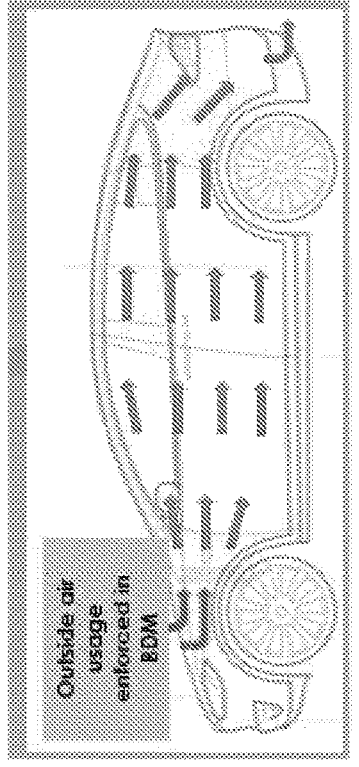
FIG. 22b illustrates a vehicle filtration system in accordance with the prior art.
Figure 22A:
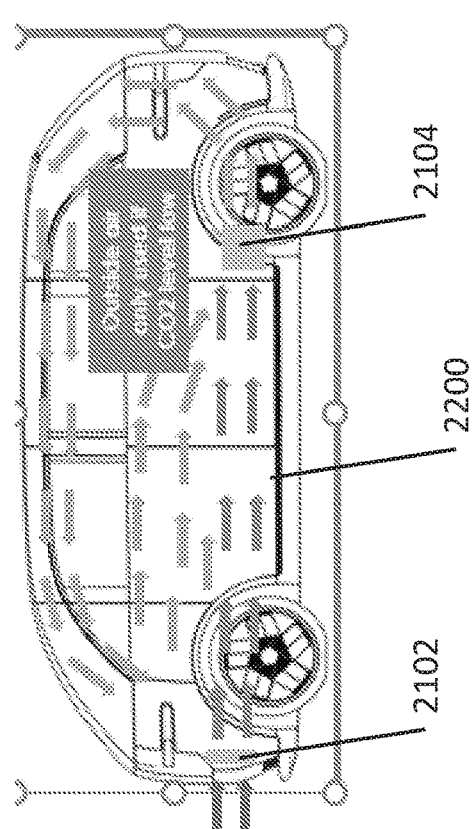
FIG. 22a illustrates a vehicle filtration system in accordance with embodiments.

Embodiments of air filters may also be advantageously incorporated into dual HVAC systems, as shown in FIGS. 22*a* and 22*b*. Specifically, as shown in FIG. 22*a*, in a dual HVAC system 2200 the air may be filtered (e.g., using a HEPA filter system) both in a fresh air mode through a front HVAC component 2102 and in a recirculation mode through a rear HVAC component 2104. In such embodiments, constant filtration of the air can be made without also requiring the introduction and constant temperature management of outside air unless made necessary by a monitoring sensor detecting elevate contaminants within the vehicle cabin, such as, for example, $CO_2$. Such a system allows for an increase in efficiency for the system. This can be compared with conventional filtration systems, such as, for example, Tesla's "HEPA/Bioweapon Defense Mode (BDM)". In such systems using conventional single-unit HVAC architectures, filters are provided only at the intake. Because of this arrangement, air must be forced into a fresh only mode to be routed through the filter system. Accordingly, outside air must be constantly pulled into the system creating inefficiencies due to the constant need to condition (heat or cool) the outside air. A high blower setting must also be used to pressurize the cabin in such configurations further increasing the inefficiencies of such systems.

In addition to air filtration systems, it will be understood that HVAC systems may incorporate other wellness elements such as, for example, standard infrared capable cameras tied to computer algorithms that can detect facial expressions, glance direction, alertness; sub terahertz radar capable of registering breathing rate, heartrate and rhythm, occupant classification; sensors designed to detect and classify particulate matter from dust to Volatile Organic Compounds (VOCs), etc.

Moreover, although many embodiments exhibit various systems in association with various embodiments of operational configurations of dual HVAC systems, it should be understood that any combination of the various structural and functional elements of such individual components of dual HVAC systems can be included and or omitted in any number of HVAC systems and/or thermal management systems.

Figure 23:
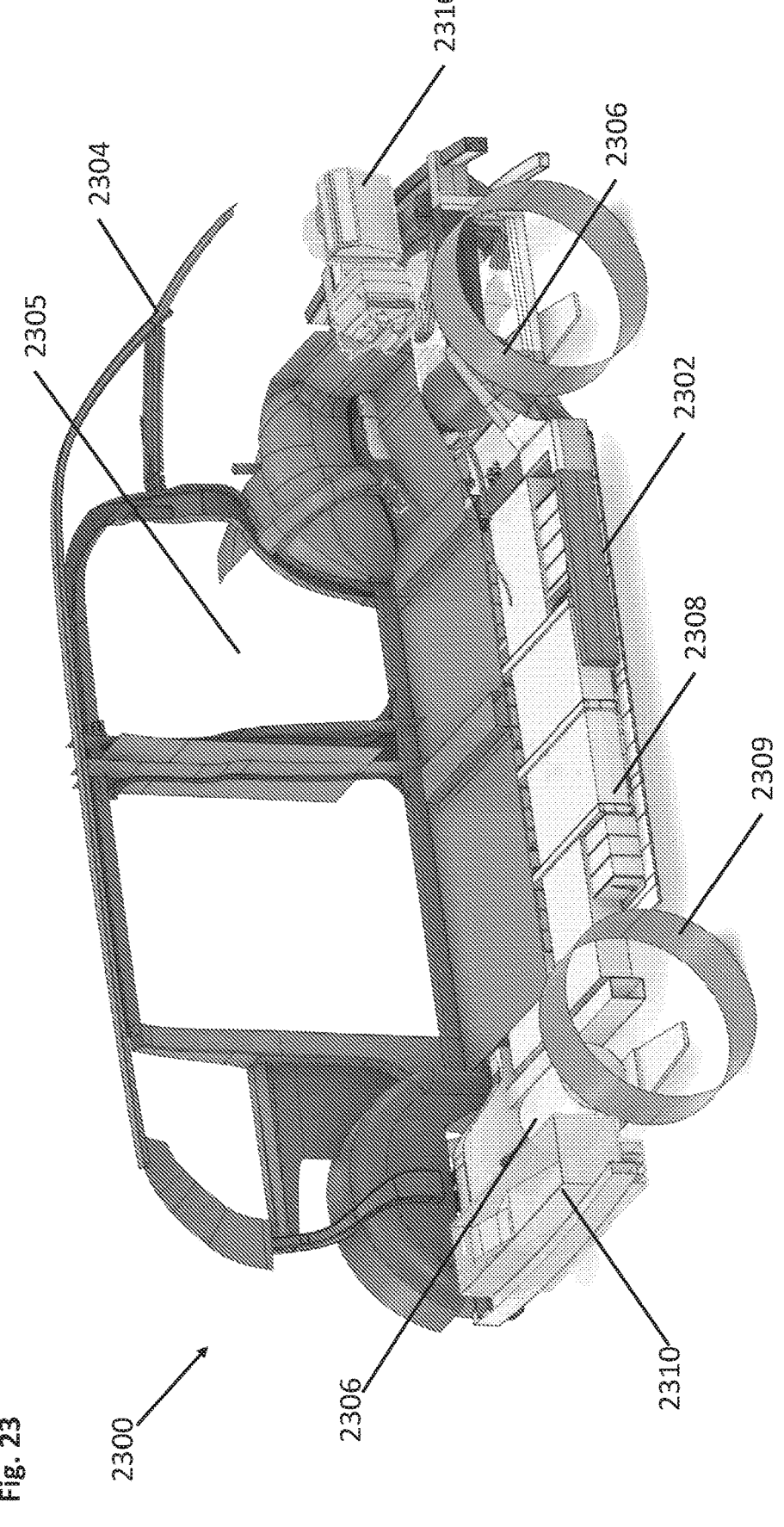
FIG. 23 illustrates a schematic of an electric vehicle platforms incorporating HVAC systems in accordance with embodiments.

Although the above discussion has focused on the details of HVAC and thermal management systems, embodiments are also directed to vehicle platforms incorporating such HVAC and thermal management systems. As shown in FIG. 23, a vehicle 2300 may be divided conceptually between a vehicle platform 2302 and a vehicle body 2304 that encompasses a passenger compartment or cabin 2305. In many embodiments, the vehicle platform comprises certain key functional systems, sub-systems and components, including those needed to generate propulsion and maintain the control and stability of the vehicle. In other words, vehicle platforms or skateboards may contain sufficient components such that the platform may be adaptable to a variety of vehicle bodies that may be integrated therewith.

FIG. 23 illustrates the overall layout of an illustrative vehicle platform 2302 that integrates functional systems including drivetrain 2306 and energy storage 2308, among others. Typically, although not necessarily, such drivetrain and energy storage systems, as used herein, are disposed within the boundaries of the vehicle platform, which will be taken to comprise a generally horizontal vehicle platform plane extending the width of the vehicle platform and from the bottom of the vehicle cabin to the bottom face of the vehicle frame structure. The boundaries of the vehicle platform may also comprise areas positioned anywhere within the upper and lower dimensions of the wheels and/or tires 2309 of the vehicle. With respect to the platform plane, it should be noted that, as shown in FIG. 23, many embodiments of the vehicle platform may comprise a frame having portions disposed at different heights relative to each other (e.g., having front and rear portions elevated relative to a central portion as illustrate in FIG. 23), in such embodiments it will be understood that the platform may be described as an undulating plane such that in some embodiments functional components are defined as not extending above an undulating plane defined by an upper face of the subject portion of the vehicle platform frame. Regardless of the specific boundaries of the vehicle platform, it will be understood that functional components, in many embodiments, are disposed within the inner volume of this platform plane.

The embodiment shown in FIG. 23 comprises one functional layout suitable for an electric vehicle, including an energy storage system (e.g., battery pack(s)) 2308), front and rear drive trains 2306 (e.g. electric motors and associated power electronics, transmissions, etc.), and control systems, such as suspension, steering and braking not shown. Atop the vehicle platforms 2302 a wide range of vehicle bodies 2304 may be attached through attachment points whereby the vehicle bodies may connect to the underlying vehicle platform frame. For example, FIG. 23 illustrates embodiments in which the body structure disposed on top of the vehicle platform takes the form of a van. HVAC systems 2310 are disposed such that heating and cooling of the passenger compartment 2305 of the vehicle body 2304 may be achieved.

Although the HVAC system 2310 is shown as being split between front and rear elements, it will be understood that any layout desired may be used in accordance with embodiments. In addition, although the drivetrain 2306 and energy storage 2308 systems are shown being fully disposed within the vehicle platform 2302, and the HVAC system being fully disposed within the vehicle body 2304, it will be understood that the various components of the thermal management systems may be disposed within either the vehicle platform 2302 or the vehicle body 2304, or split therebetween. In addition, portions of each of the thermal management systems may communicate between the vehicle platform and vehicle cabin.

In various embodiments, the HVAC and thermal management systems are arranged within the vehicle platform and vehicle cabin to reduce the number of required interconnections between the platform and cabin. Some embodiments implement HVAC systems in which substantially all of the heating and cooling components are disposed within the vehicle platform such that the platform is of a self-contained nature in which no significant elements intrude above the upper face of the platform. Such an architecture allows for the integration of a variety of vehicle bodies without the need for substantial rearrangement of functional elements in attaching new vehicle bodies.

Essentially, the unique HVAC and thermal management systems and electric vehicle platform configurations according to embodiments allow for vehicle body designs where the entire passenger cabin may be reconfigured for desired purposes without a necessary reconfiguration of the HVAC and thermal management systems. While the above-discussion has focused on highlighting the characteristic features of embodiments of HVAC and thermal management systems for electric vehicle platforms, it will be understood that they are meant as specific illustrative configurations of such systems and their functional components. Such systems and components may be implemented separately and in combination to achieve numerous and varied HVAC and thermal management systems architectures.

Moreover, although many embodiments exhibit various systems in association with various embodiments of operational configurations of thermal management systems, it should be understood that any combination of the various structural and functional elements of such individual components of these operational configurations can be included and or omitted in any number of HVAC systems and/or thermal management systems.

Figure 24:
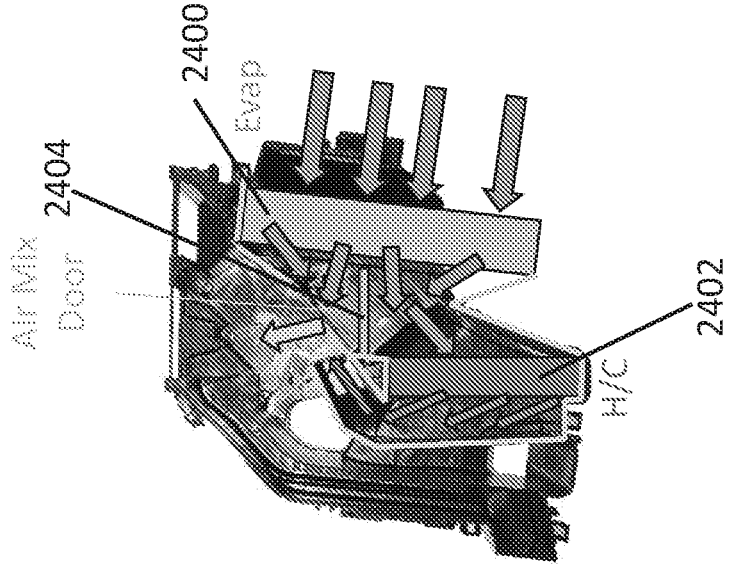
FIG. 24 illustrates a cross sectional view of a prior art illustrate of an HVAC system.

FIG. 24 illustrates a conventional HVAC system which includes an evaporator 2400 and a heater core 2402. A blower operates in order to blow air over the evaporator 2400. The evaporator 2400 cools the air which creates cool air. A portion of the cool air may run over the heater core 2402 in order to produce heated air. The heated air may be mixed with the cool air to produce the desired temperature of air that may be outputted. An air mix door 2404 controls the amount of cool air and heated air and thus produces air with a desired temperature. This type of design may be inefficient because needing to mix cool air with heated air is an inefficient method of producing air of a desired temperature. Specifically, unlike in vehicles with combustion engines, electric vehicles do not typically produce large amounts of heat and thus there may be an ample supply of heat to produce a desired temperature in electric vehicles. Further, HVAC systems which produce a desired temperature through mixing typically include a larger housing to facilitate the air mixing which increases the size of the HVAC system and may restrict the design of an electric vehicle. Also, including an air mix door 2404 may include actuators and doors which increase mass and cost of the system.

Figures 25A, 25B, 25C:
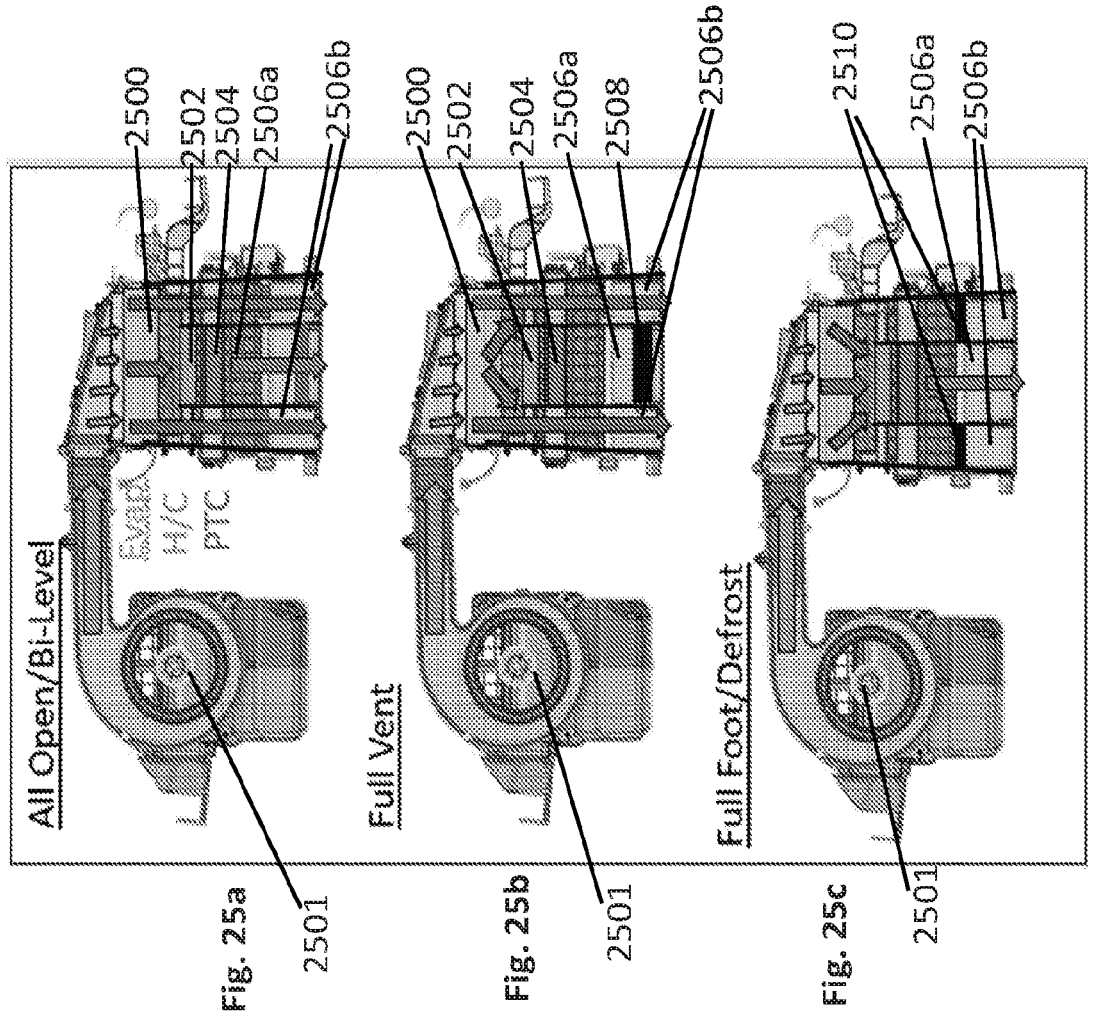
FIGS. 25a to 25c illustrate a schematic view of an HVAC system according to embodiments.

FIGS. 25*a*-25*c* are multiple views of an HVAC system which does not perform mixing. In this system, a blower 2501 blows air onto an evaporator 2500 which cools the air to produce cold air. The cold air runs into a divided vent which includes a left hand vent and right hand vent 2506*b* and a foot/defrost vent 2506*a*. The foot/defrost vent 2506*a* includes an auxiliary heater 2504 which provides heat. The foot/defrost vent 2506*a* may also include a heater core 2502 which may be thermally connected to the drivetrain cooling loop and thus pulls heat from the drivetrain to provide heat to the HVAC system. The arrows represent the flow of air through the HVAC system.

FIG. 25*a* illustrates a mode of operation where air is allowed to output through both the left hand and right hand vent 2506*b* and the foot/defrost vent 2506*a* into the vehicle cabin. In this operational mode, there will be a combination of heat and cool air which will be provided to the cabin. FIG. 25*b* illustrates a mode of operation where air is blocked from exiting the foot/defrost vent 2506*a* by a foot/defrost door 2508 and thus air is only provided through the left hand and right hand vent 2506*b* to the vehicle cabin. In this operational mode, there will be only cool air which enters the cabin and thus will be during periods where it is desirable to have maximum cold air. FIG. 25*c* illustrates a mode of operation where air is blocked from exiting the left hand and right hand vents 2506*b* by one or more left hand and right hand vent doors 2510 and air will solely be outputted through the foot/defrost vent. As illustrated, all the air will pass through the auxiliary heater 2504 and/or the heater core 2502 and thus will be heated. In this operational mode, there will be only hot air which enters the cabin and thus will be during periods where it is desirable to heat the cabin and/or defrost the windows. It is further appreciated that a combination of different modes will yield different air flow temperatures. For example, if the foot/defrost door 2508 illustrated in FIG. 25*b* is not fully closed, then some hot air will flow out of the foot/defrost vent 2506*a* and into the cabin but less than would result in the foot/defrost door 2508 being fully open. Further, if the left hand and right hand vent doors 2510 illustrated in FIG. 25*c* are only partially shut, then some cool air will flow out of the left hand and right hand vents 2506*b*, but more than if the left hand and right hand vent doors 2510 was fully shut. Further, the blower 2501 may be controllable in order to allow for different volumes of air flow. Thus, both the volume of air flow and the consistency of the air entering the vehicle cabin may be controlled. Advantageously, an internal mixing of the hot and cold air is not present in the HVAC system described in connection with FIGS. 25*a*-25*c* which alleviates many of the disadvantages present in the conventional HVAC systems.

Further, it is appreciated that air flow based cooling may be achieved. Generally, thermostats in vehicles achieve user set temperatures based on adjusting the temperature of the output air through the vents. Flow, may be adjusted, however generally, thermostats set a high flow when extreme cooling or heating adjustments to the vehicle cabin are needed. Then flow is set to a fixed lower value when extreme cooling or heating adjustments are not needed. Flow adjustments are based on the volume of air that would be beneficial. However, it has been discovered that air flow may also be used to cool passengers of a vehicle by itself. A passenger experiencing more air flow will feel colder than a person with less airflow at the same temperature. Thus, the HVAC systems contemplated in this application include a thermostat which regulates the air flow as well as the amount of hot and cold air outputted into the cabin in order to regulate a passenger's perception of hot and/or cold.

Figures 26A, 26B, 26C:
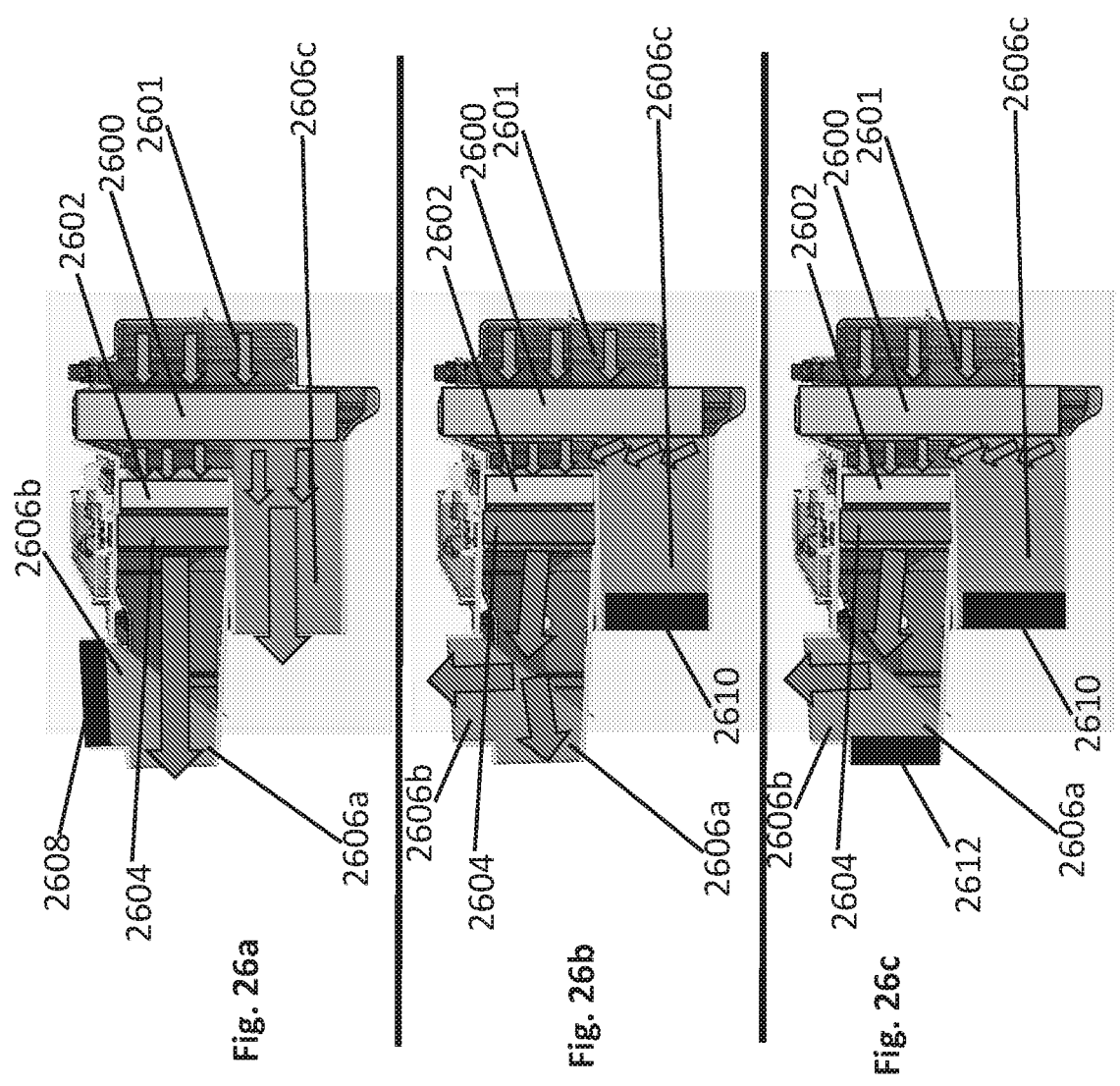
FIGS. 26a to 26c illustrate a schematic view of an HVAC system according to embodiments.

FIGS. 26*a*-26*c* are multiple views of an exemplary implementation of an HVAC system. The concept of this implementation is similar to the HVAC system shown and described in connection with FIGS. 25*a*-25*c*. In this system, a blower 2601 blows air onto an evaporator 2600 which cools the air to produce cold air. The cold air is then routed into a passenger vent 2606*c* and a foot/defrost path 2606*a*, 2606*b*. The air routed through the foot/defrost vent 2606*a*, 2606*b* is warmed by an auxiliary heater 2604 and/or a heater core 2602. As described above, the heater core 2602 may be thermally connected to the drivetrain cooling loop and thus pull heat from the drivetrain to provide heat to the HVAC system.

FIG. 26*a* illustrates a mode of operation where air is blocked from exiting through a defrost vent 2606*b* by a defrost vent door 2608. Heated air exits through the foot vent 2606*a* and cold air exits through the passenger vent 2606*c*. FIG. 26*b* illustrates a mode of operation where air is blocked from exiting through the passenger vent 2606*c* by the passenger vent door 2610. Heated air exits through the defrost vent 2606*b* and the foot vent 2606*a*. FIG. 26*c* illustrates a mode of operation where air is blocked from exiting through the foot vent 2606*a* by the foot vent door 2612 and the passenger vent 2606*c* by the passenger vent door 2010. Thus only heated air exits through the defrost vent 2606*b*. It is further appreciated that a combination of different mode will yield different air flow temperatures. For example, if the defrost vent door 2608, passenger vent door 2610, and/or the foot door 2612, is only partially opened/ closed then air may be controlled through each of these vents. Further, the blower 2601 may be controllable in order to allow for different volumes of air flow. Thus, both the volume of air flow and the consistency of the air entering the vehicle cabin may be controlled. Advantageously, an internal mixing of the hot and cold air is not present in the HVAC system described in connection with FIGS. 26*a*-26*c* which alleviates many of the disadvantages present in the conventional HVAC systems.

Figures 27A, 27B, 27C:
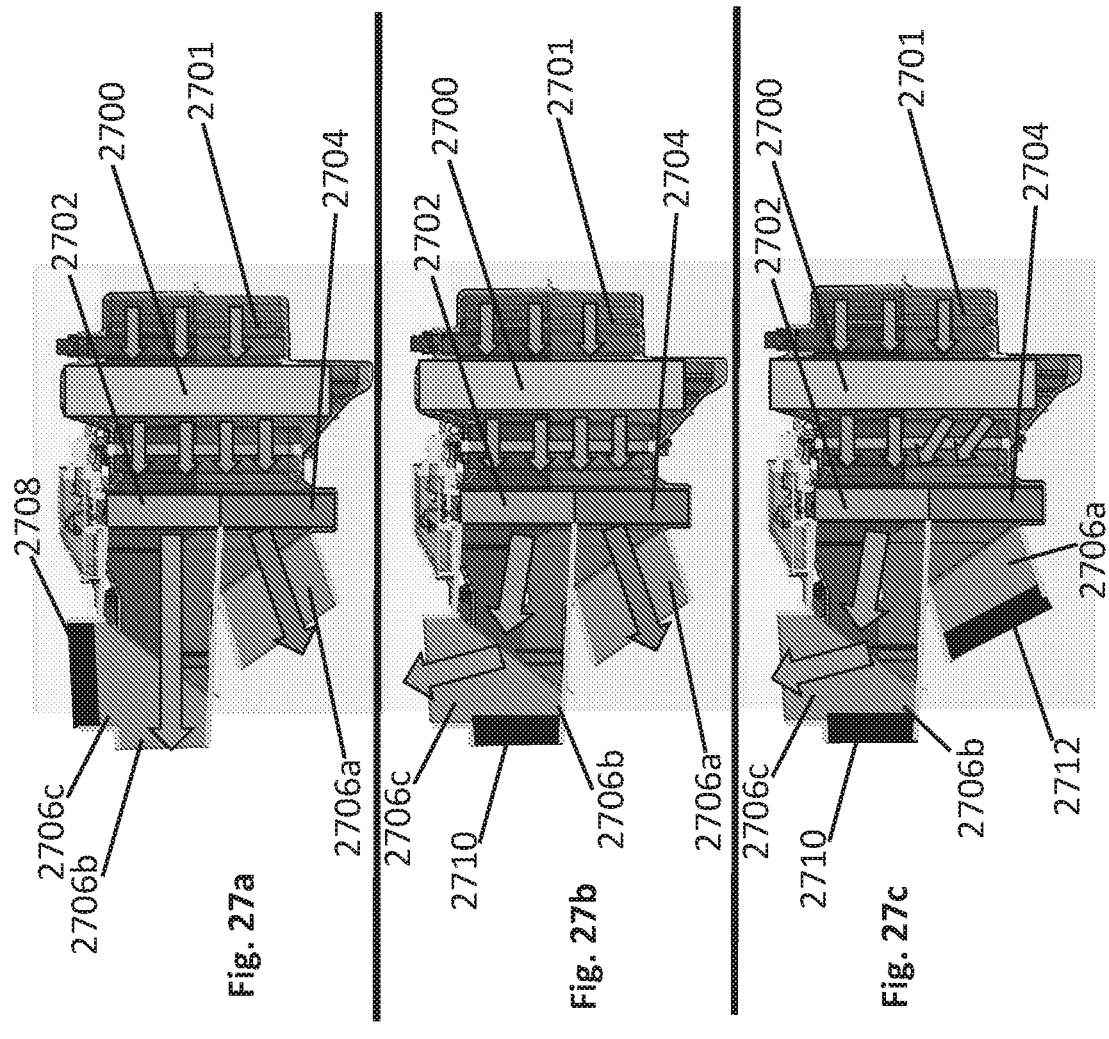
FIGS. 27a to 27c illustrate a schematic view of an HVAC system according to embodiments.

FIGS. 27*a*-27*c* are multiple views of another exemplary implementation of an HVAC system. The concept of this implementation is similar to the HVAC system shown and described in connection with FIGS. 25*a*-25*c* and FIGS. 26*a*-26*c*. In this system, a blower 2701 blows air onto an evaporator 2700 which cools the air to produce cold air. The cold air is then routed into a passenger vent 2706*b*, defrost vent 2706*c*, and a foot vent 2706*a*. In this implementation, a heating element 2702 is between the evaporator 2700 and a cavity which connects to the passenger vent 2706*b* and the defrost vent 2706*c*. Thus, cold air is blown onto the heating element which creates hot air which is circulated into the passenger vent 2706*b* and the defrost vent 2706*c*. Another heating element 2704 is placed between the evaporator 2700 and the foot vent 2706*a*. The heating element 2702 may be separately controlled from the other heating element 2704. Thus, the passenger vent 2706*b* and the defrost vent 2706*c* may be provided with differently temperature controlled air from air provided to the foot vent 2706*a*.

FIG. 27*a* illustrates a mode of operation where air is blocked from exiting through the defrost vent 2706*c* by a defrost vent door 2608. In this mode, air exits through the passenger vent 2706*b* and the foot vent 2706*a*. FIG. 27*b* illustrates a mode of operation where air is blocked from exiting through the passenger vent 2706*b* by a passenger vent door 2710. In this mode, air exists through the defrost vent 2706*c* and the foot vent 2706*a*. FIG. 27*c* illustrates a mode of operation where air is blocked from exiting through the passenger vent 2706*b* by a passenger vent door 2710 and through the foot vent 2706*a* by a foot vent door 2712. It is further appreciated that a combination of different mode will yield different air flow temperatures. For example, if the defrost vent door 2708, passenger vent door 2710, and/or the foot door 2712, is only partially opened/closed then air may be controlled through each of these vents. Further, the blower 2701 may be controllable in order to allow for different volumes of air flow. Thus, both the volume of air flow and the consistency of the air entering the vehicle cabin may be controlled. Advantageously, an internal mixing of the hot and cold air is not present in the HVAC system described in connection with FIGS. 27*a*-27*c* which alleviates many of the disadvantages present in the conventional HVAC systems.

Figures 28A, 28B, 28C:
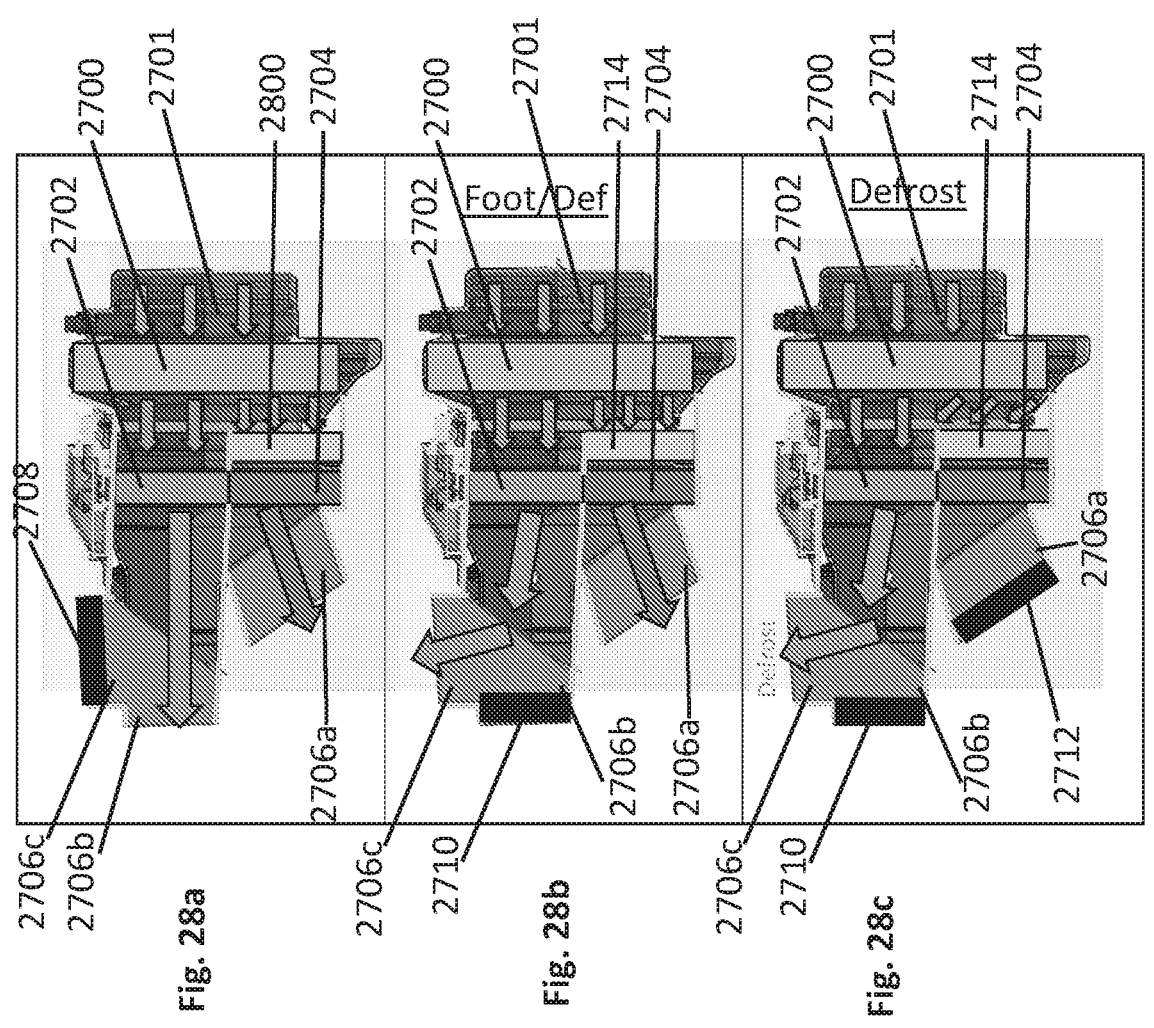
FIGS. 28a to 28c illustrate a schematic view of an HVAC system according to embodiments.

FIGS. 28*a*-28*c* are multiple views of another exemplary implementation of an HVAC system. This implementation shares features which are identically numbered with the system described in connection with FIGS. 27*a*-27*c*. These features will not be repeated and are applicable to the implementation shown in FIGS. 28*a*-28*c*. Additionally, this implementation includes a heater core 2800 which is placed between the heater element 2704 which is positioned in front of the foot vent 2706*a* and the evaporator 2700. The heater core 2800 may provide additional heat from the drivetrain cooling loop which may be used to heat the vehicle cabin.

Advantages of such an operation are described above. FIG. 28*a* illustrates a mode of operation which is identical to the mode of operation described in connection with FIG. 27*a*. FIG. 28*b* illustrates a mode of operation which is identical to the mode of operation described in connection with FIG. 27*b*. FIG. 28*c* illustrates a mode of operation which is identical to the mode of operation describe in connection with FIG. 27*c* and thus will not be repeated.

Moreover, although many embodiments exhibit various systems in association with various embodiments of various implementations of HVAC systems, it should be understood that any combination of the various structural and functional elements of such individual components of these implementations can be included and or omitted in any number of HVAC systems and/or thermal management systems.

As can be inferred from the above discussion, the above-mentioned concepts can be implemented in a variety of arrangements in accordance with embodiments of the invention. Specifically, HVAC systems for electric vehicles in accordance with embodiments are based on the idea of allowing for such systems to operate as efficiently as possible.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An integrated thermal management system comprising:
a drivetrain cooling loop comprising a drivetrain fluid conduit fluidly interconnecting at least a first cooling element and one or more heat producing drivetrain components such that drivetrain coolant fluid flows therebetween;
an energy storage system heating and cooling loop comprising an energy storage fluid conduit fluidly interconnecting one or more energy storage elements such that energy storage coolant fluid flows therebetween;
a heating, ventilation, and air conditioning (HVAC) heating and cooling loop comprising an HVAC fluid conduit fluidly interconnecting at least a compressor, a condenser, a first expansion valve interconnected with an evaporator, and a second expansion valve interconnected with a chiller such that a HVAC refrigerant may flow therebetween, wherein the chiller is disposed in thermal communication with the energy storage fluid conduit;
a heater core disposed in thermal communication with the evaporator;
a mode valve fluidly interconnecting the drivetrain fluid conduit and energy storage fluid conduit such that drivetrain coolant fluid and/or energy storage coolant fluid may be directed between the drivetrain cooling loop and energy storage system heating and cooling loop; and
a blend valve fluidly interconnecting the drivetrain fluid conduit, the heater core, the first cooling element, and a bypass conduit configured to bypass the first cooling element and the heater core,
wherein the second expansion valve is configured such that thermal cooling from the HVAC heating and cooling loop is transferred into the energy storage coolant fluid through the chiller, and
wherein the blend valve is configured to perform at least one of:
transfer heat waste from the drivetrain cooling loop into the energy storage coolant fluid through the bypass conduit, and/or
transfer heat waste from the drivetrain cooling loop or the energy storage system heating and cooling loop into the heater core.

2. The integrated thermal management system of claim 1, wherein the first cooling element is a radiator.

3. The integrated thermal management system of claim 1, further comprising at least a drivetrain pump in fluid communication with the drivetrain fluid conduit, and an energy storage pump in fluid communication with the energy storage fluid conduit.

4. The integrated thermal management system of claim 1, wherein the blend valve is configured to transfer all expelled waste heat from the drivetrain cooling loop into the energy storage coolant fluid through the bypass conduit.

5. The integrated thermal management system of claim 1, wherein the blend valve is configured to transfer all expelled waste heat from the drivetrain cooling loop into the HVAC heating and cooling loop through the heater core.

6. The integrated thermal management system of claim 1, wherein the blend valve is configured to transfer all expelled waste heat from the drivetrain cooling loop into the first cooling element.

7. The integrated thermal management system of claim 1, wherein the blend valve outputs the drivetrain coolant fluid to two or more of the heater core; the first cooling element; and the bypass conduit.

8. The integrated thermal management system of claim 1, wherein the blend valve is configured to transfer heat waste from the drivetrain cooling loop and the energy storage system heating and cooling loop into the heater core.

9. An electric vehicle comprising:
a vehicle cabin; and
the integrated thermal management system of claim 1,
wherein the heater core and the evaporator are in thermal connection with the vehicle cabin.

* * * * *